United States Patent
Wilson et al.

[11] Patent Number: 6,135,796
[45] Date of Patent: *Oct. 24, 2000

[54] MODULAR COMMUNICATION CABLING ARRANGEMENT

[75] Inventors: Harold R. Wilson, Hudsonville; Ross S. Johnson, Ottawa, both of Mich.

[73] Assignee: Haworth, Inc., Holland, Mich.

[*] Notice: This patent is subject to a terminal disclaimer.

[21] Appl. No.: 09/345,864

[22] Filed: Jul. 1, 1999

Related U.S. Application Data

[63] Continuation of application No. 08/814,280, Mar. 10, 1997, Pat. No. 5,938,462, which is a continuation of application No. 08/447,176, May 19, 1995, abandoned, which is a continuation-in-part of application No. 08/377,743, Jan. 25, 1995, abandoned.

[51] Int. Cl.[7] .................................................. H01R 23/27

[52] U.S. Cl. .......................................... 439/215; 439/225

[58] Field of Search ................................... 439/215, 211, 439/210, 225; 174/48

[56] References Cited

U.S. PATENT DOCUMENTS

| | | |
|---|---|---|
| 3,781,758 | 12/1973 | Anderson . |
| 3,958,850 | 5/1976 | Ayer . |
| 3,990,763 | 11/1976 | Kress . |

(List continued on next page.)

FOREIGN PATENT DOCUMENTS

| | | |
|---|---|---|
| 2 609 218 | 12/1986 | France . |
| 4162898 | 6/1992 | Japan . |
| 6251847 | 9/1994 | Japan . |

OTHER PUBLICATIONS

Installation Instructions for Programmable Cabling System Mar. 3, 1988, 9 pages.
MOD–TAP, "Components Catalog 1992", 1992, pp. A–18, A–19 and front and back cover.
NETCONNECT, "Open Wiring Systems", Jan. 1993, p. 150 and front and back cover.
The Siemon Company Catalog, "Connecting Hardware for Information Technology", Apr. 1993, pp. 14, 55 and front and back cover.
South Hills Datacomm, "Solutions", Spring/Summer 1994, p. 116 and front cover.
L–COM IEEE–488, "Coaxial Universal Modular Datacom Service Aids", 1994, p. D5 and front cover.
MOD–TAP, "Modular Communications Wiring", p. 3 and front and back cover.
Atlantic Teleconnect Inc., "Voice & Data Products & Services", (3 pages).

(List continued on next page.)

*Primary Examiner*—Gary F. Paumen
*Attorney, Agent, or Firm*—Flynn, Thiel, Boutell & Tanis, P.C.

[57] ABSTRACT

A modular communication system, particularly for interior space-dividing wall panels which are serially-connected together to define a plurality of adjacent workstations. The modular communication system is defined by a plurality of prefabricated modules, one of which is an elongate main distribution module mountable within a raceway which extends horizontally longitudinally of the panel. This elongate main distribution module, in one embodiment, has a length which approximately corresponds to the panel length, and has terminals or connectors at opposite ends so that a plurality of main distribution modules can be serially-connected to extend along a plurality of serially-connected panels. The main communication modules define a plurality of telecommunication links (i.e., paths), with each link preferably being defined by eight conductors (i.e., four pairs). The system also includes tap-off modules which cooperate with the main distribution modules to permit one (two in the preferred embodiment) link to be tapped off at a workstation for connection to communication equipment (i.e. a telephone and/or a computer). The tap-off module permits only the selected link or links to be tapped off and accessible at the workstation.

20 Claims, 43 Drawing Sheets

U.S. PATENT DOCUMENTS

| | | | |
|---|---|---|---|
| 4,060,294 | 11/1977 | Haworth et al. | 439/215 |
| 4,070,548 | 1/1978 | Kasper . | |
| 4,115,665 | 9/1978 | Giacoppo et al. . | |
| 4,220,391 | 9/1980 | Krolak et al. . | |
| 4,227,764 | 10/1980 | Fiske . | |
| 4,236,779 | 12/1980 | Tang . | |
| 4,262,173 | 4/1981 | Saligny . | |
| 4,277,123 | 7/1981 | Howorth et al. | 439/215 |
| 4,290,664 | 9/1981 | Davis et al. . | |
| 4,392,701 | 7/1983 | Weidler . | |
| 4,408,819 | 10/1983 | Guelden . | |
| 4,533,202 | 8/1985 | Pohl . | |
| 4,602,842 | 7/1986 | Free et al. . | |
| 4,662,701 | 5/1987 | Lane . | |
| 4,761,811 | 8/1988 | Zetena, Jr. . | |
| 4,795,356 | 1/1989 | Pauza . | |
| 4,829,564 | 5/1989 | Jarvis . | |
| 4,928,303 | 5/1990 | Allin et al. . | |
| 4,992,058 | 2/1991 | Tanner . | |
| 5,070,522 | 12/1991 | Nilssen . | |
| 5,096,433 | 3/1992 | Boundy | 439/215 |
| 5,149,277 | 9/1992 | LeMaster . | |
| 5,158,472 | 10/1992 | Juhlin | 439/215 |
| 5,160,276 | 11/1992 | Marsh et al. . | |
| 5,203,713 | 4/1993 | French et al. | 439/215 |
| 5,210,788 | 5/1993 | Nilssen . | |
| 5,214,889 | 6/1993 | Nienhuis et al. | 439/215 X |
| 5,236,370 | 8/1993 | King et al. | 439/215 |
| 5,252,086 | 10/1993 | Russell et al. | 439/215 |
| 5,272,277 | 12/1993 | Humbles et al. . | |
| 5,277,609 | 1/1994 | Ondrejka | 439/215 |
| 5,299,956 | 4/1994 | Brownell et al. . | |
| 5,318,454 | 6/1994 | Deer et al. | 439/215 |
| 5,326,934 | 7/1994 | LeMaster et al. . | |
| 5,412,529 | 5/1995 | Eaton et al. | 439/215 X |
| 5,530,435 | 6/1996 | Toms et al. | 340/825 |
| 5,593,317 | 1/1997 | Humbles | 439/502 |
| 5,719,933 | 2/1998 | Welch | 379/397 |

OTHER PUBLICATIONS

TYTON, "Tyton Systems for Networking Applications", p. 8 and front and back cover.

KRONE Product Catalog MK005–01.101, Select the KRONE Contact That Meets Your Needs, Rev. Dec. 7, 1992, p. 5.

Brand–Res Telecommunications, "Cable Assemblies", May 1986, pp. 20, 21 and front cover.

Nevada Western, "Wire Management Solutions", Mar. 1987, p. 28, front and back cover, and Contents page.

South Hills Electronics, "Twisted Pair Products Catalog", Nov. 1989, pp. 3, 10, 15 and front and back cover.

Control Cable Inc, "1990 Catalog and Price List", 1990, p. 29 and front and back cover.

Thomas & Betts, "Connectivity Solutions", Aug. 1991, pp. 6, 7, front and back cover, and Contents page.

Northern Telecom, "Structured Wiring Products", 1992, pp. 13, 14 and front and back cover.

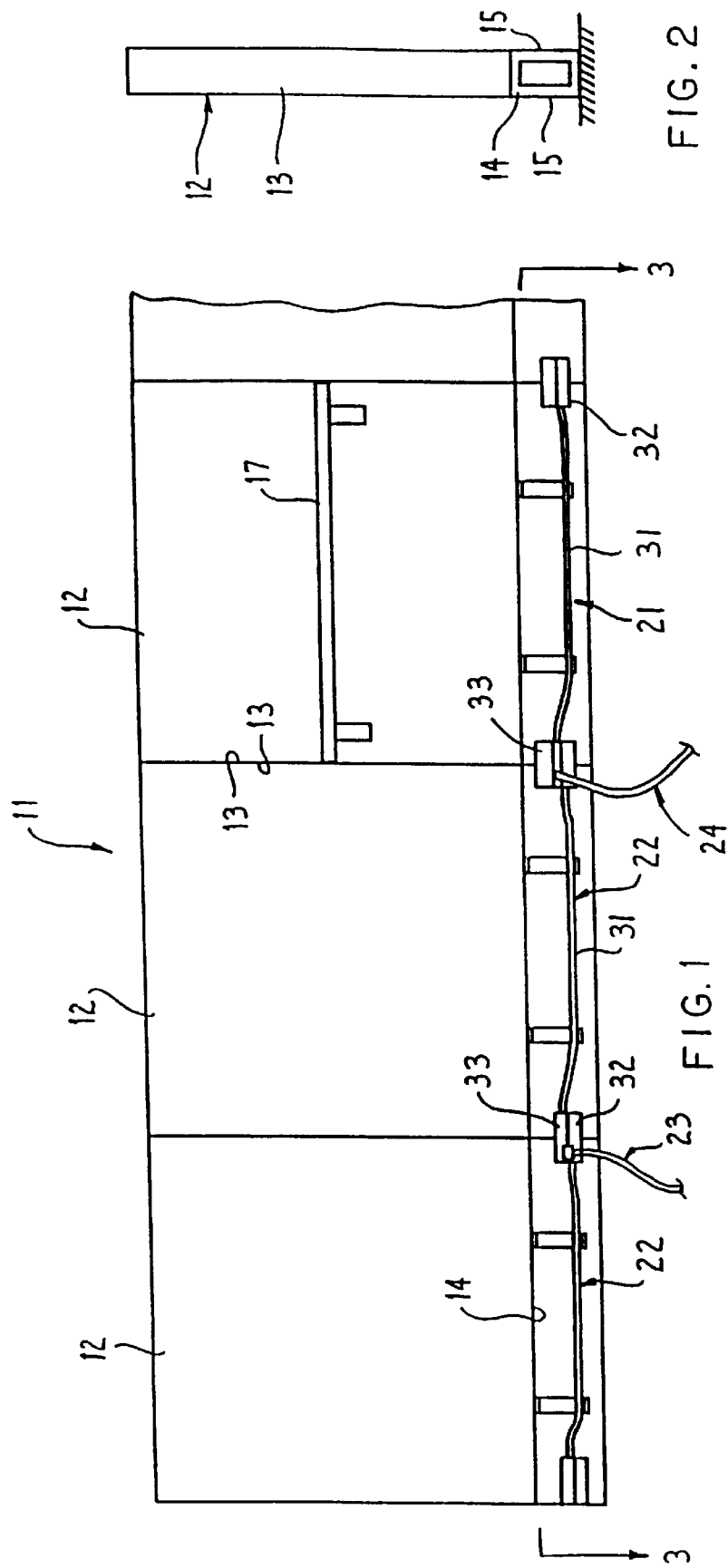

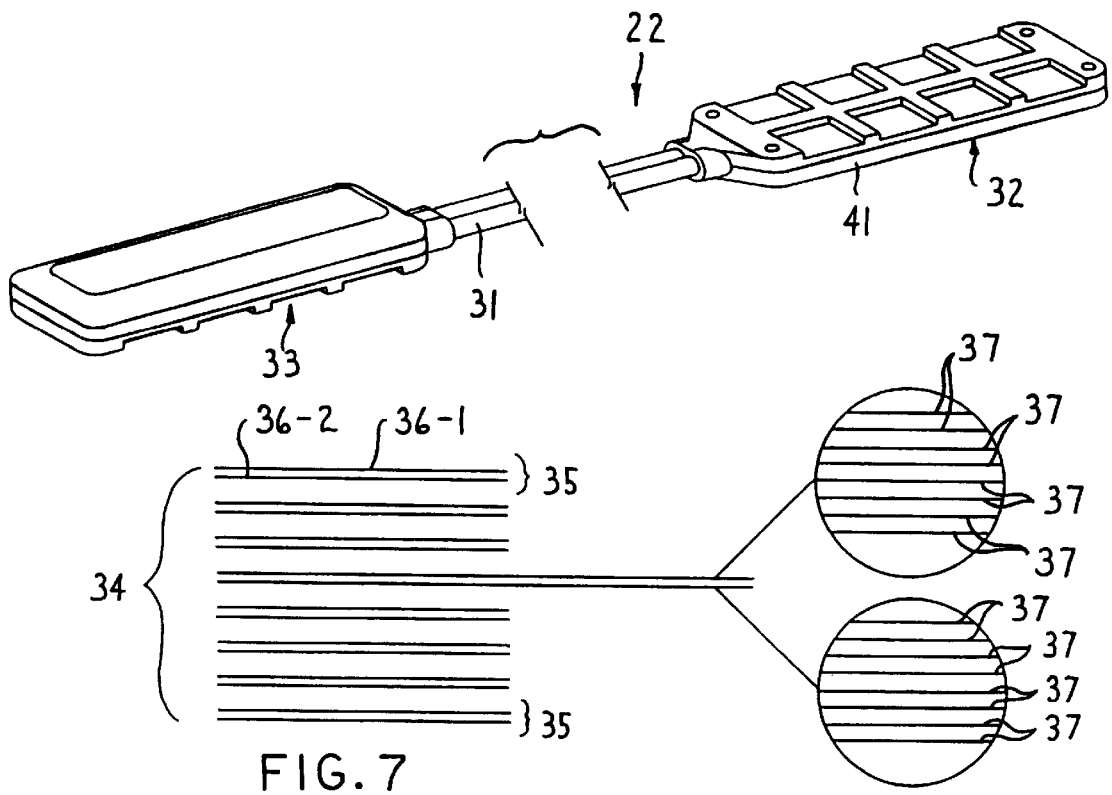
FIG. 6
FIG. 7
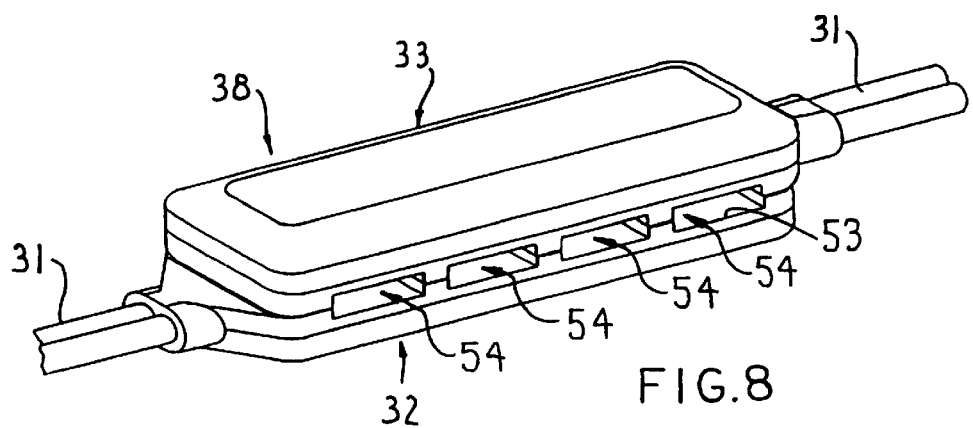
FIG. 8

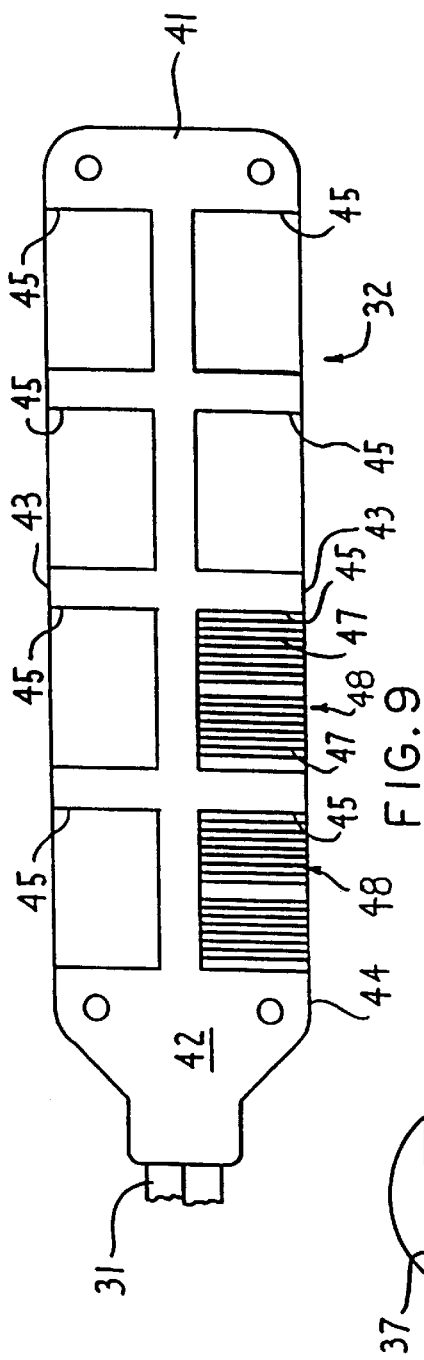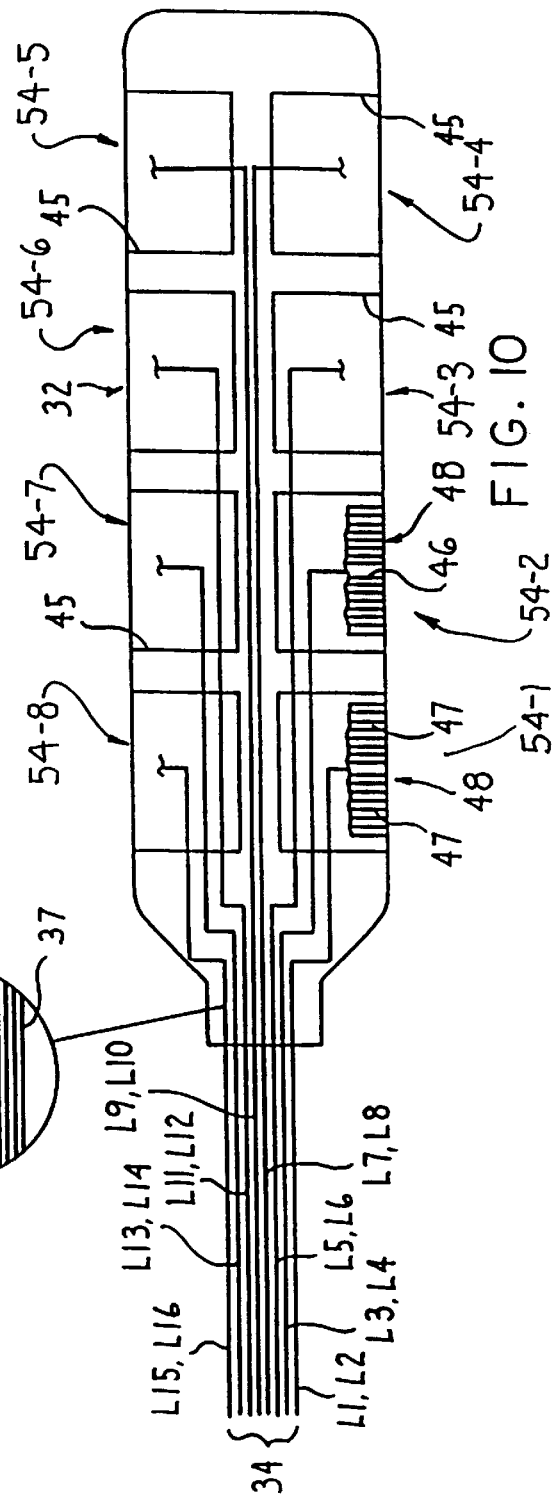

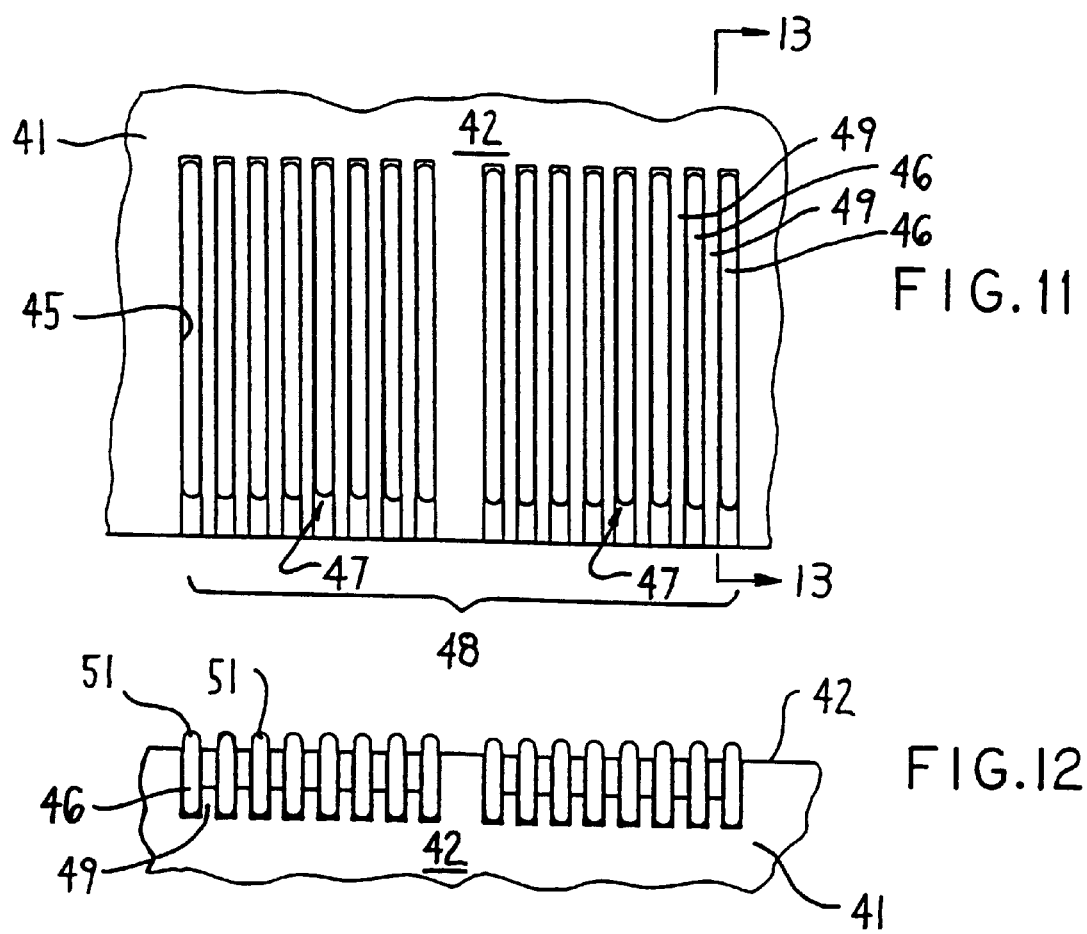

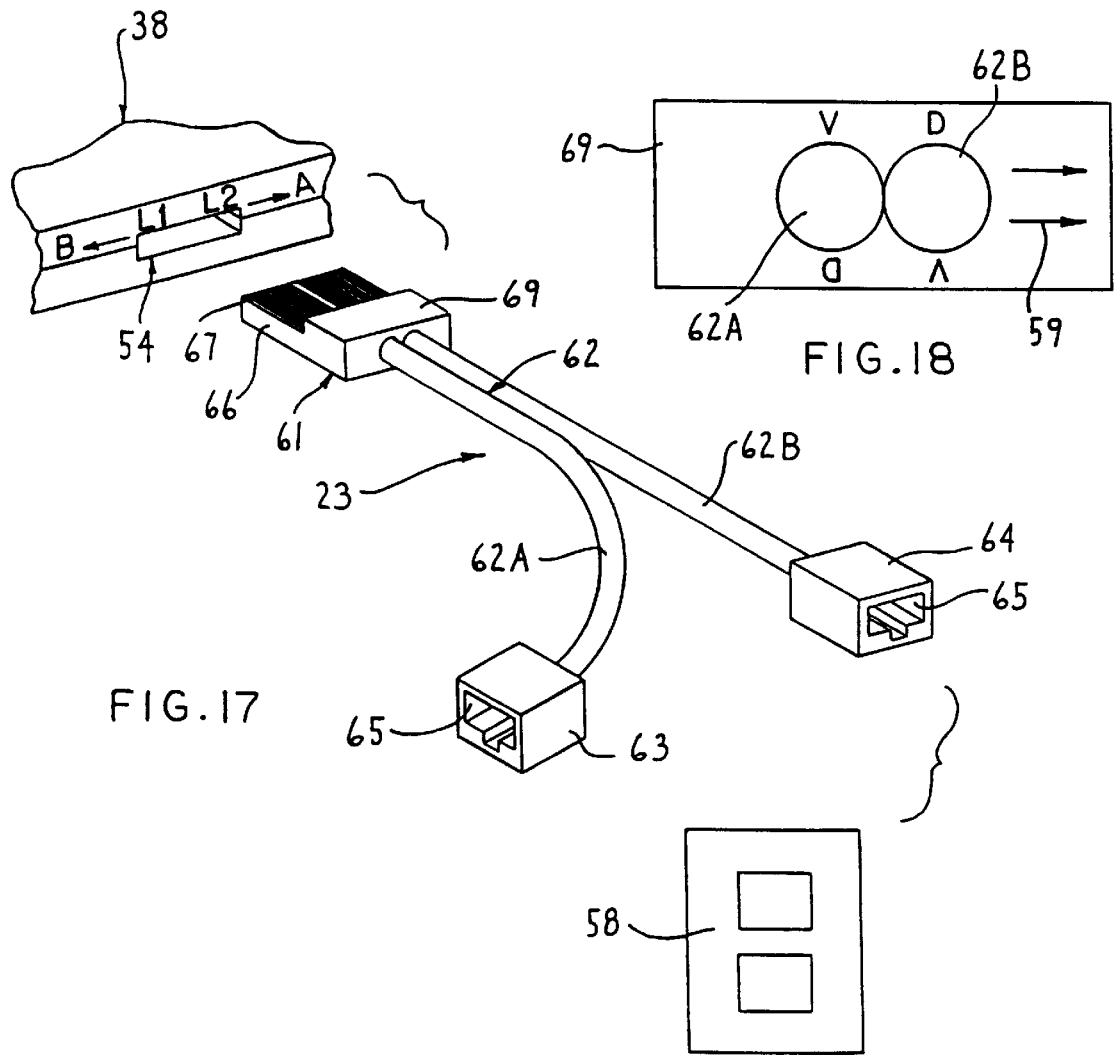

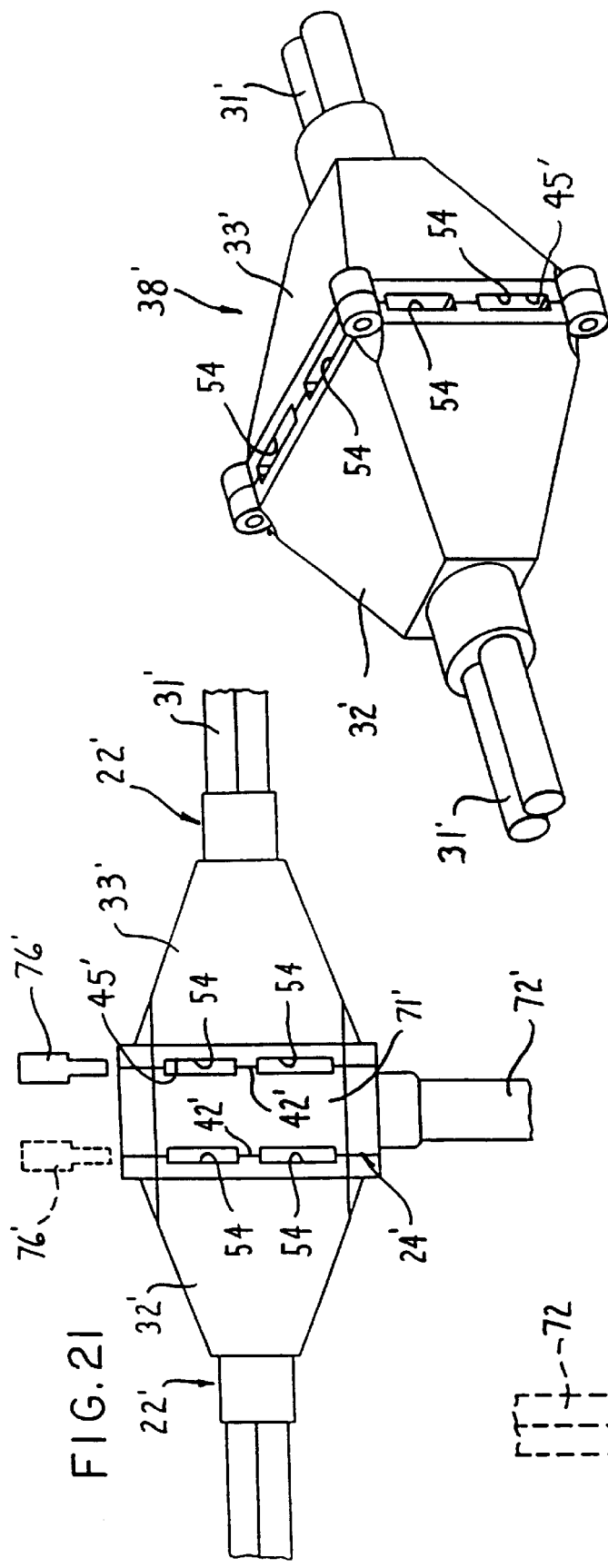

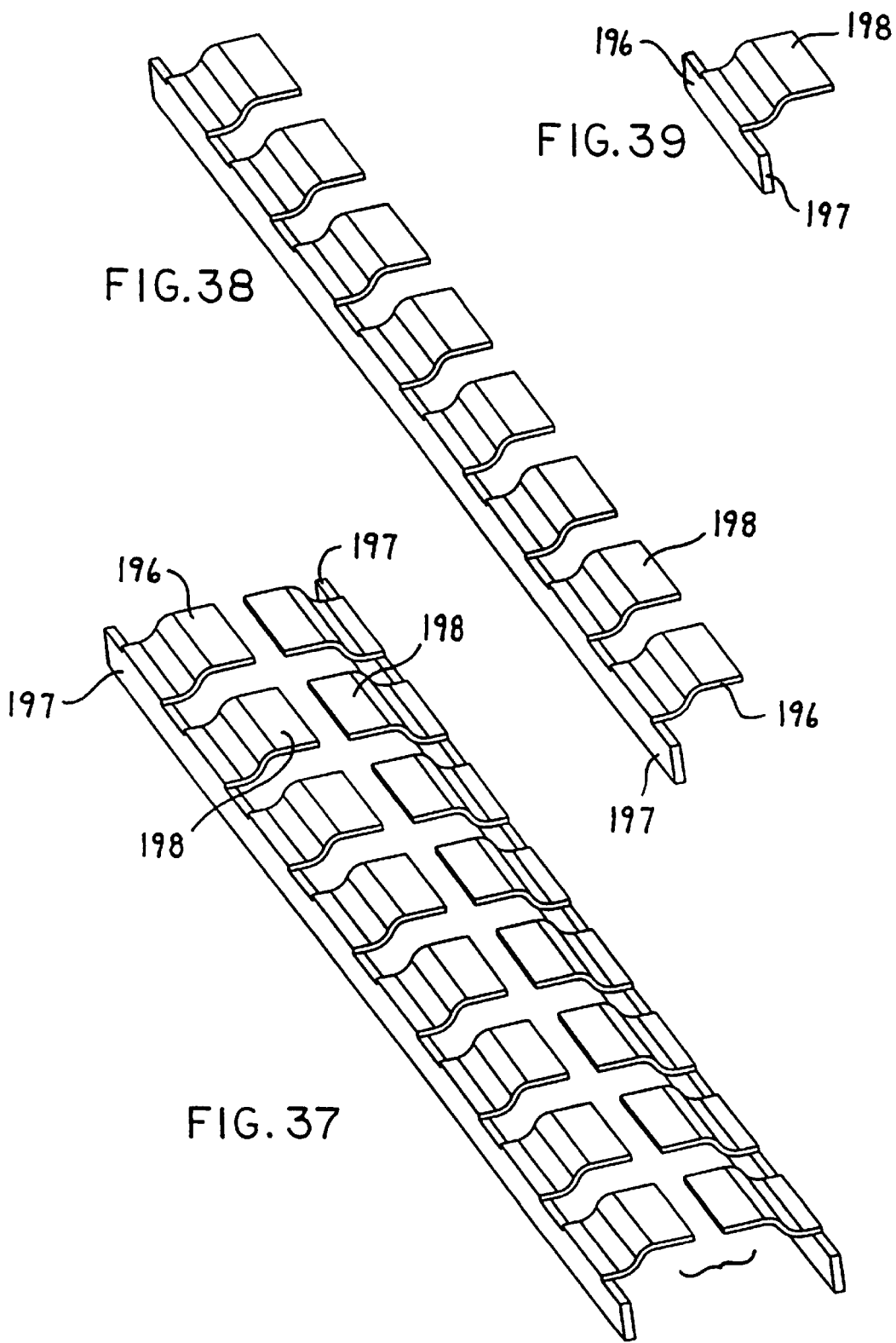

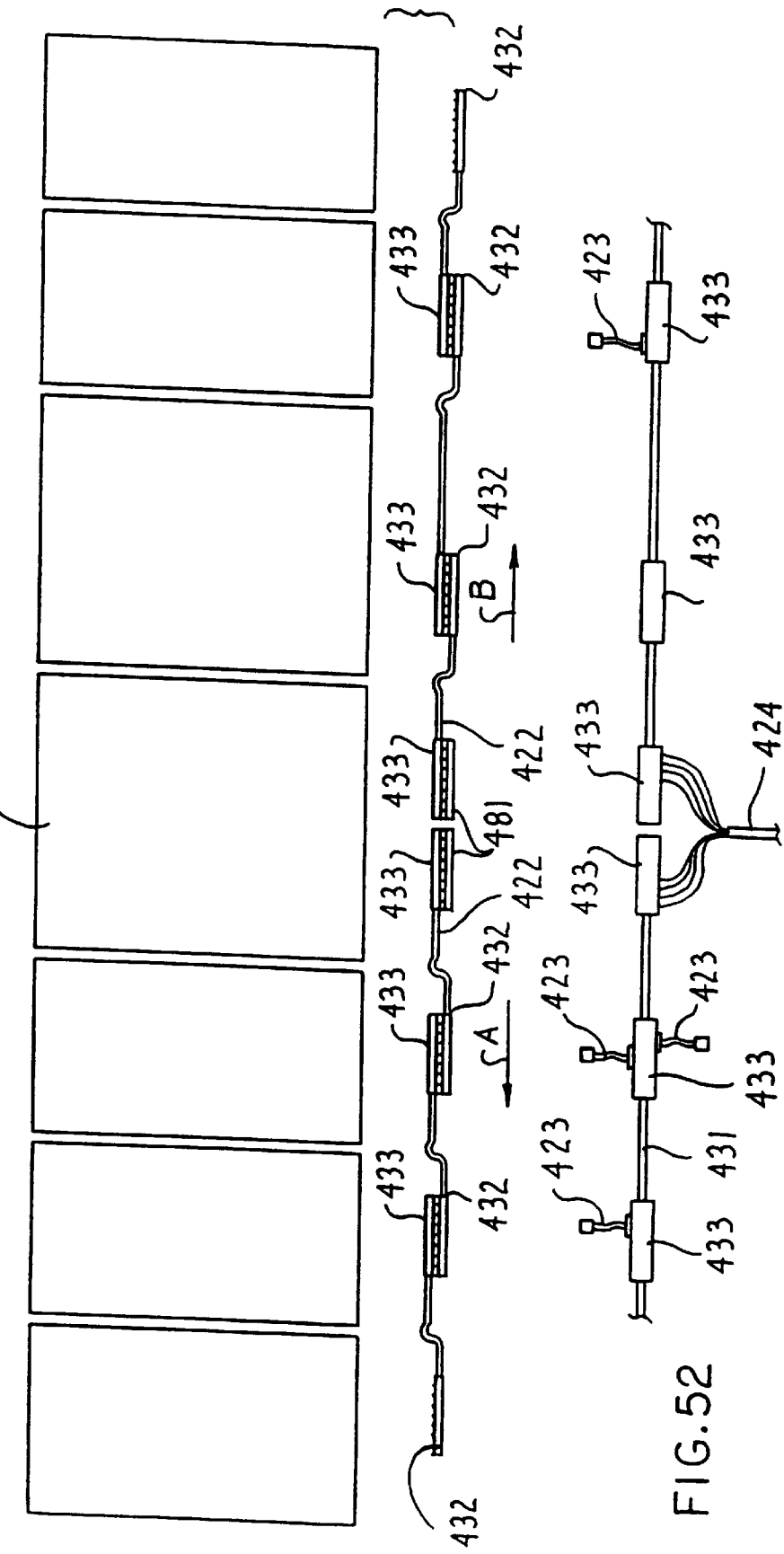

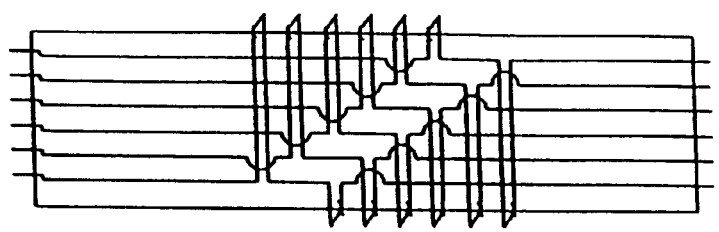
FIG.64A
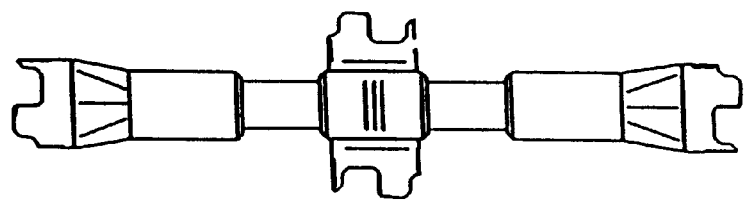
FIG.64B
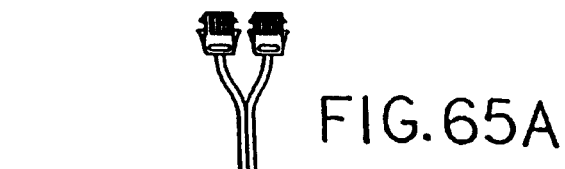
FIG.65A
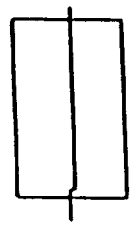
FIG.65B
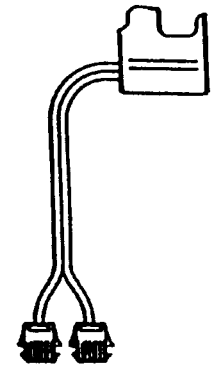

MODULAR COMMUNICATION CABLING ARRANGEMENT

CROSS REFERENCE TO RELATED APPLICATION

This is a continuation of Ser. No. 08/814,280, filed Mar. 10, 1997, now U.S. Pat. No. 5,938,462, which is a continuation of Ser. No. 08/447,176, filed May 19, 1995, now abandoned, which is a continuation-in-part of Ser. No. 08/377,743, filed Jan. 25, 1995, now abandoned.

FIELD OF THE INVENTION

This invention relates to a communication cabling system for use within a building and, more specifically, to an improved modular communication cabling system which is desirable for use with office furniture particularly interior space-dividing wall panels to permit a plurality of communication links to be readily supplied to a plurality of workstations to permit selection of links to take place at the workstation, which modular system also significantly simplifies both initial installation and reconfiguration.

BACKGROUND OF THE INVENTION

Commercial buildings typically provide large open floor areas intended for use as offices and the like, and the end user typically determines the most efficient use of the floor space for his own needs, and selects how the floor space is to be divided into smaller working spaces through the use of portable wall panels or the like. To optimize the usage of the space while retaining significant flexibility with respect to such usage and reconfiguration, most modern offices utilize what is conventionally referred to as "systems" furniture for dividing large floor space areas into smaller workstations. This "systems" furniture typically utilizes interior upright space-dividing panels which serially connect together through two-panel straight or angled connections, or through suitable three- or four-panel connections, to define a large plurality of individual workstations. Such panels are typically less than floor-to-ceiling height, and cooperate with other furniture components to define an equipped workstation. These components may involve worksurfaces, file cabinets and the like which mount directly on and are supported by the wall panels, or freestanding furniture components such as tables and file cabinets, and commonly a combination of both wall-mounted and free-standing components are utilized. These workstations must provide access to both electrical power and communication cabling. The problems associated with the supplying of electrical power to the workstations has been greatly simplified by the development of modular electrical systems which cooperate with and readily mount on the panels, and which can be readily reconfigured, so as to provide significant flexibility and simplicity with respect to the supplying of electrical power to the individual workstations. Such modular electrical systems for use with office furniture, particularly interior space-dividing wall panels, are now conventional and have been extensively utilized for over 15 years. The supplying of communication cables to workstations defined by such panel systems, however, continues to be a formidable problem in the office furniture environment.

More specifically, the conventional and widely utilized practice at the present time is to provide office systems with conventional communication cables which are all connected back to a main wiring closet. That is, a large number of conventional communication cables are connected to control equipment in the wiring closet, and the cables are then fed through floor conduits or ceiling clearance spaces to various work areas, at which point the cables are then fed into interior channels or raceways which extend along the panels, typically along the tops or bottoms of the panels. The cables typically terminate in a standard connector, such as a multi-pair amphenol connector which then has a mating part connected thereto for permitting selection of a desired communication link, and this mating part in turn has a standard four-pair communication cable joined thereto and terminating in a conventional communication jack which mounts in the side of the panel, typically either at the base or at worksurface height. With such arrangement, however, and particularly in view of the extensive use of communication equipment within the work space, which equipment will typically include a telephone, a computer and possibly other equipment such as a facsimile machine, and the additional requirement that computers be interlinked with one another or with a common mainframe, the supplying of communication cables (i.e., communication links) from the wiring closet to the individual workstations creates significant labor and installation difficulties since the large number of cables must typically be installed after the furniture system has been fully assembled at the job site, and the number of such cables and the length thereof as they extend from the wiring closet to the individual workstations create a significant jungle of cables so that initial layout and installation is both time consuming and costly. Further, such systems greatly impede the overall flexibility of the system with respect to hook-up to the various communication links, particularly for computers, and also greatly restricts or at least greatly increases the difficulty of modifying or reconfiguring either the communication system or the furniture system. Any significant modification of either the communication or furniture system requires significant removal of the communication cables and, after the furniture system has been reconfigured, substantially a wholly new installation of the communication cables from the wiring closet to the individual workstations is required. The current communication cabling systems, even though they have been widely utilized for many years and continue to be utilized, nevertheless greatly minimize the advantages associated with furniture systems of this type, particularly with respect to the ability to easily install, modify or reconfigure such furniture systems when provided with a communication system thereon.

To improve on the conventional communication systems currently in use, various attempts have been made to provide at least limited modularity so as to provide some simplification with respect to the installation of communication connections to a plurality of workstations. The current suggestions, however, provide only minor advancements with respect to the problems associated with the current systems and do not provide the degree of selection and flexibility desired or required so as to greatly simplify the installation and the reconfiguration of such systems on furniture, particularly wall panels. The known attempts, to the best of the inventors' knowledge, have not achieved significant commercial acceptance or utilization. Examples of these prior attempts are illustrated in U.S. Pat. Nos. 5,272,277, 5,160,276 and 4,928,303.

Accordingly, it is an object of this invention to provide an improved modular communication system particularly for use on office furniture including wall panels, which improved system overcomes many of the significant problems and disadvantages which are associated with conventional communication cabling systems and which have been tolerated for a long period of time in view of the lack of a desirable solution thereto.

More specifically, it is an object of this invention to provide an improved modular communication cabling system which is particularly desirable for mounting on or within furniture wall panels which define a plurality of workstations, with the modular system incorporating a plurality of communication links which can be selectively tapped off at various workstations to facilitate connection to communication equipment such as telephones, computers and the like.

A further object of the invention is to provide a modular communication system, as aforesaid, which permits prefabrication of a minimal number of modules which make up the system, which modules can be easily and efficiently mounted on the panels and interconnected at the job site so as to greatly simplify the initial installation of the communication system, and at the same time greatly simplify subsequent modification or reconfiguration of either the communication system or of the paneling system. If desired, some of the modules can be mounted on the panels at the factory and shipped to the job site, so that remaining modules are then easily and efficiently installed at the job site so as to interconnect the system.

A still further object of the invention is to provide an improved modular communication system, as aforesaid, which includes modules permitting easy selection of at least one communication link for supply to a workstation, with the selection of the various links of the system and the supplying thereof to the individual workstations being easily and efficiently accomplished at the job site and at the individual workstations after the furniture system has been assembled.

Still a further object of the invention is to provide an improved modular communication system, as aforesaid, which includes the capability of permitting a large plurality of communication links to extend throughout the entire length of the modular system, and which includes a tap-off feature which, when it selects one of the links for tap-off to a selected workstation, causes this link to be dead downstream of the tap-off location.

According to the invention, there is provided an improved modular communication system which is particularly desirable for use on or in association with furniture, and particularly interior space-dividing wall panels which are serially-connected together to define a plurality of adjacent workstations. The modular communication system is defined by a plurality of prefabricated modules, one of which is an elongate main distribution module which is mountable within a raceway which is associated with the panel, for example at the bottom thereof, and extends horizontally longitudinally of the panel length. This elongate main distribution module, in one embodiment, has a length which approximately corresponds to the panel length, and additionally has terminals or connectors at opposite ends so that a plurality of such main distribution modules can be serially-connected so as to extend along a plurality of serially-connected panels which define a plurality of adjacent workstations. The main communication modules define a plurality of communication links (i.e., paths), with each link preferably being defined by eight conductors (i.e., four pairs) such being a standard and well recognized communication link. The modular communication system also includes tap-off modules which cooperate with the main distribution modules to permit one (two in the preferred embodiment) of the communication links to be tapped off at a workstation so as to permit electronic equipment (such as a telephone and/or a computer) to be joined thereto. The tap-off module cooperates with the system so as to permit only the selected link or links to be tapped off and accessible at the workstation, with the remaining links of the system being transmitted throughout the serially-connected main communication modules for tap-off of other links at other locations or workstations.

In the modular communication system, as aforesaid, the tap-off module and its cooperation with the main communication modules, in a preferred embodiment, enables the installer to make a selection decision as to which link or links will be accessible at the workstation, with these selected links then being dead or disconnected downstream of the tap-off point, thereby simplifying not only the initial installation of the system and the hook-up of equipment within various workstations to different communication links, but also the subsequent reconfiguration of the communication system or of the overall furniture system.

The modular communication system, as aforesaid, also preferably includes an in-feed module which connects to the serially-connected main distribution modules so as to supply the plurality of communication links thereto, with the in-feed having a main trunk cable or the like connected thereto for connection back to the telecommunication closet. The in-feed module can be positioned for cooperation with the main distribution modules to permit some of the plurality of communication links to flow in one downstream direction therefrom, and the other of the plurality of telecommunications links to extend downstream in the opposite direction therefrom.

In the improved modular communication system, in a preferred embodiment as disclosed hereinafter, the system provides 16 telecommunication links which extend throughout the system, and the tap-off preferably accesses two links to facilitate the supplying of two different links to each of eight different workstations, with one of the links for each workstation preferably being for voice communication (i.e., a telephone) and the other link preferably being for data communication (i.e., a computer).

Other objects and purposes of the invention, and variations thereof, will be apparent upon reading the following specification and inspecting the accompanying drawings.

BRIEF DESCRIPTION OF THE DRAWINGS

FIG. 1 is a diagrammatic side elevational view showing several wall panels serially-connected together and mounting the improved modular communication system in the raceway thereof.

FIG. 2 is a diagrammatic end elevational view of one of the panels.

FIG. 6 is a perspective view of the main distribution module as associated with the communication system of this invention according to one embodiment thereof.

FIG. 7 is a line diagram which illustrates the telecommunication transmission links and conductors associated with the cable of the main distribution module.

FIG. 8 illustrates connector units as provided on adjacent ends of two distribution modules joined together to define the connector assembly.

FIG. 9 is a plan view showing the top or abutment surface associated with the connector unit at one end of the main distribution module.

FIG. 10 is a line diagram corresponding to FIG. 9 but illustrating the transmission links and contact groupings associated with the connector unit.

FIG. 11 is an enlarged, fragmentary top view showing one of the contact groupings associated with the connector unit.

FIG. 12 is a fragmentary front view of the arrangement shown in FIG. 11.

FIG. 17 is a perspective view which illustrates a tap-off module and its cooperation between the connector assembly and a face plate as mountable on a panel or the like.

FIG. 18 shows the exposed face of the tap-off plug and its positional relationships to the access port.

FIGS. 20 and 21 are perspective views which are respectively similar to FIGS. 8 and 19 but which illustrate variations with respect to the modular communication system.

FIG. 22 is a diagrammatic view showing the connector unit of FIG. 20 connected to an end cap or an end in-feed module.

FIG. 37 is a perspective view of a double-sided variation of the spacer insert.

FIG. 38 is a single-sided variation of the spacer insert.

FIG. 39 is a single-piece variation of the spacer insert.

FIG. 51 is a diagrammatic elevational view similar to FIG. 24 but illustrating an alternative arrangement for the modular communication system.

FIG. 52 is a top view of the communication system of FIG. 51.

FIGS. 58A through 69 are diagrammatic plan views which illustrate the modular communication system of this invention, specifically variations and possible arrangements thereof, wherein:

FIGS. 58A, 58B and 58C show three arrangements of the data distribution assembly (i.e., the modular communication system) employing in-line data taps (i.e., tap-off modules), with FIGS. 58A and 58B showing arrangements wherein a one-way data feed (i.e., an in-feed module) connects to either end of the system, and FIG. 58C shows the data feed being bi-directional and connected intermediate the length of the system;

FIGS. 64A and 64B relate to the distribution segment incorporating a data T therein, with FIG. 64B showing the structure thereof and FIG. 64A being a line diagram of the internal telecommunication links;

FIGS. 65A and 65B relate to a data tap of the type which cooperates with a data T, with FIG. 65A showing the structure of the tap and FIG. 65B being a line diagram of the telecommunication link which passes therethrough;

FIG. 66B illustrates the structure thereof and FIG. 66A illustrates the telecommunication links associated therewith;

FIG. 67B shows the structure thereof and FIG. 67A shows the telecommunication links associated therewith;

FIG. 68B shows the data tap connected to the data T, and FIG. 68A is a line diagram showing the telecommunication links and the coupling of the data tap to one of the links; and FIG. 69 is a diagrammatic plan view which illustrates several workstations disposed on opposite sides of a spline panel arrangement (the latter eliminated from the figure for purposes of clarity), with one arrangement of the communication system being disposed so as to extend generally along the spline panel arrangement for providing communication access to the adjacent workstation.

Figure 3:
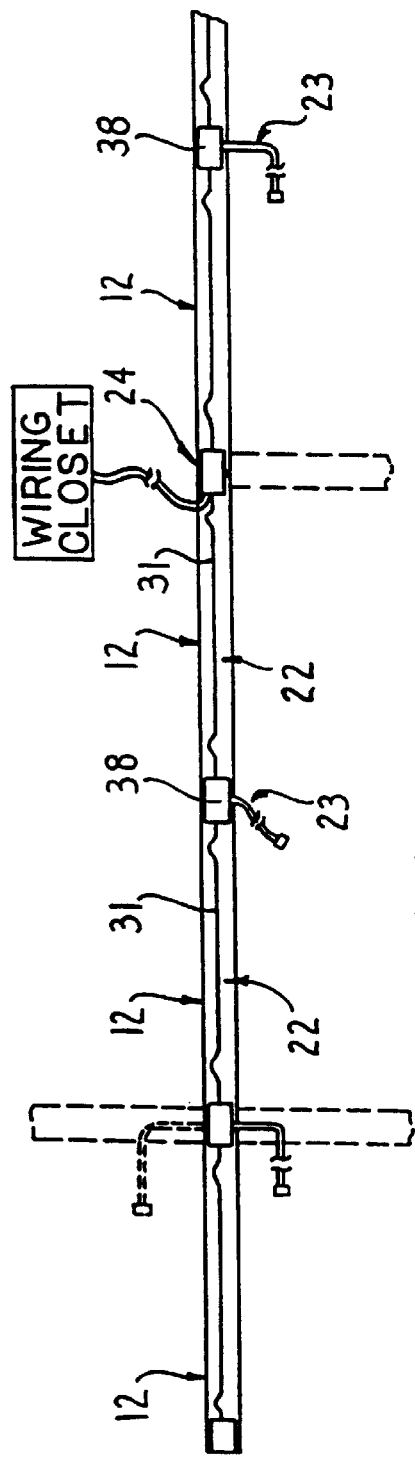
FIG. 3 is a diagrammatic view taken generally along line 3—3 in FIG. 1, but also illustrating branch panels in dotted lines.

Certain terminology will be used in the following description for convenience in reference only, and will not be limiting. For example, the words "upwardly", "downwardly", "rightwardly" and "leftwardly" will refer to directions in the drawings to which reference is made. The word "forward" will be used to designate the direction of the telecommunication link as it extends from the closet to the user equipment. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Referring to FIGS. 1–3, there is diagrammatically illustrated a furniture arrangement 11 which particularly includes a wall system formed by a plurality of interior space-dividing panels 12 supported in upright relationship relative to a floor. The panels 12 can be horizontally serially aligned and connected so that vertical end edges 13 thereof are disposed adjacent one another. The panels 12 define, generally between the vertically enlarged side surfaces thereof, a horizontally elongate channel or raceway 14 which extends throughout the lengths of the panels, such raceway 14 in the illustrated embodiment being located along the bottom of the panel, but it will be recognized that such raceway can be at other locations in the panel such as along the top or at worksurface height. A pair of removable access covers 15 are provided for normally closing off opposite sides of the raceway 14.

Figure 5:
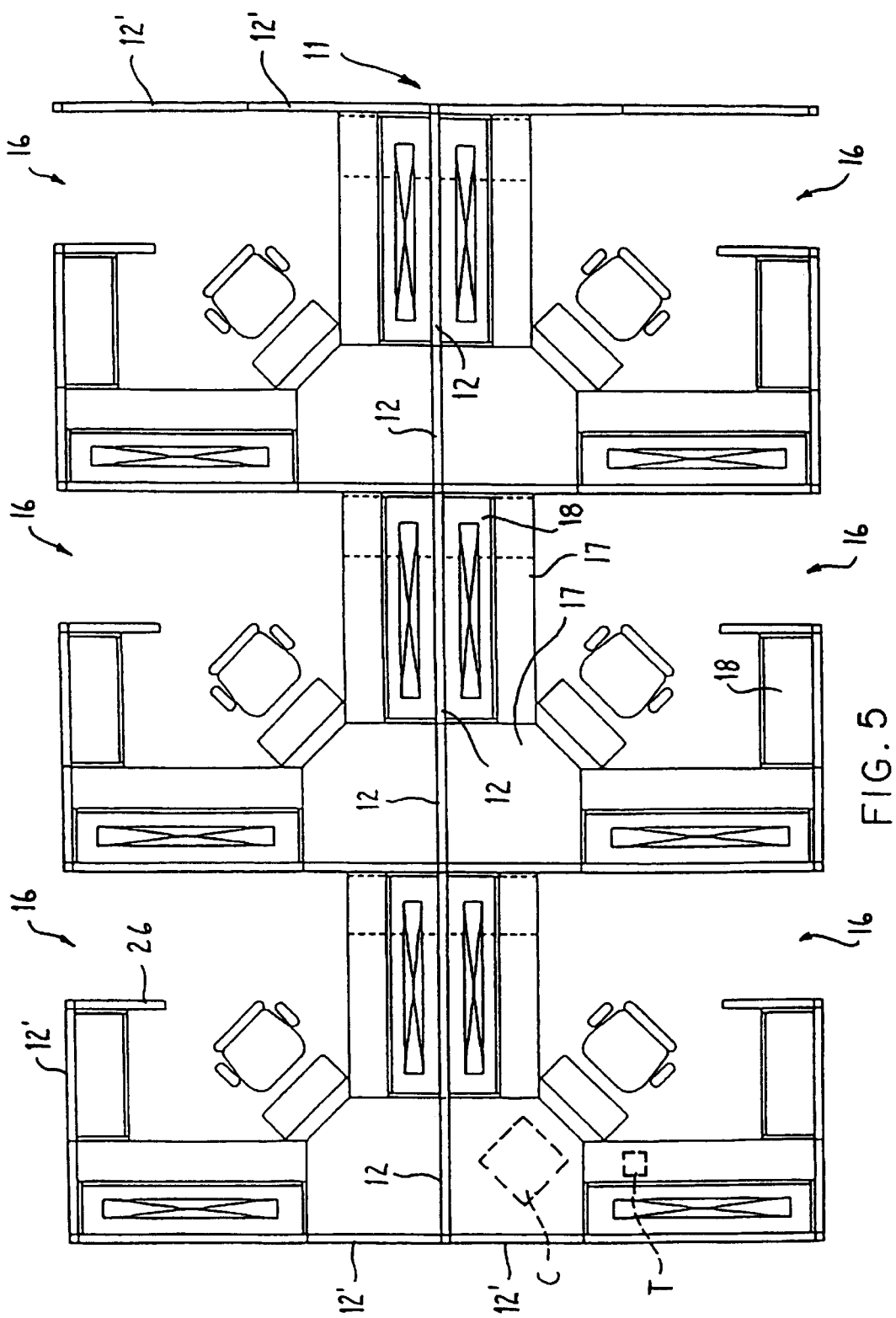
FIG. 5 is a diagrammatic plan view which illustrates panels disposed to define a plurality of adjacent workstations.

As illustrated by FIG. 5, the wall panels are typically arranged to define at least partially enclosed work areas 16, these commonly being referred to as workstations, and for this purpose a plurality of panels 12 in FIG. 5 are serially and horizontally connected in aligned relationship to define a wall structure which effectively functions as a spline. A further plurality of panels, designated 12' in FIG. 5, are branched transversely off the main spline at selected intervals therealong, commonly eight feet intervals, to permit formation of a plurality of adjacent workstations 16 on one or both sides of the spline panels 12. These workstations 16 are provided with conventional furniture components therein. For example, the workstation can be provided with conventional worksurfaces 17 and cabinets 18 which mount on and are supported by the panels, or alternatively or in conjunction therewith the workstation can be provided with freestanding furniture components such as tables, desks, cabinets and the like.

Each workstation is typically provided with a telephone T, and also commonly with a computer C, for use by the occupant of the workstation. Such equipment are typically connected to outlets or jacks which in turn couple to communication cables which extend through the panels and thence normally through floor or ceiling passages back to the telecommunication (i.e., wiring) closet.

In accordance with the present invention, and as diagrammatically illustrated in FIGS. 1 and 3, there is provided a modular communication system 21 which is designed to be accommodated within and extend longitudinally throughout a plurality of serially-connected panels, such as lengthwise through the raceways 14, so as to permit a plurality of telecommunication paths or links to extend in parallel throughout the length of the modular system 21, with the modular system 21 permitting selected individual telecommunication paths or links to be tapped off at predetermined locations lengthwise therealong so as to permit individually selected telecommunication links to be accessible within a plurality of different workstations for connection to the communication equipment associated with the respective workstation.

The modular communication system 21, in the illustrated and preferred embodiment as described in greater detail hereinafter, defines sixteen different telecommunication links which have the capability of extending longitudinally throughout the length of the system, with these sixteen links preferably being disposed with eight distinct groupings each including two distinct links. Each telecommunication link is defined by eight conductors (i.e., four pairs), such being a recognized standard for telecommunication connectors. Each grouping of two telecommunication links can thus be tapped off for access at a selected workstation, whereby the modular communication system 21 can readily and efficiently service eight workstations, and can be readily installed into the wall panel arrangement 11 and reconfigured with minimal installation effort, time and labor.

Figure 4:
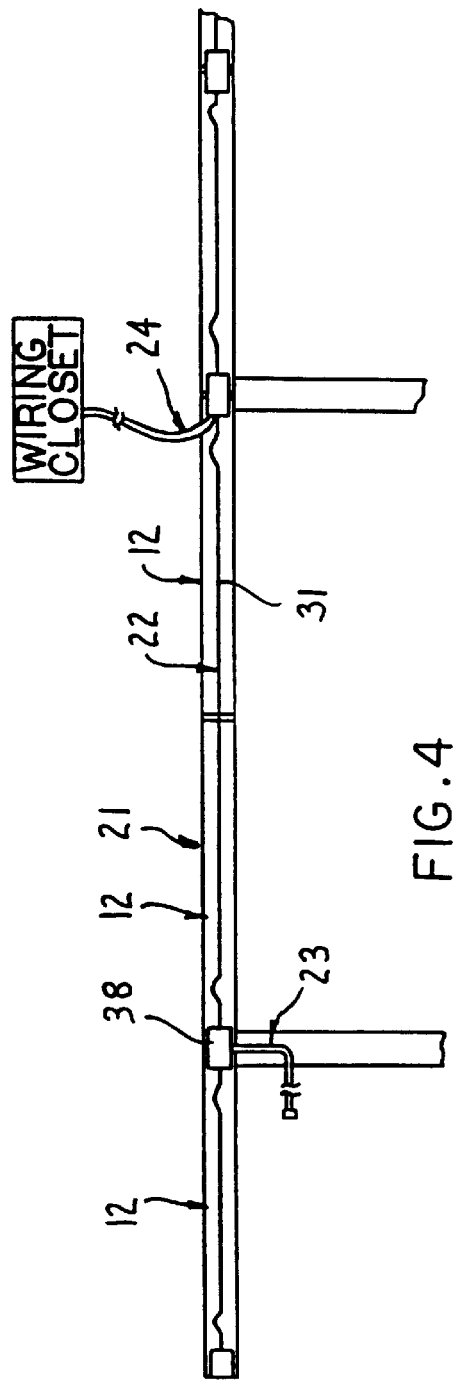
FIG. 4 is a view similar to FIG. 3 but illustrating a variation.

Considering now the details of the modular communication system 21, and as diagrammatically illustrated in FIGS. 1 and 3, the system in one variation includes a main distribution module 22 which is elongated and preferably has a length which is generally similar to the basic panel length (this typically being four feet) as shown in FIG. 3, or a length similar to typical workstation width (this being two panel lengths, or typically eight feet) as shown in FIG. 4. A plurality of such modular distribution modules 22 are connected together in series and extend lengthwise throughout the raceways 14 so as to be accessible from the plurality of workstations which are at least partially defined by the panels. Tap-off or output modules 23 are also provided for selective connection to the main distribution modules, which tap-off modules 23 plug into the main distribution modules in such fashion as to selectively tap off at least one, and in the illustrated embodiment a grouping of two, telecommunication links for connecting these two links to conventional jacks (i.e. outlets) provided for access in the selected workstation for connection to equipment such as a telephone and a computer. These tap-off modules and their connection to the main distribution modules is such as to cause the selected links, downstream of the tap point, to be dead. The system 21 also has an in-feed module 24 which connects to the series of interconnected distribution modules 22 for permitting the plurality (sixteen in the illustrated embodiment) of telecommunication links to be supplied to the modules 22 for transmission throughout the length of the system. This in-feed module 24 has a supply cable connected thereto through which the plurality of telecommunication links are supplied, and the other end of this supply cable connects back to the telecommunication closet. For convenience in installation, this supply cable will typically be of a predetermined length so as to terminate in a connection such as a conventional push block connector, which in turn will then join to one end of one or more elongate supply cables (containing a total of 64 pair) which extends back through floor or ceiling passages for connection to equipment disposed in the telecommunication closet.

The elongate main distribution module 22 in this variation, as illustrated in FIG. 6, includes an elongate distribution cable 31 which is provided with connector units 32 and 33 secured to opposite ends thereof. The connectors units 32 and 33 are preferably and in the illustrated embodiment identical, since rotation of the rightward connector 32 in a vertical plane through an angle of 180° will result in its orientation being identical to the leftward connector unit 33.

The elongate distribution cable 31, which in actuality may be formed by two or more cables grouped together, defines a plurality of telecommunication paths or links 34 extending therethrough, there being sixteen such links in the illustrated and preferred embodiment. These 16 links define eight distinct groupings 35, each containing two distinct telecommunication links such as designated 36-1 and 36-2, one link normally being used for voice communication and the other for data communication. Each of these links 36-1 and 36-2 is defined by eight conductors 37 which cooperate to define a conventional four-pair link having the capability of providing four different signal transmitting pathways, such four-pair telecommunication links being conventional.

Each of the connector units 32 and 33 includes a generally hollow housing 41 connected to the end of the distribution cable 31. The housing 41 has a generally flat abutment wall 42 which is adapted to abut against a similar such wall formed on an opposed mating one of said connector units, and this abutment wall 42 terminates in side edges which extend longitudinally along opposite sides of the housing, which edges define the intersection between the abutment wall 42 and the side walls 44.

Each housing 41 has a plurality of boxlike recesses 45 which open inwardly from the abutment wall 42, with these recesses opening outwardly through the respectively adjacent side wall 44. In this embodiment, housing 41 has eight such recesses 45 therein, four such recesses being disposed generally within a lengthwise row positioned adjacent each side of the housing, with the recesses 45 in each row opening outwardly through the respectively adjacent side wall 44.

Each recess 45 has positioned therein, and mounted on the housing 41, a grouping of electrical contacts 46 which function as a connector. The contact grouping 46 is divided into two substantially identical subgroups 47 which are disposed in side-by-side relation. The contact group 46 includes therein sufficient contacts to define two telecommunication links, this being sixteen contacts in the illustrated embodiment, with each subgroup 47 being defined by eight contacts. Each recess 45 has the contacts thereof respectively connected to sixteen conductors associated with one of the groupings supplied to the housing 41 from the distribution cable 31. Since this latter cable provides eight groupings of two telecommunication links each, each said grouping is electrically connected to a respective one of the contact groups associated with a respective one of the recesses 45. The connection between the contacts and the conductors of the distribution cable can be direct, such as by extending the distribution cable inwardly into the housing so that the conductors thereof are directly connected to the respective contacts, or in the alternative the housing 41 can be provided with a printed circuit board mounted interiorly thereof, which printed circuit board possesses an appropriate conductive trace pattern thereon for connecting all of the contacts in the various recesses to the respective individual conductors associated with the distribution cable 31. Since the internal connections between the recess contacts and the distribution cable can be accomplished using many different conventional techniques, further description thereof is believed unnecessary.

Figure 13:
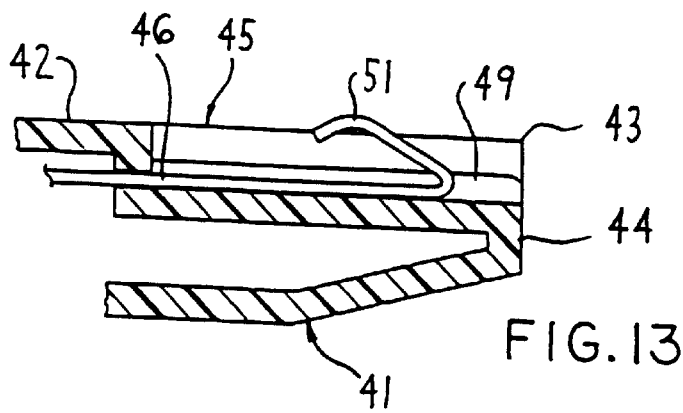
FIG. 13 is a fragmentary sectional view taken along 13—13 in FIG. 11.

As illustrated by FIGS. 11–13, the walls of the housing 41 which define each recess 45 preferably include a series of parallel insulative ribs 49 which extend in parallel relation inwardly from the side wall 44 and project toward the abutment wall 42, with each pair of ribs accommodating between one of the contacts 46 so as to maintain adjacent contacts in spaced and insulated relationship from one another. Each contact also includes a resilient upper part 51 which, when in a relaxed or nondeflected condition, projects slightly outwardly beyond the outer surface of the respective abutment wall 42.

While the accompanying drawings illustrate the contact grouping 46 associated with only one of the recesses 45, it will be appreciated that this is solely for simplicity of illustration, and that each of the recesses 45 has a substantially identical contact group 46 associated therewith.

Figure 14:
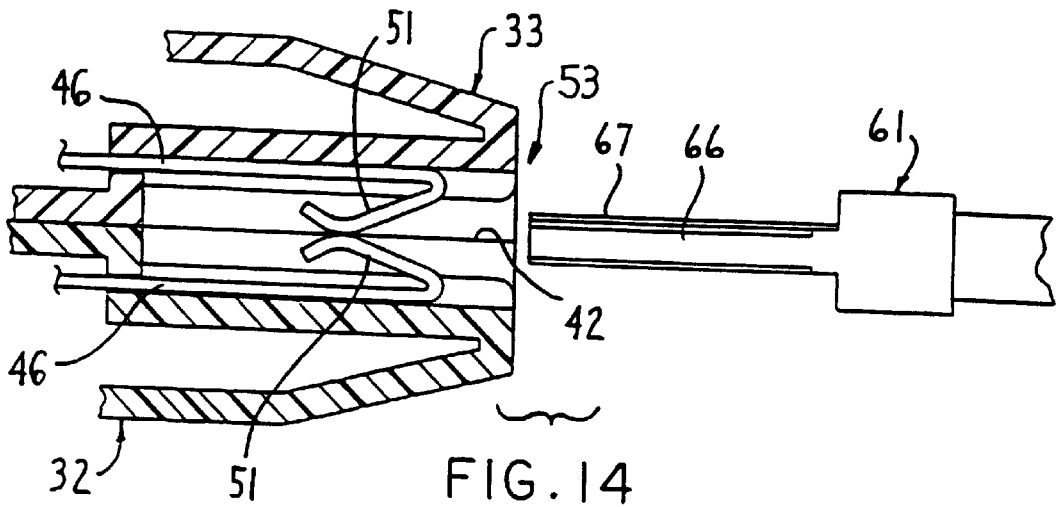
FIG. 14 is a view similar to FIG. 13 but wherein connector units are assembled together to show the engaged contacts associated with the access port, and additionally showing a tap-off plug disposed for insertion into the access port.
Figure 15:
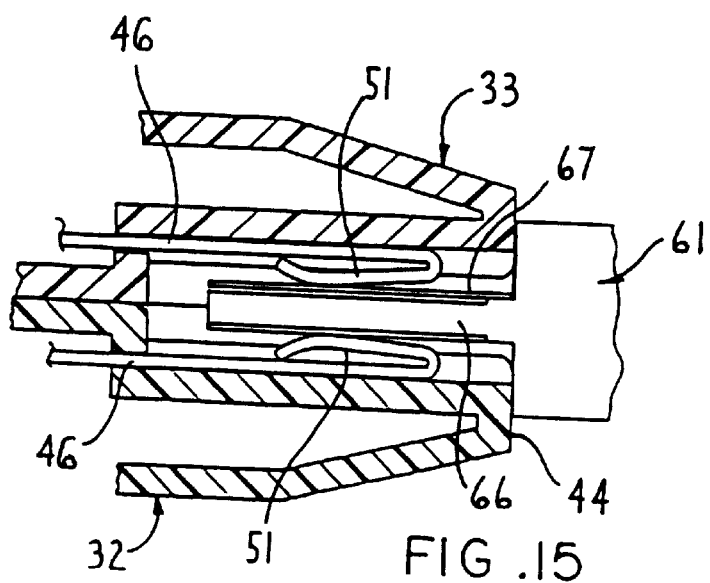
FIG. 15 is a view corresponding to FIG. 14 but showing the tap-off plug positioned in the access port.

When two of the main distribution modules 22 are to be connected together in series, then the connector units 32 and 33 as provided on adjacent ends of the two modules 22 are positioned in opposed overlapping relationship so that the abutting surfaces 42 thereon are disposed in directly opposed and abutting engagement with one another substantially as illustrated in FIGS. 8 and 14, whereupon the two connector units are then suitably fixedly secured, such as by a plurality of fasteners such as screws. This provides a fixed connector assembly 38 at the junction of the serially arranged modules 22, although it will be appreciated that each module 21 retains whatever flexibility is inherently possessed by the elongated distribution cable 31.

Figure 16:
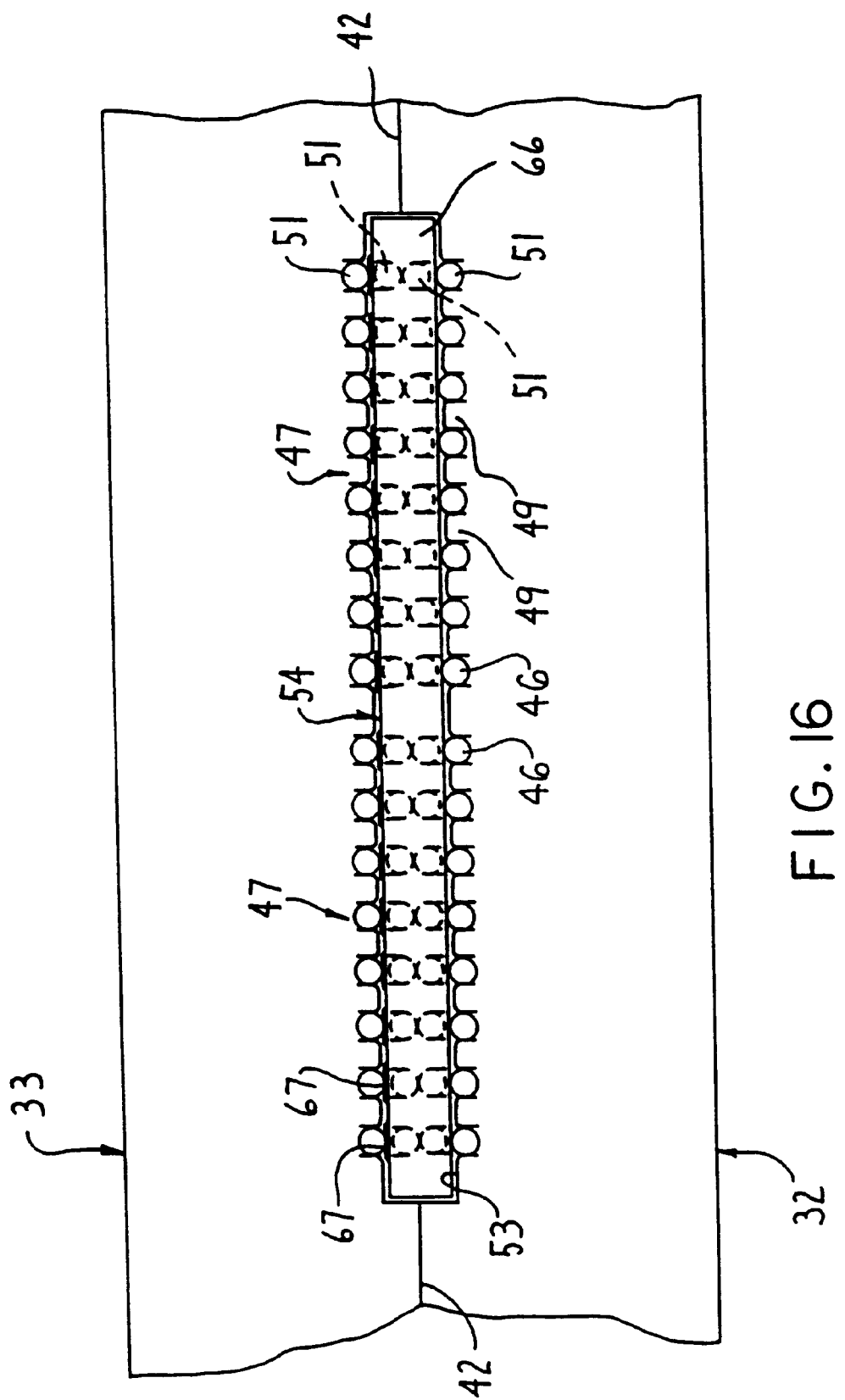
FIG. 16 is an enlarged view looking into the opened end of the access port and showing the contacts therein in solid lines when engaged with the tap-off plug, and additionally showing the contacts in dotted lines in their position prior to insertion of the access plug.

When the identical connector units 32 and 33 are disposed in opposed mating relationship and are fixedly connected together as illustrated in FIG. 8, the individual recesses 45 formed in the connector unit 32 are disposed in directly opposed relationship and mate up with the corresponding respective recesses formed in the other connector unit 33, which two opposed and cooperating recesses cooperate to define a generally blocklike chamber which is wholly enclosed except for the access opening 53 at one end thereof, which opening is in the side wall of the assembled housing. During the assembly of the connector units 32 and 33 together, particularly when the abutment faces 42 contact one another, this causes the outwardly protruding resilient parts 51 of the opposed contacts to directly and individually contact one another, thereby causing these opposed resilient contact parts 51 to be deflected inwardly into the respective recess so that the contacts associated with the contact groupings in the opposed recesses remain in resiliently biased engagement with one another substantially as illustrated in FIG. 14. These engaged contacts, however, are accessible through the access opening 53 defined in the side wall. Each pair of opposed and cooperating recesses 45, the opposed and engaged contact groups therein as illustrated in FIG. 14, and the access opening 53 associated therewith, cooperate to define a port or socket 54 (FIG. 16) for permitting access to the two telecommunication links defined by the engaged contact groupings of the respective port.

In this embodiment there are four access ports 54 (FIG. 8) disposed horizontally in sidewardly-spaced relationship along one side of the coupled connector units 32 and 33, and four additional such access ports 54 disposed horizontally in spaced relationship along the other side thereof. The connector 38 thus provides a total of eight such ports 54 each accessing a different grouping of two telecommunication links. This is graphically illustrated in the drawings, specifically FIG. 10, wherein the access ports 54 are designated 54-1 through 54-8. When not being used for either in-feed or tap-off purposes, each of these access ports 54 is preferably closed by means of a small closure plug (not shown) which is preferably constructed of an insulative material and fits partway into the access opening and can be snugly held therein for closing off the port. Such plug can be easily manually removed when desired.

Considering now the tap-off module 23, it is designed to plug into any one of the ports 54-1 through 54-8 as associated with any of the connector assemblies 38. This tap-off module 23 includes a plug or connector part 61 which is adapted for insertion into one of the ports 54. This plug part 61 has one end of an elongate flexible cable 62 coupled thereto, which cable at the other end has at least one jack, and in the illustrated embodiment there being two such jacks 63 and 64, mounted thereon. The cable 61 includes a plurality of conductors extending therethrough, specifically sixteen conductors (eight pairs) in the illustrated embodiment, thereby defining two telecommunication links. One of the links connects to the plug-in socket 65 associated with one jack 63, and the other link connects to the socket 65 associated with the other jack 64. These jacks 63–64 and the sockets defined therein are conventional, and cooperate in a conventional manner with the plug associated with the telecommunication cable which connects to a telephone, computer and the like.

As to the plug part 61 of the tap-off module, it includes a generally flat blade or plate 66 which projects outwardly from an enlarged head 69, whereby the blade 66 can be slidably inserted into the port or socket 54 to the extent that the head 69 seats against the housing of the connector assembly. The blade 66, on at least one side face thereof, has a grouping of contacts 67 which are illustrated as being formed as tracings, such as on a printed circuit board. The grouping of contacts or tracings 67 includes two subgroups, each containing eight contacts or tracings, with all of these tracings or contacts being generally parallel but sidewardly spaced apart.

When the blade 66 is slidably inserted into the access port 54, the blade resiliently deflects the opposed contact parts 51 and effects separation thereof as the blade is inserted therebetween. At the same time, however, the tracings 67 engage the contact parts 51 associated with only one side (either the top or the bottom) of the access port 54, whereas the opposite side of the blade engages the contacts on the opposite side of the access port, which blade is constructed of an insulative material and effectively opens this side of the telecommunication link. The tracings 67 preferably extend to the very end of the blade 66 so as to engage the contact parts 51 shortly before the blade causes the opposed contact parts 51 to separate from one another, thereby preventing any momentary disruption or break in the telecommunication link. The individual tracings are in turn connected to the individual conductors associated with the cable 62 so as to transmit one of the selected telecommunication links to the jack 63 and the other to the jack 64. These jacks in turn typically mount within openings provided in a conventional face plate 58 as illustrated in FIG. 17, which plate 58 typically mounts on the side face of the panel at any user convenient location, such as in the vicinity of worksurface height.

The tap-off module 23 can also be vertically inverted so that the tracings thereof are in a downwardly facing position such that, when inserted into the access port 54, they make contact with the lower contact grouping in the port, and in such case the upper contact group is engaged with the insulative plate 66 and are effectively deactivated or dead. The selection of the orientation of the plug part 61 for insertion into the access port 54 is determined based on the location of the input to the communication system (i.e., the input from the closet). In this regard, referencing FIGS. 17 and 18, if the input from the wiring closet connects to the serially-connected distribution modules 22 rightwardly from the connector assembly 38 to which the tap-off module is being connected, such designation of the input being indicated by arrow A, then the plug part 61 is oriented so that the tracings 67 face upwardly so that insertion of the plug part causes the tracings to engage the upper contacts, whereby the two telecommunication links are supplied to the jacks 63 and 64. These two telecommunication links themselves have defined positions in the access port 54, one being on the left side and designated L1, the other on the right side and designated L2, these being respectively for "voice" and "data" for example. The visible head of the plug part can similarly be defined with V and D designations which correspond to the two subgroups of tracings defined on the face of the blade, and in this instance the cable 62 is preferably defined by two distinctly different cable parts 62A and 62B, which parts can be of different colors for example, with these two cable ports being connected respectively to the jacks 63 and 64. When the input to the system is rightwardly as indicated by the arrow A, then the plug part 61 is oriented such that the arrows 59 thereon are directed toward the input of the telecommunication links (i.e., in the direction of the arrow A) thus causing the tracings 67 to be uppermost and engaged with the upper contacts associated with the connector unit 32 so that these two telecommunication links L1 and L2 are respectively used as the V and D links for respective connection to the jacks 63 and 64. The installer thus knows to install the jack 63 in the "voice" opening of the face plate 58, and the jack 64 in the "data" opening of the face plate.

However, if the input of the telecommunication links is connected to the series of distribution modules 22 leftwardly of the specific connector assembly 38, such as indicated by arrow B, then the tap-off module 23 is vertically rotated 180° so that the arrows 59 now point in the direction of arrow B, and this again results in V and D designations thereon facing upright and being visible to the installer, except that the V and D designations are now respectively associated with the cables 62B and 62A. This informs the installer that the jack 64 must now be positioned within the "voice" socket of the face plate 58, and the jack 63 positioned within the "data" socket of the face plate. At the same time, since the tracings 67 face downwardly, they thus contact the lowermost contact grouping, namely the grouping associated with the connector unit 33, when the plug part is inserted into the access port. The upper grouping of contacts engages the insulated plate 66 so that the links L1 and L2 are dead downstream of the tap off. Since the downwardly facing orientation of the tracings 67 causes the leftward subgroup of tracings as connected to the cable 62B to engage the contacts associated with the links L1, which link can be the designated "voice" link if desired and as explained above, this enables the tap-off module to be plugged into the port 54 in either an upwardly or a downwardly facing orientation, depending upon the location of the port 54 relative to the inlet or in-feed, while at the same time maintaining the identification and orientation of each individual link so as to permit proper external hookups thereto.

In order to connect the communication system of this invention to the telecommunication closet, the system includes the in-feed module 24 which preferably connects to any one of the connector assemblies 38 as disposed either throughout the plurality of series-connected distribution modules 22, or at one free end thereof. This in-feed module 24 includes a relatively thin and flat hollow housing 71 (FIG. 19) which connects to one end of a main communication supply cable 72, which cable is provided with a remote end for connection to an elongate cable which extends from the telecommunication closet. This main cable contains therein a plurality of conductors which define a predetermined number of communication links corresponding to the number of links in the modular communication system 21, this being 128 conductors (i.e., 64 pairs) cooperating to define sixteen telecommunication links in the illustrated embodiment.

The hollow housing 71 is adapted to be fixedly secured or sandwiched between the opposed abutment walls 42 defined on the connector units 32 and 33. For this purpose, the hollow housing 71 has generally parallel top and bottom walls 73, each of which has eight blocklike recesses 74 formed therein, four along each side thereof, whereby the eight recesses in terms of their size and location identically correspond and mate with the eight recesses 45 formed in the abutment wall 42 of each connector unit 32 and 33. Each recess 74 also mounts therein a contact grouping 75 which in the illustrated embodiment includes sixteen contacts which define two telecommunication links each being defined by eight separate contacts, whereby the contact grouping 75 is structurally and functionally identical to the contact grouping 46 described above. The individual contacts of each contact group 75 as associated with each recess 74 are all connected internally of the housing 71 to one of the conductors associated with the cable 72.

The in-feed module 24 is secured to the modular communication system by positioning the housing 71 in abutting contact between the opposed abutment surfaces 42 on the connector units 32 and 33, and then fixing these three housing units together, such as by screws. This results in forming eight upper access ports 54 between the upper connector unit 32 and the housing 71, four of these access ports being along each side of the assembly, and each of these access ports being connected to and accessing two telecommunication links which are distinctly different from the telecommunication links which are provided at the remaining seven upper access ports.

A further set of eight lower access ports, four on each side, are provided between the lower connector unit 33 and the bottom side of the housing 71. This lower set of access ports is in all other respects identical to the upper set, and each port of the lower set also accesses two telecommunication links which are distinct from the telecommunication links which are available through the remaining seven lower access ports. However, each upper access port and a corresponding one of the lower access ports (normally the lower access port which is disposed directly vertically below the corresponding upper access port) each access the same two telecommunication links, such being illustrated by the link designations L1 and L2 in FIG. 19.

Figure 19:
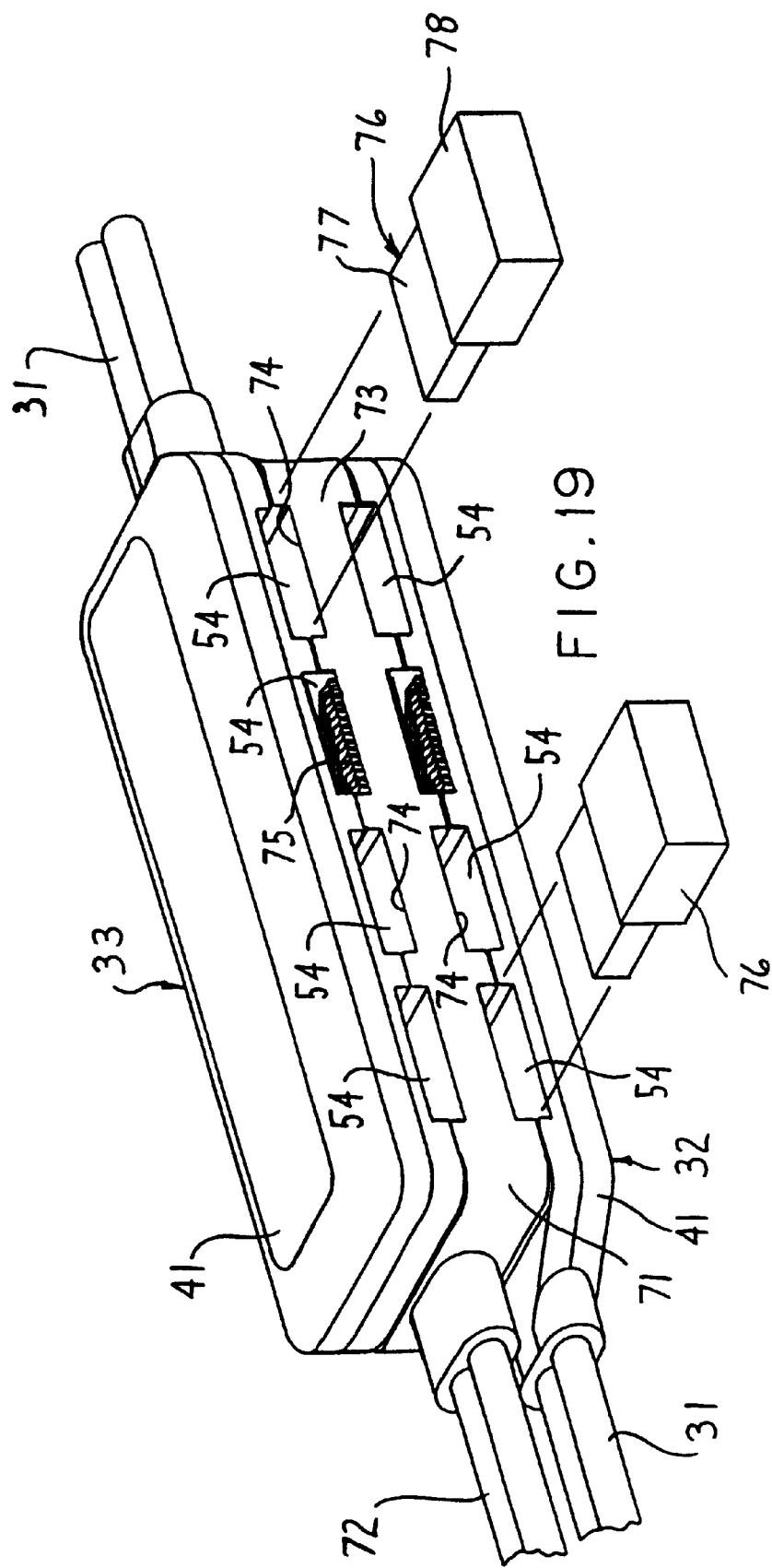
FIG. 19 illustrates an in-feed module as connected between the connector units of adjacent distribution modules for supplying a plurality of telecommunication links to the system.

When the in-feed module is connected between the connector units 32 and 33 as illustrated by FIG. 19, then one of each pair of identical access ports has a deactivating plug 76 inserted therein, which plug includes a thin blade 77 constructed of an insulative material which is slidably inserted into and effects separation of the opposed resilient contact parts so as to effect deactivation of the telecommunication link therebetween. This selection as to the positioning of the deactivating plug 76 is made by the installer. For example, referencing FIG. 19, if the installer wants links L1 and L2 to extend leftwardly, then the installer inserts a deactivating plug 76 into the uppermost port, whereby these L1 and L2 are deactivated at this point and cannot extend rightwardly. Similarly, if the installer wants the links L3 and L4 to project rightwardly, then the installer inserts an insulating plug 76 into the lowermost port so that the links L3 and L4 are prevented from extending leftwardly. This same determination is made with respect to all eight groupings of links such that an insulating plug is inserted into each cooperating upper and lower pair of access ports. The remaining eight access ports, namely those which do not have a deactivating plug therein, are normally provided with an outer cover so as to close off the port.

If desired, one or more of these remaining ports, rather than receiving covers, can have a tap-off module 23 plugged therein, which plug-in operation will be the same as described above. When a tap-off module 23 is plugged into one of the access ports of the cooperating pair associated with the in-feed module, then the other access port of the pair is provided with a deactivating plug 76 therein.

Referring now to FIGS. 20 and 21, there is illustrated a further variation of the modular communication system described above, in which variation corresponding parts are designated by the same reference numerals with the addition of a prime (') thereto.

In this variation, the main communication module 22' is constructed the same as the module 22 described above except that the end connectors 32' and 33', which again are identical, are of a generally pyramidal construction terminating in a free end which is of generally square cross section and defines thereon an endwise facing abutment surface 42'. This latter surface has eight recesses 45' formed therein each containing a contact grouping which defines two telecommunication links. In this variation two of the recesses 45' open inwardly in sidewardly-spaced relationship from each of the four sides of the housing. In all other respects the two connector units 32' and 33' again join together in the same manner as described above so as to define eight access ports, two on each side of the connector assembly (i.e., two accessible from each side, two from the top, and two from the bottom).

Similarly, the in-feed module 24' has a housing 71' which again sandwiches between the abutting faces 42', with each side of the in-feed housing 71' having eight contact-containing recesses, two accessible through each side edge. When the housing 71' is sandwiched between the connector units 32' and 33', there is thus defined two sets of eight access ports, with one access port of each set being identical (in terms of connecting to the same telecommunication links) as the longitudinally aligned access port of the other set, in the same manner as described above relative to FIG. 19.

With the arrangement of FIGS. 20 and 21, the same number of access ports are provided, only some of these are now accessible from the top and bottom, rather than only from opposite sides as in the earlier variation. This arrangement of FIGS. 20 and 21, however, always ensures that the adjacent distribution modules 22' are properly aligned and connect together since the connector units 32' and 33' have no "up" and "down" or "right" and "left" orientation.

As to the connector units 32 and 33 provided on the distribution module 22, since it is possible that the opposed units 32 and 33 might both be uppermost or lowermost when it comes time to join them together, this only requires that one module 22 in its entirety be rotated 180° about its longitudinal axis, and this results in the opposed units 32 and 33 again assuming a top and bottom relationship so as to permit the units to be connected together.

Thus, the distribution modules 22 or 22' are nonhanded in that they do not have right and left characteristics, and this greatly simplifies the overall installation of the communication system on the wall panels, as well as the connecting of adjacent distribution modules 22 or 22' together. In fact, the modules 22 or 22' can be positioned within or loosely mounted on the bottom of the panel at the factory if desired.

Figure 23:
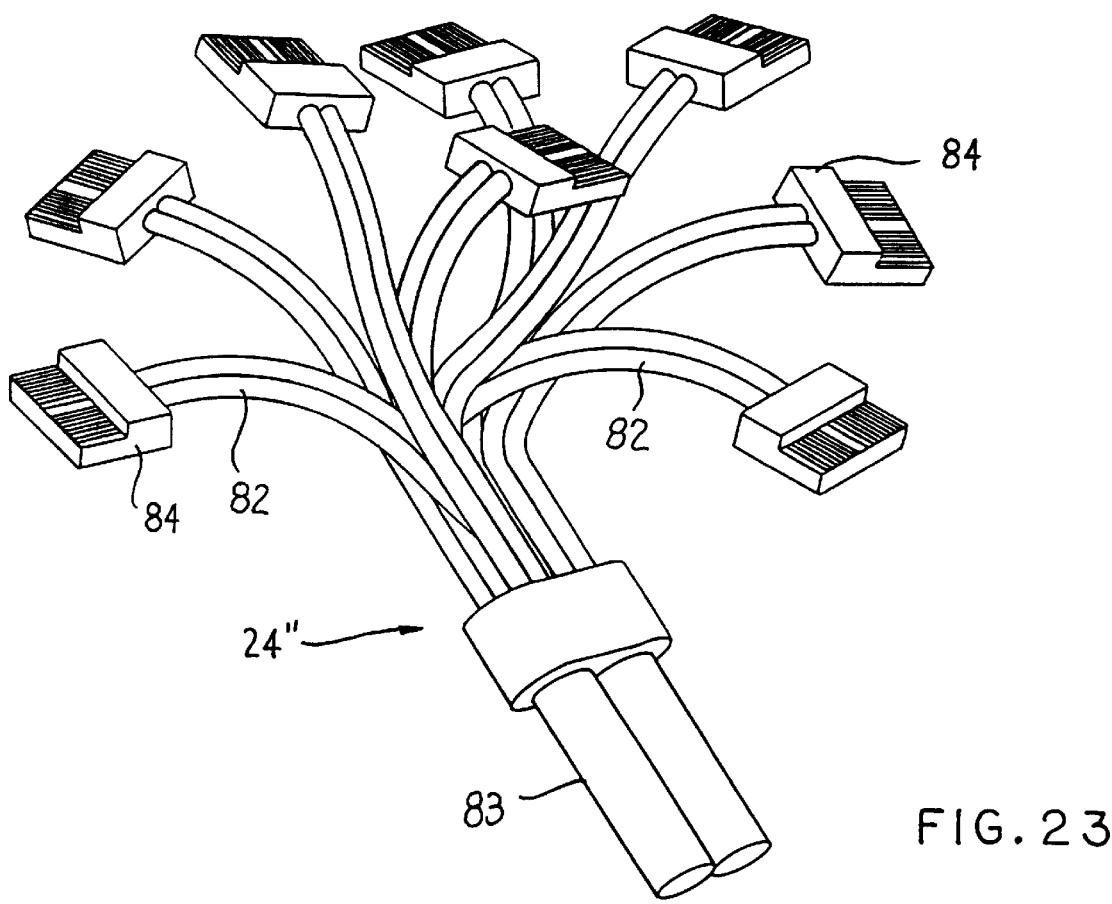
FIG. 23 is a perspective view which illustrates another variation of an in-feed module.

Referring now to FIG. 23, there is illustrated a modified in-feed module 24" which can be utilized so as to plug directly into the connector assembly 38 (FIG. 8) or 38' (FIG. 19). In this modification, the in-feed module 24" terminates in eight flexible cables 82 which project a limited distance beyond a sheath 83, and each of these cable 82 in turn connects to a port connector 84. Each cable 82 defines therein sixteen conductors which define two telecommunication links, and the port connector 84 in turn defines thereon sixteen traces which also define the same two links. In fact, the cable 82 and port connector 84 are identical to the cable 62 and plug 61 associated with the tap-off module 23 described above. The eight port connectors 84 are appropriately plugged into the eight ports 54 defined in the connector assembly 38 (FIG. 8) or 38' (FIG. 19), thereby supplying all eight telecommunication links to the system. Each of the port connectors 84 is manually oriented by the installer in the appropriate direction so as to determine whether the telecommunication link defined by the port connector is to extend rightwardly or leftwardly from the connector assembly.

Since the plurality of main distribution modules 22 which are serially interconnected by the connector assemblies 38 define an elongate arrangement which typically terminates in a connector unit 32 at one end and a connector unit 33 at the other end, these terminating connectors are preferably protected by providing each with a suitable end cap, which end cap can be the housing 41 which is fastened to the terminating connector unit so as to close off the recesses and the contact groupings thereof. This end housing 41 need not be provided with contacts associated with the recesses thereof.

In addition, while FIGS. 19 and 21 illustrate the in-feed module connected to the system at an intermediate connection between adjacent distribution modules 22 or 22', nevertheless in some instances it may be necessary or desirable to connect an in-feed module to one end of the system, such as at the terminating connector unit 32 or 33 as provided at the free end of the system. In such case, the in-feed module shown in FIGS. 19 or 21 can again be sandwiched between the terminating connector unit and the end cap described above. Alternatively, a modified in-feed module can be provided which, instead of being provided with a two-sided head as illustrated by FIGS. 18 and 20, can instead be provided with a one-sided head identical to the connector unit 32 and 33, whereby this in-feed module connects directly to the terminating connector unit 32 or 33 provided at the free or terminating end of the system.

For example, and referring to FIG. 22, there is illustrated the connector unit 33' at the free end of the system, which connector unit can have an end cap 81 secured thereto. Alternately, if in-feed is desired at this location, the end cap can be constructed generally similar to the housing 71' expect that it will be provided with eight recesses and associated contact groupings on only side thereof, the other side being closed, and will have the main supply cable 72' coupled thereto for in-feeding the plurality of telecommunication links to the system.

Reference will now be made to FIGS. 24–50 which illustrate a further and preferred variation of the modular communication system of this invention. In this embodiment, the main distribution module 122 includes connector units 132 and 133 joined to opposite ends of the flexible distribution cable 131 which defines plural (i.e. sixteen) telecommunication links as described above relative to cable 31. The preferred connector units 132 and 133 are similar to the connector units 32 and 33 illustrated in FIGS. 1–8 above although the access ports of the preferred embodiment as provided for in-feed and tap-off of communication links are arranged in a single row of eight access ports accessible from both sides of the connector assembly.

This embodiment further includes an in-feed module 124 formed similar to the in-feed module 24 of FIG. 23 in that module 124 also includes a plurality of connector plugs for engagement with the ports of the connector assembly 138. In addition, the connector plugs of both the in-feed module 124 and tap-off module 123 are standardized and utilized in conjunction with spacer inserts (described hereinafter) which are placed within selected access ports to break the electrical circuit in one direction as occurs in the above-described embodiments.

It should be understood that the component parts of this preferred embodiment (FIGS. 24–50) are similar to those previously described and accordingly, the same reference numerals are used although incrementally increased by 100 to differentiate the further embodiments described herein. For example, the different embodiments of the main distribution module are identified by reference numerals 22, 122, 222, etc.

Figures 24, 25:
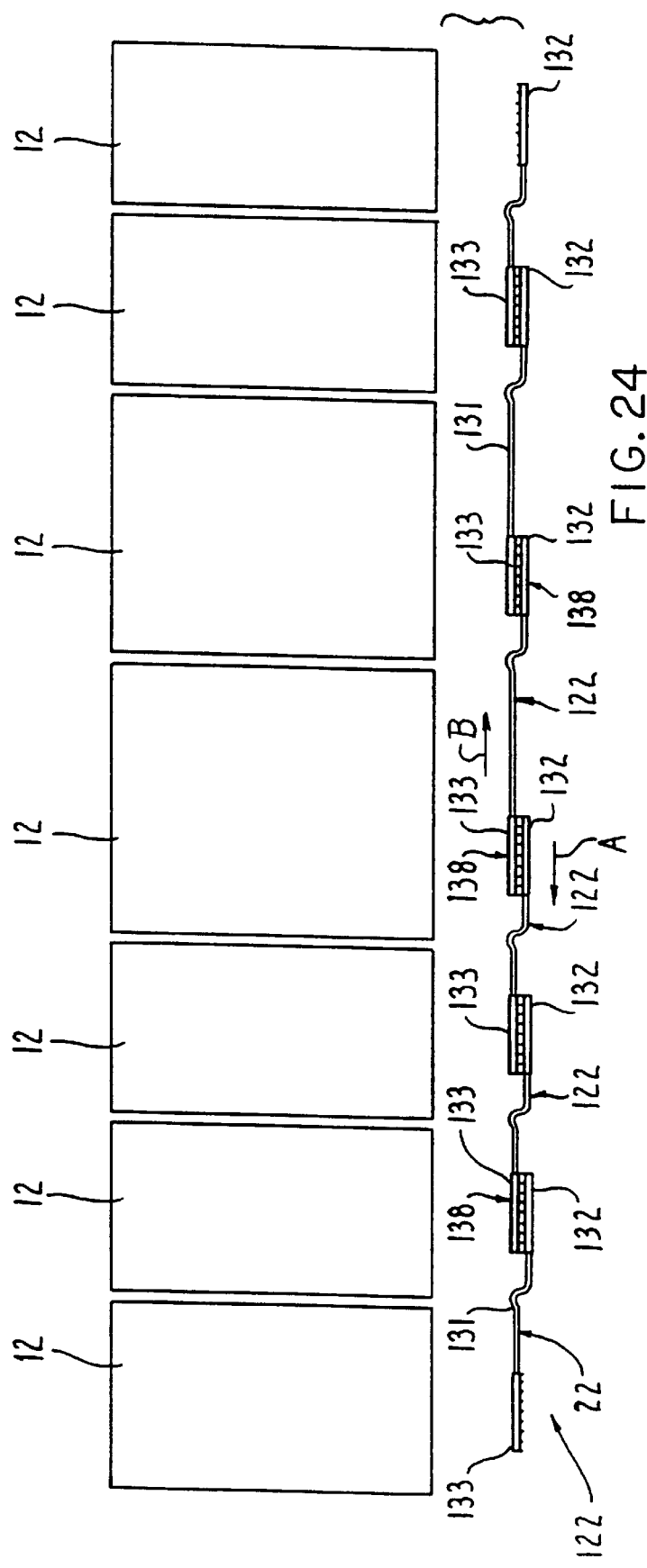
FIG. 24 is a diagrammatic side elevational view showing several furniture components (i.e. wall panels) and associated main distribution modules of a preferred embodiment of the improved modular communication system.
FIG. 25 is a diagrammatic plan view of the main distribution modules of the embodiment illustrated in FIG. 24.

More specifically, the preferred embodiment includes a predetermined number of main distribution modules 122 which are serially-connected as can be seen in FIGS. 24 and 25. In particular, the modular communication system 121 is illustrated diagrammatically with the main distribution modules 122 enlarged and removed from the associated furniture panels or components 12 for illustrative purposes.

Each main distribution module 122 includes elongate connector units 132 and 133 at opposite ends of the elongate distribution cable 131. Each individual main distribution module 122 is, in the illustrated embodiment, associated with one of the panels 12 and is securable within the raceway 14 thereof (not illustrated in FIGS. 24 and 25). To facilitate assembly of the furniture components 12, each main distribution module 122 preferably is offset in the raceway a standardized distance such that one connector unit 132 projects out of the raceway of the associated panel 12 and into the raceway of the serially adjacent panel 12. The standardized offset therefore facilitates installation of varying size furniture components 12 by positioning the connector units 132 and 133 within the raceway intermediate the ends of the respective wall panels and away from any support structures which may be located proximate the edges thereof. During installation of the panels 12, the main distribution modules 122 are serially-connected one with the other so as to electrically connect the groupings of telecommunication links, i.e. the voice and data links, for transmission of signals longitudinally along the length of the panels 12.

With the preferred embodiment of the invention the in-feed module 124 may be readily connected at a selected location along the length of the serially-connected main distribution modules 122, for example at the center panel as illustrated diagrammatically in FIG. 25. Similar to the embodiments previously described, the in-feed module 124 permits selected communication links to be directed to a particular workstation either leftwardly or rightwardly as indicated by respective reference arrows A and B so as to thereafter permit selective tapping-off of the voice and data links to adjacent workstations by tap-off modules 123.

Figure 26:
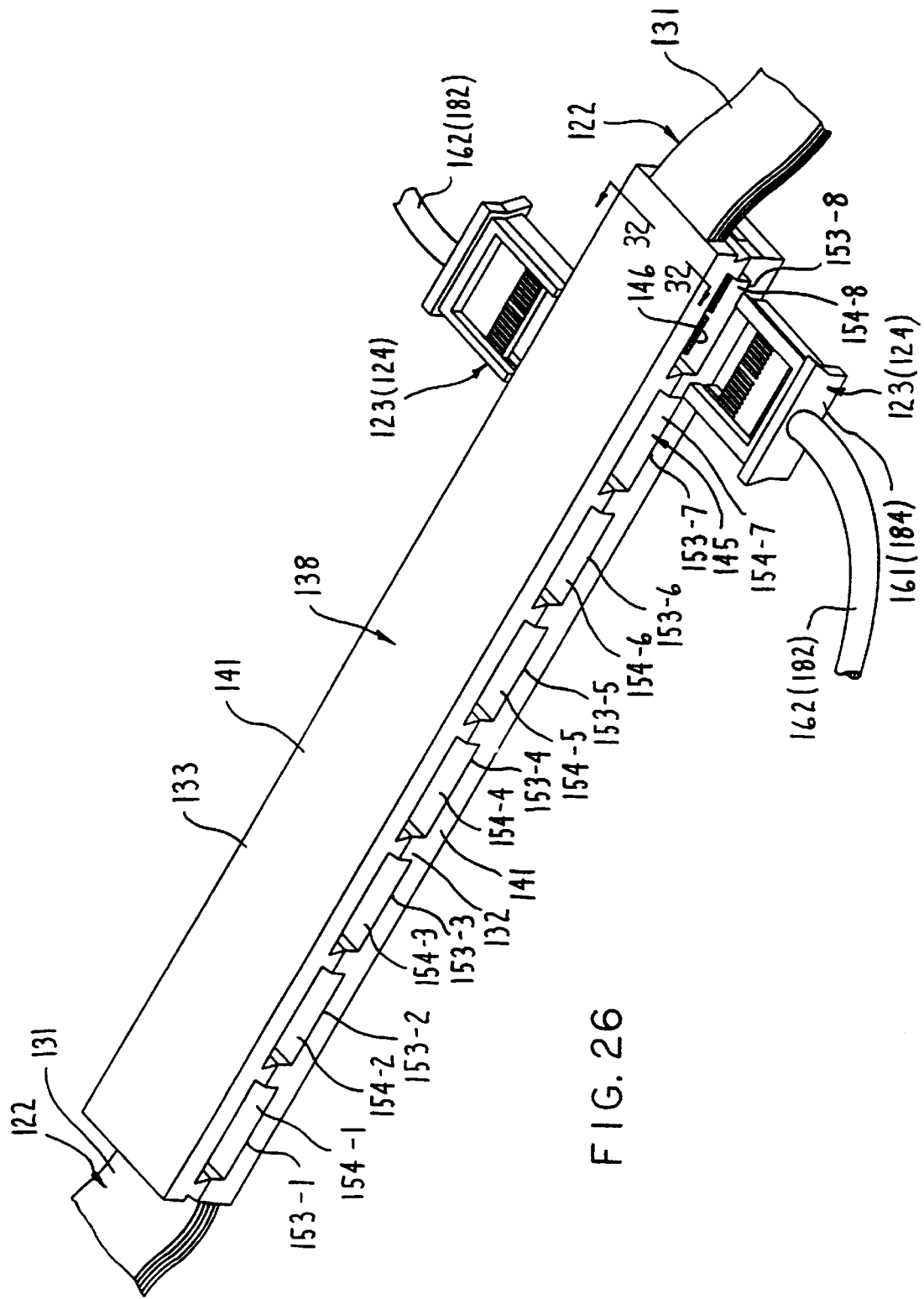
FIG. 26 is an enlarged partial perspective view illustrating a connector assembly of FIG. 24.
Figure 27:
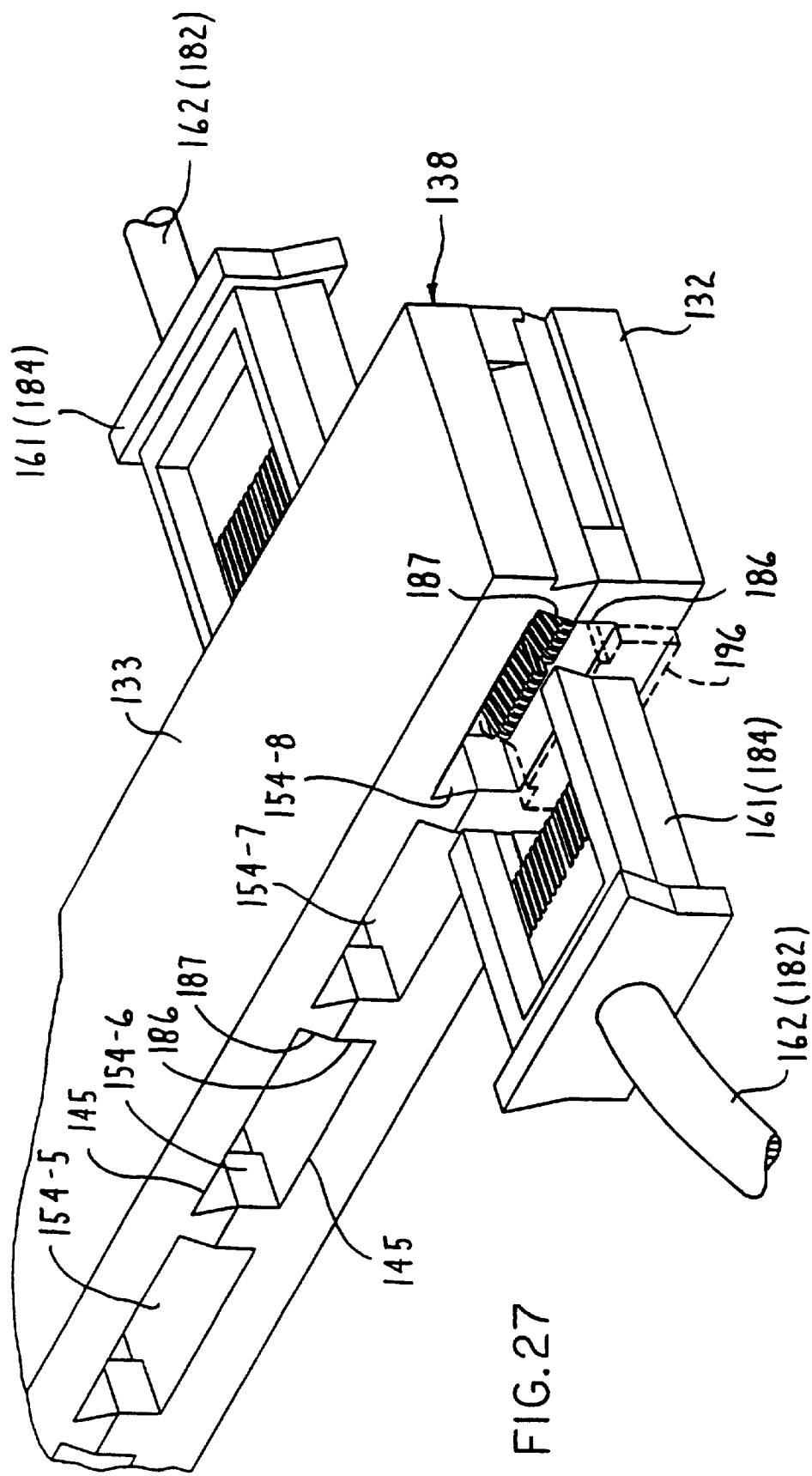
FIG. 27 is an enlarged partial perspective view of one end of the connector assembly of FIG. 26 as viewed from the front side.
Figure 28:
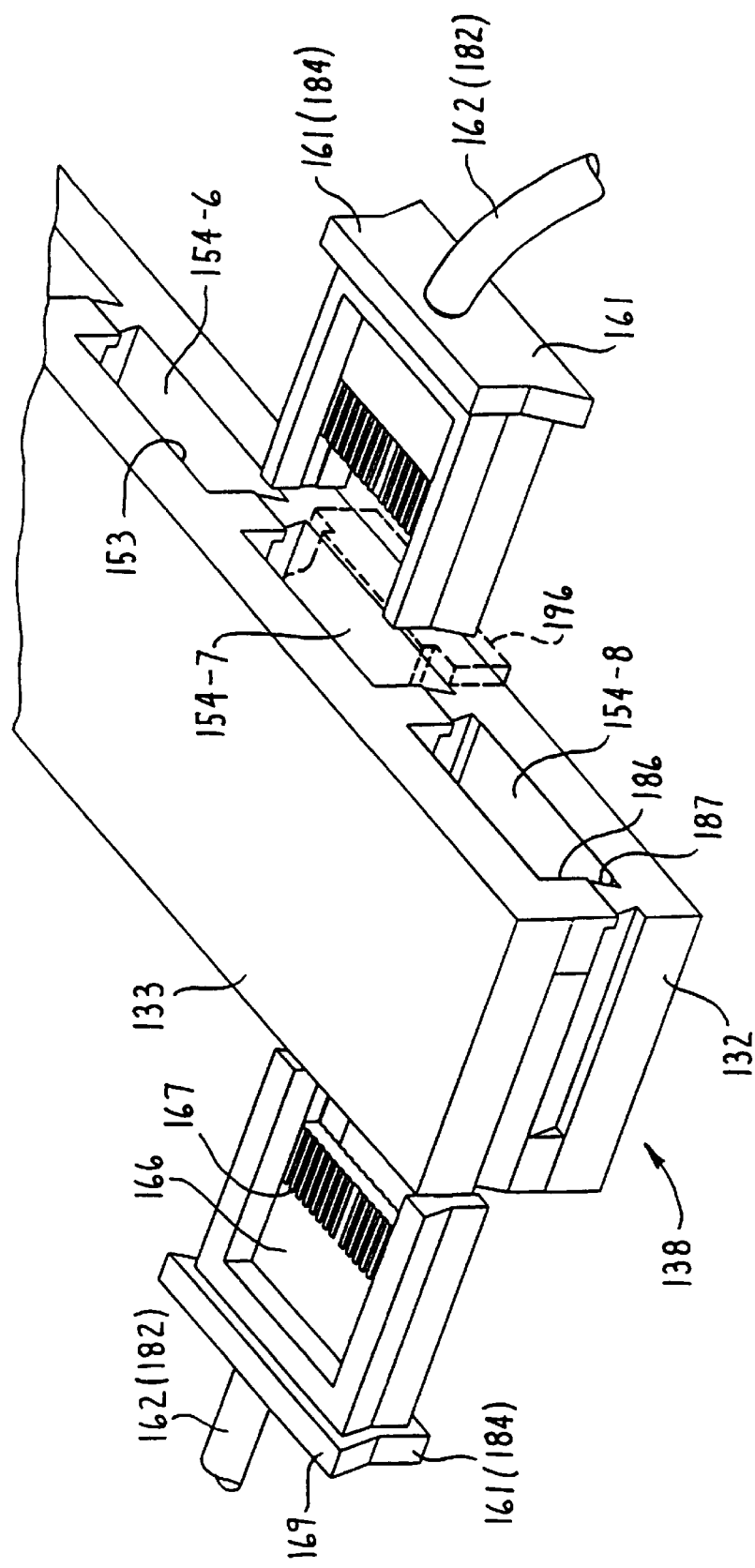
FIG. 28 is an enlarged partial perspective view of the connector assembly of FIG. 26 as viewed from the backside.

Referring to FIGS. 26–28, the connector unit 132 of one main distribution module 122 is serially mated to an opposing connector unit 133 of a serially adjacent main distribution module 122. When mated together, the opposing connector units 132 and 133 define a connector assembly 138 having a plurality of, preferably eight, access openings 153-1 to 153-8 through both side walls 144 of the connector assembly 138. The access openings 153-1 to 153-8 are part of access ports 154-1 to 154-8 which are each adapted to receive therein a plug part 161 of one of the aforesaid tap-off modules 123 or, alternatively, a connector part 184 of the in-feed module 124.

The lower connector unit 132 includes an elongated platelike housing 141 (FIGS. 29–30) having an upward facing abutment surface 142. The housing 141 defines a plurality of longitudinally-spaced recesses 145 which open laterally through both of the opposite side walls 144 and which also open upwardly through the abutment surface 142. In this preferred embodiment, eight such recesses 145 are provided which are arranged longitudinally in a lengthwise row along each of the connector units 132 and 133. To accommodate greater or lesser numbers of workstations, the number of recesses 145 and if necessary, the length of the housing 141 may be increased or decreased to vary the number of access ports 154 defined thereby.

Figure 29:
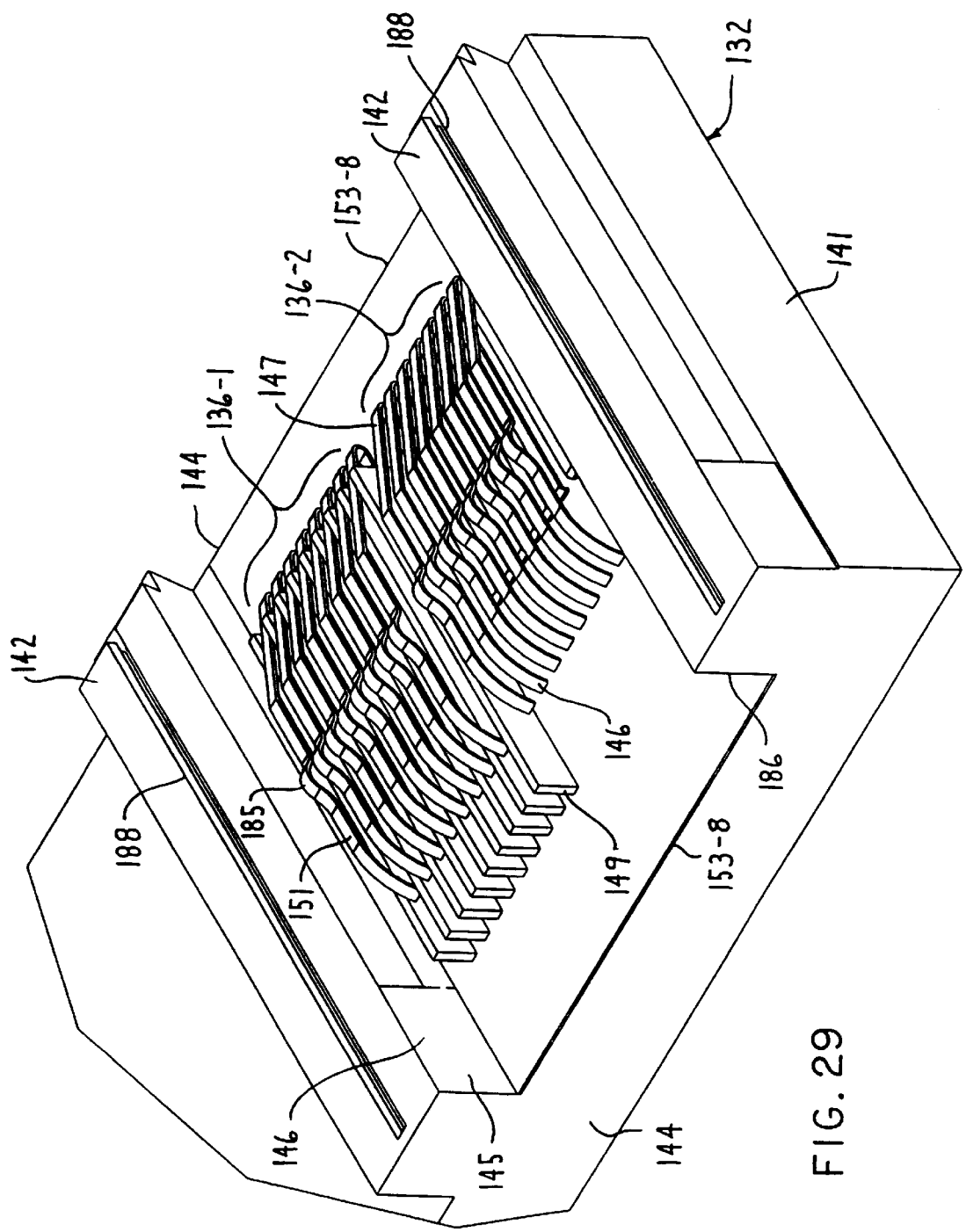
FIG. 29 is an enlarged partial front perspective view of one connector unit of the connector assembly of FIG. 28.

Referring to FIG. 29, each recess 145 has positioned therein a plurality of resilient electrical contacts 146, preferably sixteen, which define two subgroups of conductors 147, i.e. the two telecommunication links 136-1 and 136-2. Here again, one of the subgroups 147 defines a telecommunication link for voice and the other subgroup 147 adjacent thereto defines a telecommunication link for data. Since access openings 153-8 are provided at opposite ends of the recess 145, instead of only at one end as described with respect to the embodiment of FIGS. 1–8, the resilient contacts 146 are accessible from both sides of the connector unit 132 for selective connection to the tap-off and in-feed modules 123 and 124 respectively.

In addition, each recess 145 preferably includes a series of insulative ribs 149 in parallel relation which each are accommodated between pairs of the contacts 146. A number of these ribs 149 are shown removed for clarity. The electrical contacts 146 preferably have a U-shape, the resilient parts 151 of which are cantilevered above a surface of the access port 154. The resilient upper part 151 of each contact 146 also includes an arcuate or dimple portion 185 which projects slightly outwardly above the respective abutment surface 142 when in the relaxed nondeflected condition to facilitate contact with the other connector unit 133 being mated thereto. While FIG. 41 and the accompanying drawings only depict the electrical contacts 146 provided in one of the eight recesses 145, this is done solely for simplicity of illustration, and it should be understood that each recess 145 is provided with substantially identical groups of contacts 146 that preferably define the voice and data links.

Figure 30:
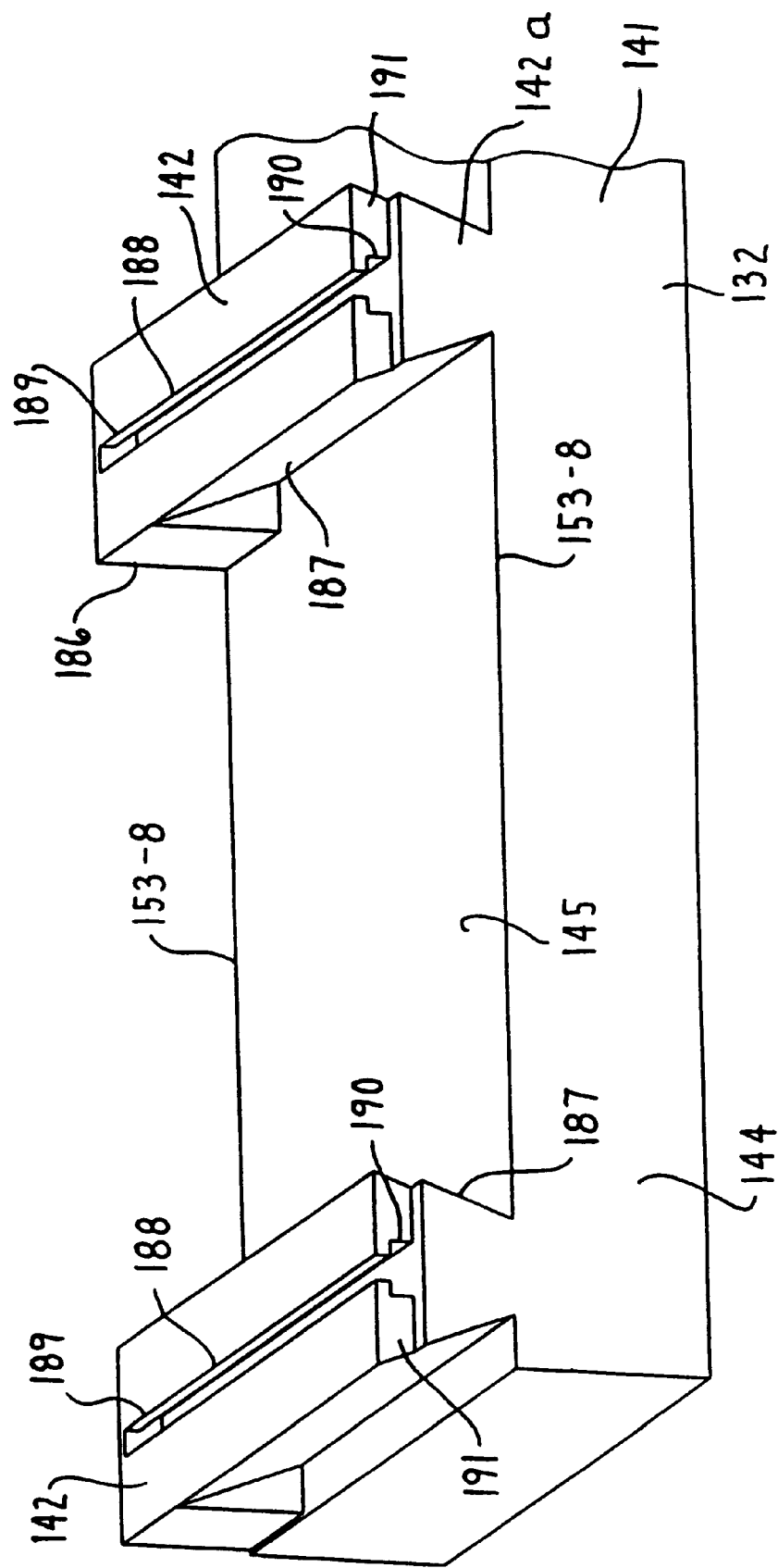
FIG. 30 is an enlarged partial rear perspective view of the connector unit of FIG. 29 with the electrical contacts removed.
Figure 31:
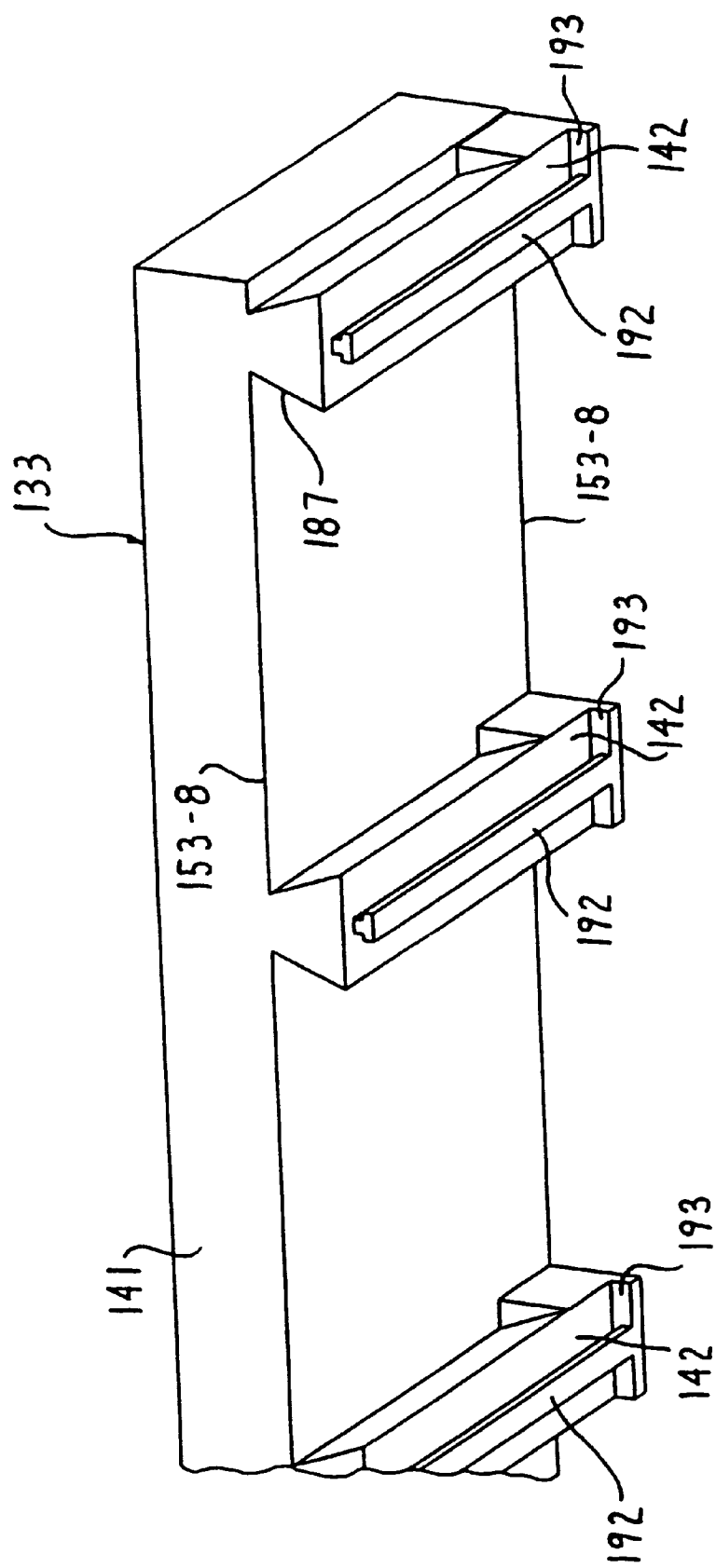
FIG. 31 is an enlarged partial perspective view illustrating an upper connector unit of the connector assembly of FIG. 26.

Referring to FIGS. 29–31, to facilitate correct orientation of the plug parts 161 of the tap-off modules 123 or the connector parts 184 of the in-feed module 124 upon insertion through the access openings 153, the recess 145 includes a portion 186 of rectangular cross section which defines the access opening 153 at one end of the recess 145. The recess 145 also includes a portion 187 of upwardly and inwardly converging trapezoidal cross section which defines the opposite access opening 153. The trapezoidal portion 187 extends across a majority of the width of the recess 145 before merging into the rectangular portion 186.

The recesses 145 of the connector unit 132 are formed substantially the same as the connector unit 133, such that when the connector units 132 and 133 are mated together, the rectangular portion 186 of one connector unit cooperates with the trapezoidal portion 187 of the other connector unit, and vice versa. As shown in FIG. 27, the cooperating rectangular and trapezoidal portions 186 and 187 define a shape for the access opening 153 which is symmetrical relative to a vertical axis. The access opening 153, however, on the other side of the connector assembly 138 as shown in FIG. 28 also has the same shape although it is inverted 180° about a horizontal axis extending longitudinally along the connector assembly. Thus, each access opening 153 provides access to a respective socket 154-1 to 154-8, as defined by the recesses 145, and is shaped to accommodate a "keyed" tap-off module 123 or in-feed module 124 for insertion therein in a predetermined orientation. The specific structure and function of the keying is discussed hereinafter with respect to the specific structures of the tap-off and in-feed modules 123 and 124.

To facilitate mating of the connector units 132 and 133 one with the other, a tongue and groove arrangement preferably is provided as the fastening method. Referring to FIGS. 30 and 31, the connector unit 132 (as viewed from one side) includes a transverse slot 188 which is formed in the housing 141 and is open along its length outwardly through the abutment surface 142. The transverse slot 188 extends between a closed end 189 and an open end 190 and is disposed in a housing abutment wall 142a which defines one side of the recess 145. This transverse slot 188 is provided with an inverted T-shaped cross section, and the open end 190 terminates at an inwardly recessed shoulder 191.

The other connector unit 133 (as viewed from the other side in FIG. 31) includes a transverse tongue 192 which has a T-shaped cross section corresponding to the cross-section of the transverse slot 188. This tongue projects downwardly from the abutment surface 142. The transverse tongue 192 terminates at an abutment wall 193 and is dimensioned such that when the transverse tongue 192 is inserted into the transverse slot 187 laterally through the open end 190, the recessed shoulder 191 of the lower connector unit 132 abuts and seats against the abutment wall 193 of the mutually adjacent connector unit 133 whereby the connector units 132 and 133 are mated and fixedly secured together.

Figure 32:
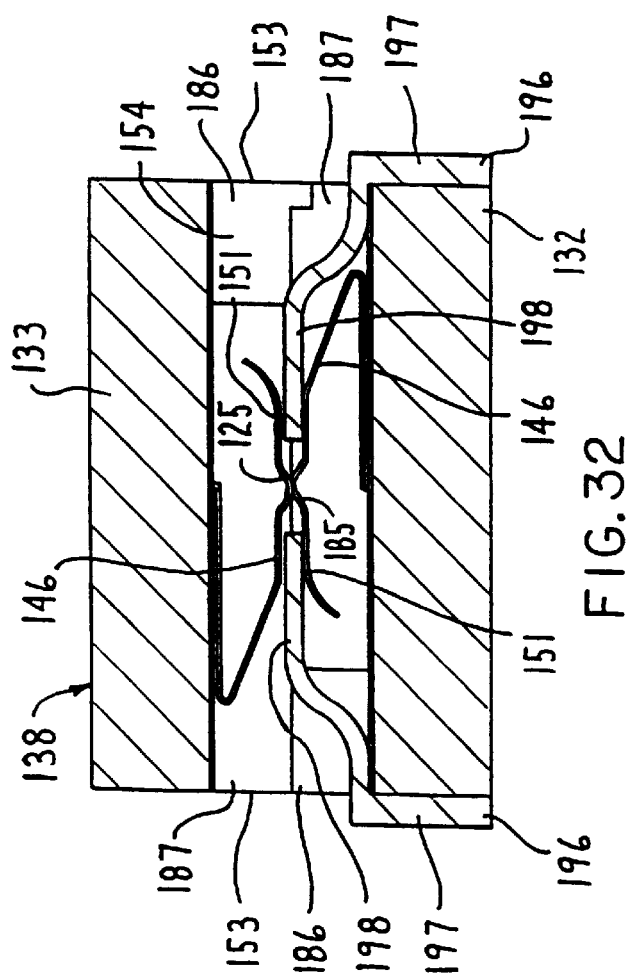
FIG. 32 is a side cross sectional view of the connector assembly of FIG. 26 illustrating the interior of an access port.

Referring now to FIG. 32, when the connector units 132 and 133 are connected one with the other, the arcuate portions 185 of the respective resilient parts 151 of the electrical contacts 146 directly and individually press one against the other in resiliently biased engagement to complete an electrical circuit between the electrical contacts 146 of the connector unit 132 and the contacts 146 of the connector unit 133. In particular, the mutually adjacent arcuate portions 185 of the contacts 146 of the connector units 132 and 133 remain in resiliently biased engagement. When in this contacting state, the contacts 164 are in a pass-through condition for the passage of telecommunication signals through the main distribution modules 122.

Figure 33:
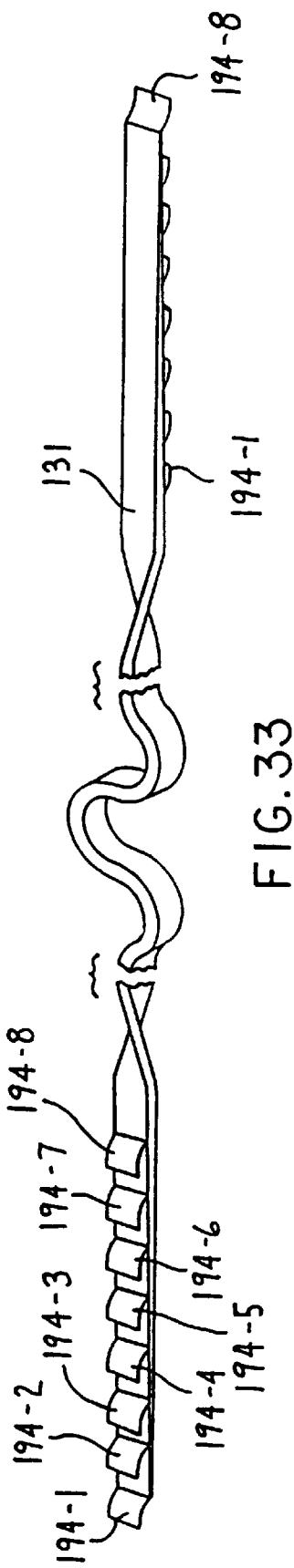
FIG. 33 is a perspective view of a preferred embodiment of an elongate distribution cable.

As illustrated in FIGS. 26 and 33, each main distribution module 122 includes a predetermined length of the elongate distribution cable 131 which is connected at its opposite ends to the respective connector units 132 and 133. The distribution cable 131 may be formed of a plurality of layers of substantially flat ribbon cable. Each layer of ribbon cable is provided with a sufficient number of parallel wires or conductors so as to define one or more communication links. While FIG. 26 diagrammatically illustrates four layers of ribbon cable, the preferred number of layers is eight, with each ribbon cable layer carrying two communication links, and which number of cable layers corresponds to the number of access ports 154 in the connector assembly 138.

Each layer of ribbon cable of the distribution cable 131 terminates at tail portions 194 (FIG. 33) at opposite ends thereof, which tail portions are electrically connected to the electrical contacts 146 of the particular recess 145 associated therewith. More specifically, the individual tail portions 194 of each of the multiple layers of ribbon cable are spaced apart longitudinally relative to the axial length of the distribution cable 131 so that the tail portions 194 are disposed along the axial length of the associated connector unit. Each of the tail portions 194-1 to 194-8 are then connected to the electrical contacts 146 of a respective recess 145. Preferably, each layer of ribbon cable is formed with the same length and is axially staggered to form the elongate distribution cable 131 such that the tail 194-1 at the extremity of one end of the distribution cable 131 (for example, the leftward end) is disposed so as to be the innermost tail portion 194-1 at the opposite end thereof (the rightward end). This ensures that each access opening 153-1 to 153-8 and in particular, the access ports 154 at the various connector locations are capable of providing access to the same pair of communication links along the entire length of the modular communication system 121.

To orient the connector units 132 and 133 of each module 122 so that one connector unit faces upwardly while the other faces downwardly, the elongate distribution cable 131 preferably is provided with a 90° twist at one end thereof about a horizontal longitudinal axis, and is also provided with a −90° twist about the horizontal axis at the other end. In addition to orienting the connector units 132 and 133 for the serial-connection of the main distribution modules 122, this twisting of the distribution cable 131 facilitates the formation of a loop in the intermediate portion of the elongate distribution cable 131 which permits the distribution cable to be seated within the furniture component raceway. In particular, formation of a loop in the distribution cable 131 permits the cable to be snaked around vertical support posts (not illustrated) which commonly are found in the raceways of furniture panels or components. The loop also permits the distribution cable 131 to be axially flexible to ease installation of the modular communication system 121.

To more readily permit bending of the ribbon cable particularly in the area of the looped portion, the layers of ribbon cable preferably are not bonded one with the other but instead are loosely bound together to permit a shearing movement between the individual layers. The layers may still be banded together at periodic intervals along the length of the cable so long as sufficient shearing movement is permitted. It should be understood that the depiction of the elongate distribution cable 131 has been eliminated from the accompanying figures for illustrative purposes only.

In a variation, the opposite ends of each cable layer may be provided with cassettes (not illustrated) which each define an access port 154 therein that is connected to the conductors of that particular cable layer. The housings 41 would be hollow to define a chamber in each which accommodates a plurality of cassettes, which when assembled together forms the connector units 132 and 133 and elongate distribution cable 131 of the main distribution module 122.

Figure 34:
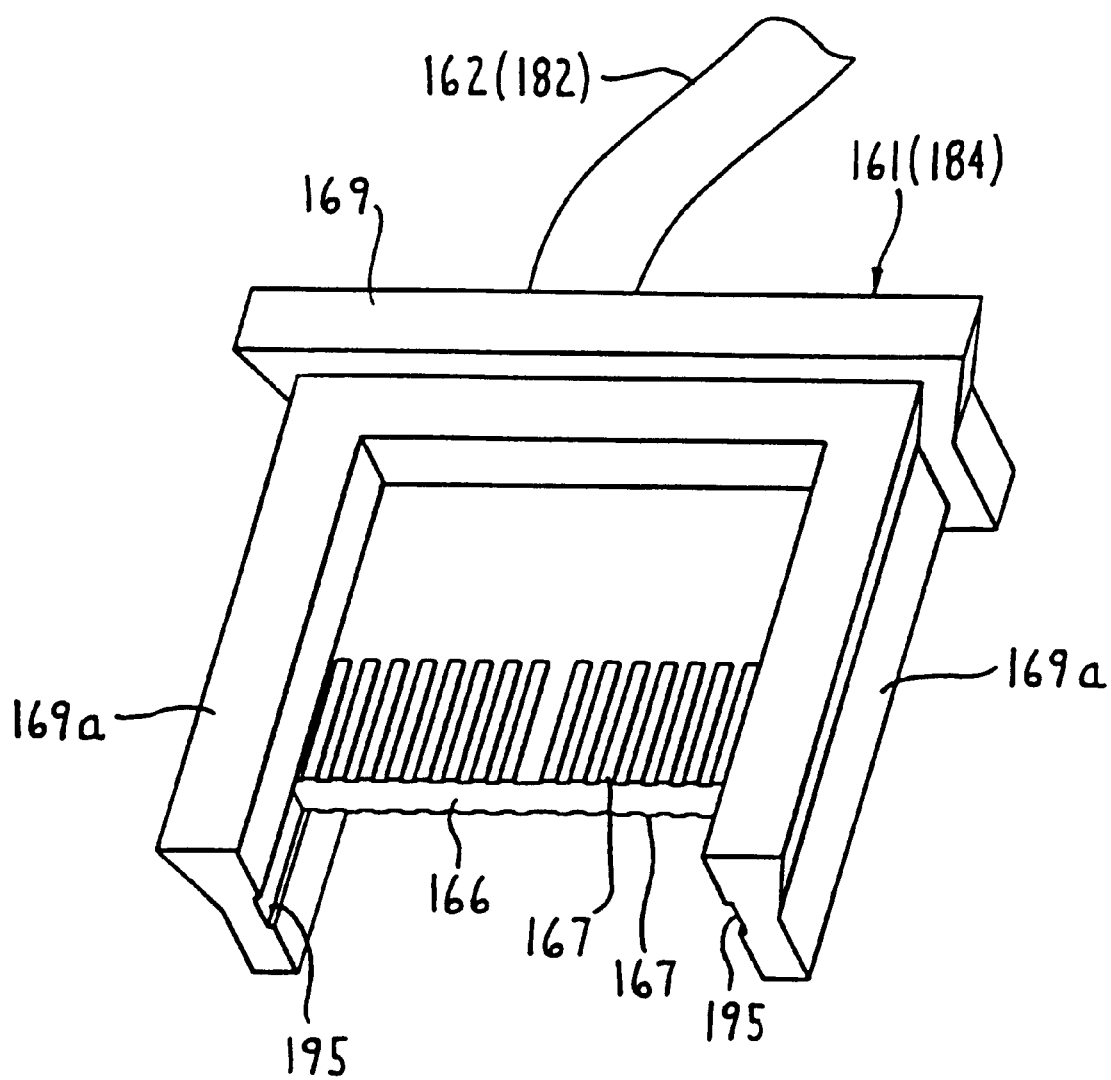
FIG. 34 is a partial perspective view of a preferred embodiment of the plug part for use with the communication system of FIG. 24.
Figure 35:
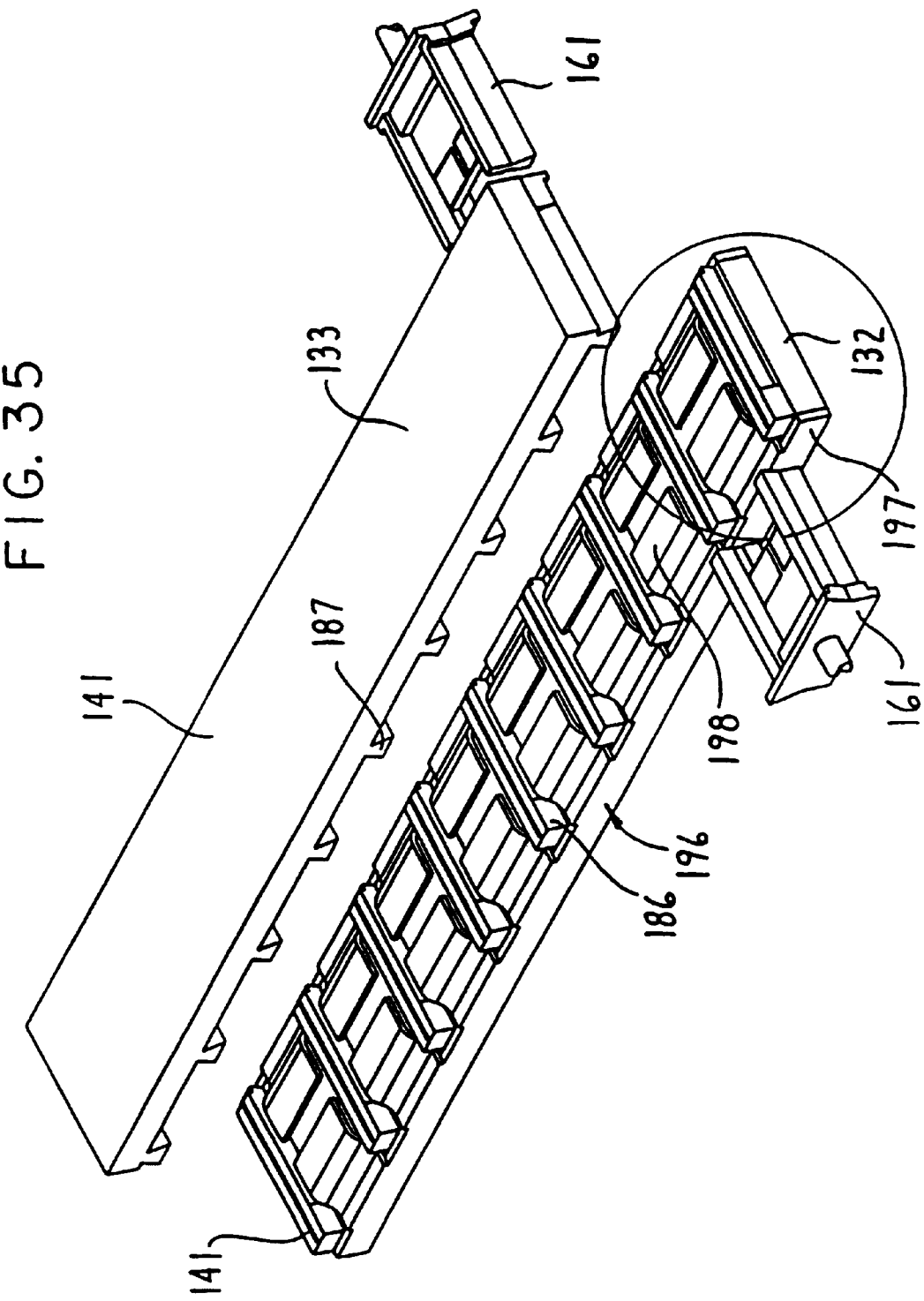
FIG. 35 is an exploded perspective view of the connector assembly of FIG. 26.
Figure 36:
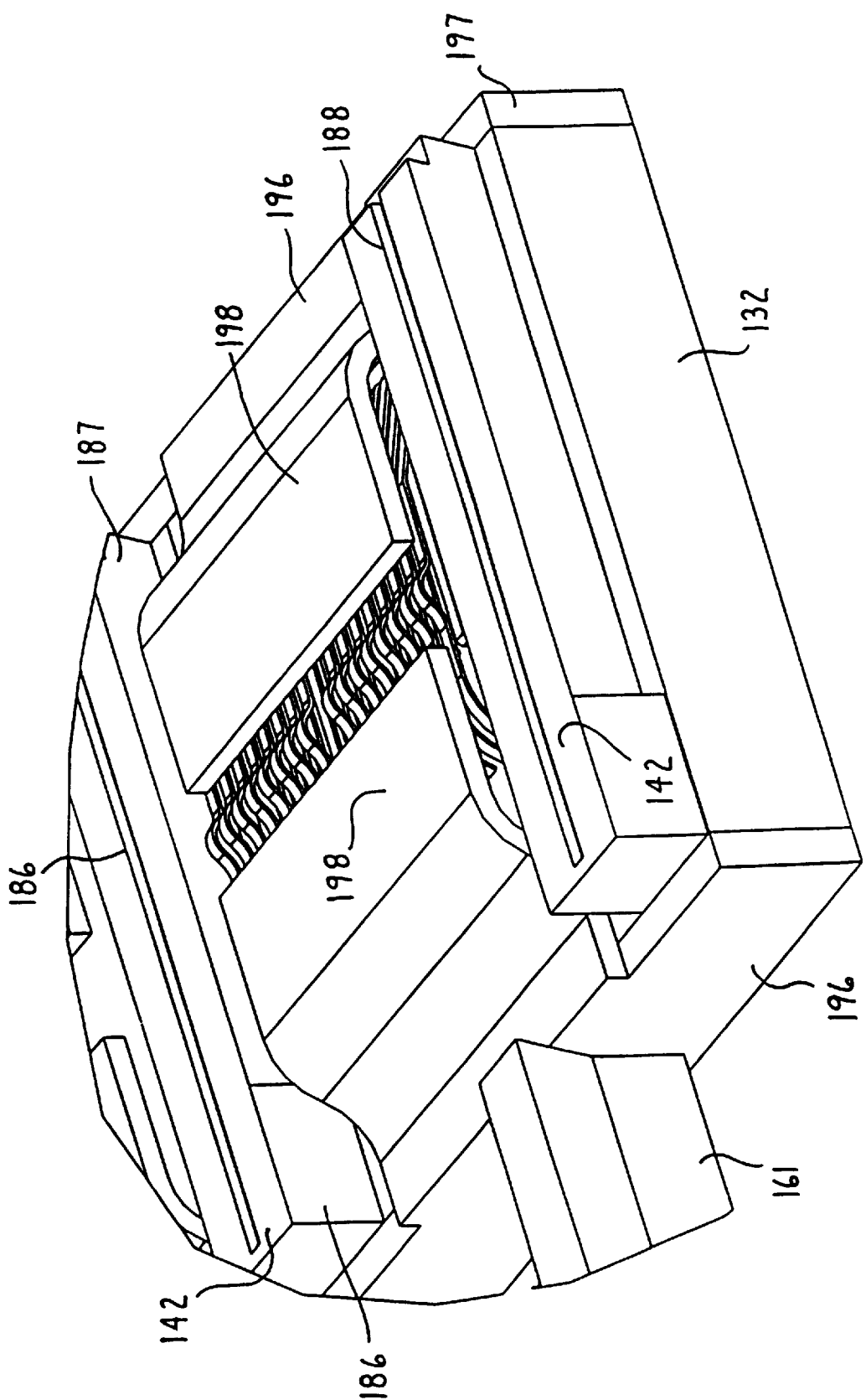
FIG. 36 is an enlarged partial perspective view of the connector assembly of FIG. 35 illustrating an insulative spacer insert and one access port.

Considering now the tap-off modules 123 and the in-feed module 124, and referring to FIGS. 26 and 34, both of the modules include a common plug part 161 (or port connector 184 as previously described herein with respect to FIG. 23) which is adapted to be received through a selected one of the access openings 153-1 to 153-8 (on either side of the connector assembly 138) for engagement with the corresponding access ports 154-1 to 154-8. Each plug part 161 is connected to a tap-off cable 162 which leads to corresponding module jacks (not illustrated), and each port connector 184 is connected to an in-feed cable 182 which lead back to the wiring closet. Each cable 162 or 182 preferably includes sixteen conductors to define two 4-pair telecommunication links (one data, one voice). Since the plug part 161 and port connector 184 are formed substantially the same for both the tap-off and in-feed modules, the following description will hereafter refer to only the plug part 161, although it should be understood that the description applies equally to the port connector 184 of the in-feed module 124.

The plug part 161 includes a U-spaced head part 169 and a blade or plate 166 which includes a set of electrically conductive contacts or tracings 167 on both sides thereof. The tracings 167 are electrically connected to the respective cables 162 (or 182 in the case of an in-feed module 124). The tracings 167 on each side of the plate 166 are positioned and dimensioned so as to be directly and individually connected to the voice and data carrying contacts of the connector units 132 and 133 previously described herein. Preferably, the plate 166 and tracings 167 are formed like a computer circuit board which plate 166 is then slidably inserted into slots 195 formed in the inside surfaces of opposing parallel side rails 169a of the head part 169.

The side rails 169a of plug part 161 include a substantially rectangular portion and a substantially trapezoidal portion along the exterior surfaces thereof to define a "keyed" shape which is adapted to slidably seat within the correspondingly shaped access openings 153. As previously described, the shape of the access openings 153 is inverted on the opposite sides of the connector assembly 138 such that the plug part 161 may be slidably inserted on one side when in one orientation, but must be rotated 180° in a vertical plane to a second inverted orientation to permit insertion on the opposite side of the connector assembly 138. For example, as illustrated in FIG. 26, the trapezoidal portions on the plug parts 161 located on the backside of connector assembly 138 is disposed at the bottom thereof for insertion into the associated access opening 153. Conversely, the trapezoidal portions of the plug part 161 illustrated on the front side of the connector assembly 138 is inverted so that the keyed or trapezoidal portions are disposed on the top of the plug part 161. This ensures that the particular group of tracings 167 on the plate 166 which are assigned to carry voice signals, and the adjacent group of tracings 167 which are assigned to carry data signals, continue to carry such signals regardless of which side of the connector assembly 138 that the plug parts 161 are inserted from.

Referring now to FIGS. 35–43, to selectively tap-off the signals (i.e. links) from the connector assembly 138, insulative spacer inserts 196 are provided in the preferred embodiment for selective insertion in the access ports 154 between the opposing electrical contacts 146 of the connector units 132 and 133. The spacer inserts 196 preferably are formed of a cost-efficient, non-conductive material such as a polymer. Once positioned, the spacer inserts 196 only permit the tracings 147 on one side of the plate 166 to make contact with the electrical contacts 146 upon insertion of the plug part 161 into the respective access port 154. This completes an electrical circuit therethrough while breaking the connection on the opposite side.

The insulative inserts 196 may have two parallel rows, i.e. be double-sided, which each have sidewalls 197 and a plurality of stepped cantilevered projections 198 which extend laterally inwards for seating within the recesses 145. The spacer inserts 196 may be removably connected to the connector units 132 and 133 by any common fastener methods such as a snap-fit arrangement. As illustrated, the double-sided arrangement is retained between two connector units as seen in FIG. 32. The stepped projections 198 are provided with a sufficiently small thickness so that when no tap-off module 123 is provided thereat, the insert 196 permits the arcuate portions 185 of opposing resilient electrical contacts 146 to remain in resiliently biased contact even when the spacer inserts 196 are disposed therebetween.

Preferably, however, the spacer inserts 196 are provided with the single-sided arrangement illustrated in FIG. 38 or the single-piece arrangement illustrated in FIG. 39. By providing the single-sided or single-piece arrangements, the spacer inserts 196 may be selectively inserted into the recesses 145 respectively through the access openings 153 on one side of the connector assembly or through individual access openings 153 without disassembling the connector assembly 138. Removal is accomplished by first disengaging any plug parts 161 therefrom and then simply pulling the spacer insert 196 from the connector assembly. This readily permits rearrangement of the module communication system 121 without requiring disassembly of the components.

Figure 40:
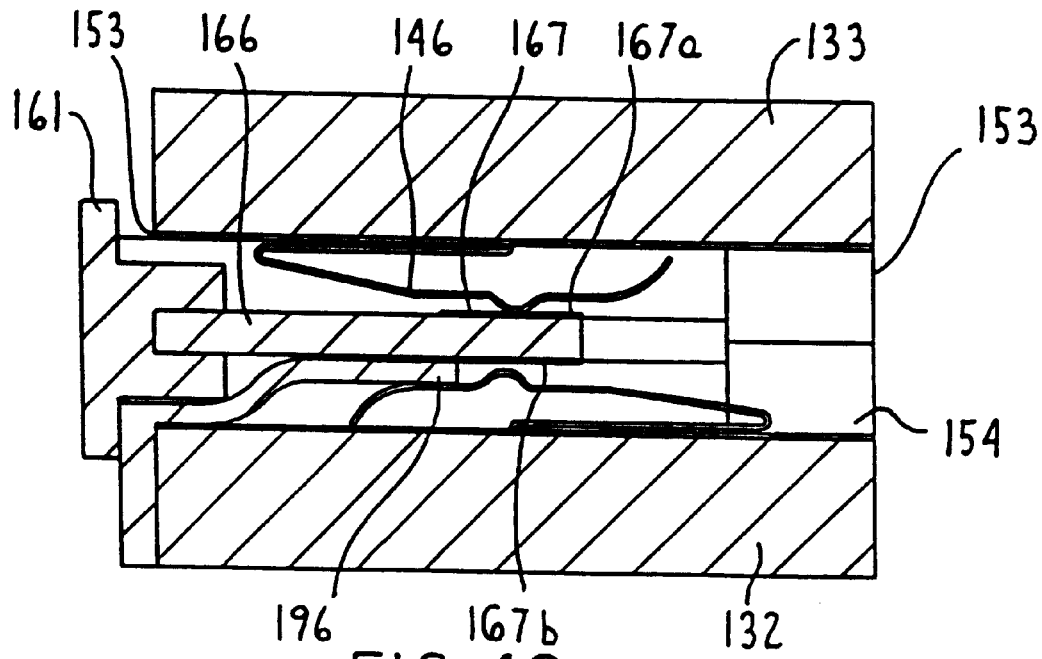
FIG. 40 is a side cross sectional view of the connector assembly of FIG. 26 with a plug part inserted from one side.
Figure 41:
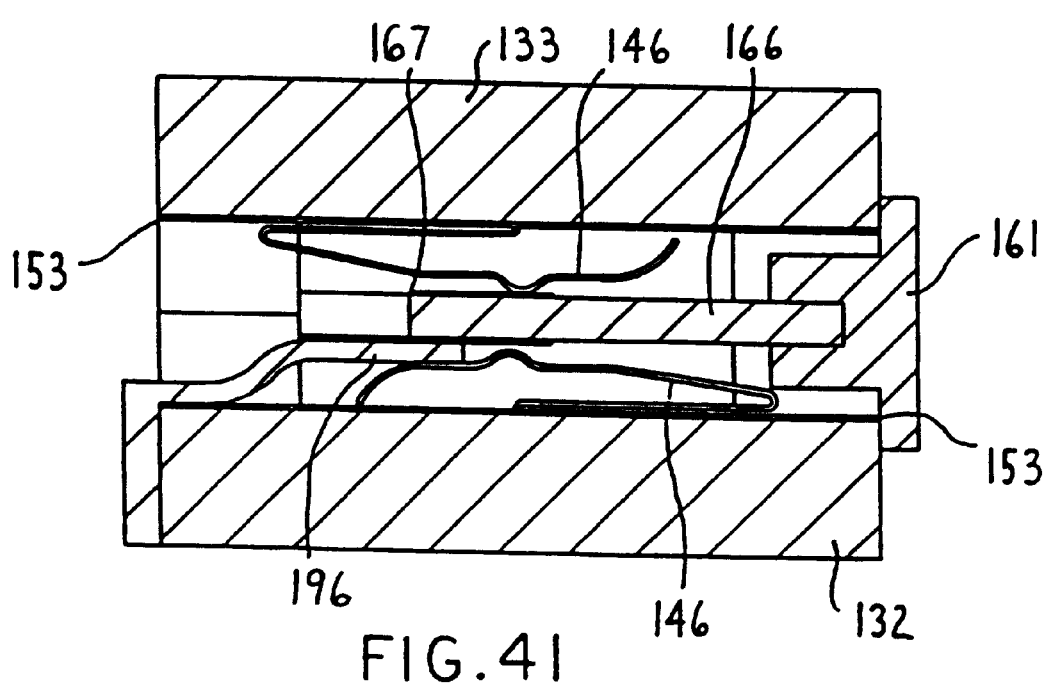
FIG. 41 is a side cross sectional view similar to FIG. 40 but illustrating the plug part into the connector assembly from the other side.
Figure 42:
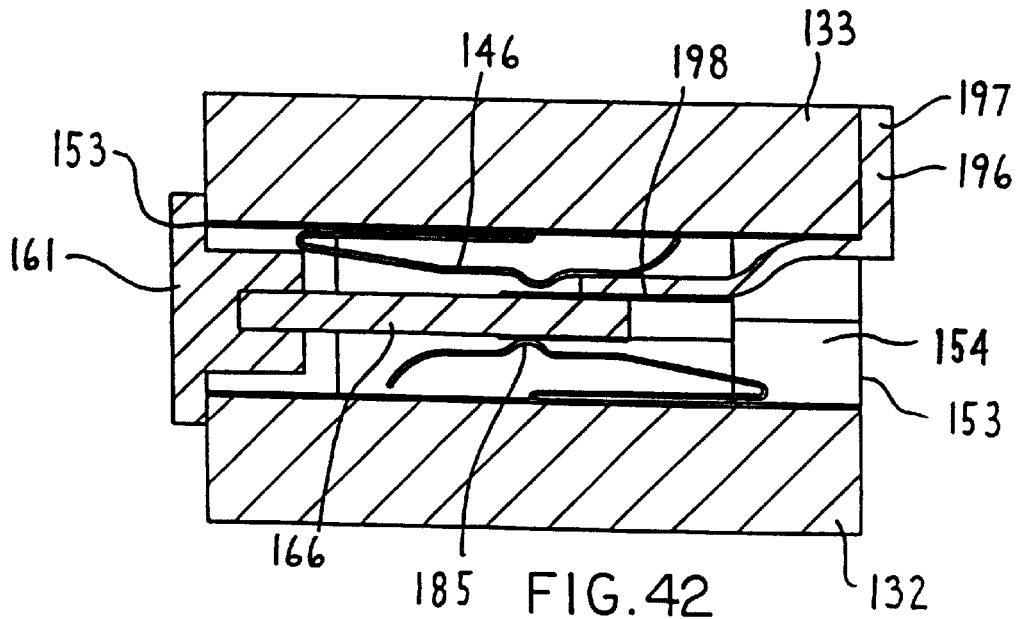
FIG. 42 is a side cross sectional view of the connector assembly of FIG. 26 illustrating the spacer insert mounted on the top connector unit and the plug part inserted from the left side.
Figure 43:
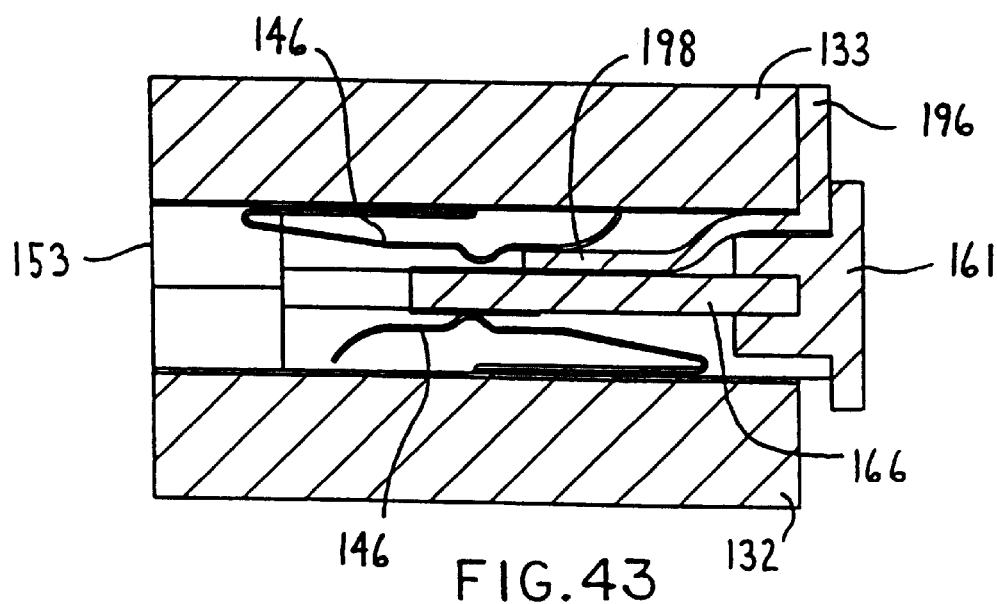
FIG. 43 is a side cross sectional view of the connector assembly of FIG. 42 with the plug part inserted from the opposite or rightward side.
Figure 44:
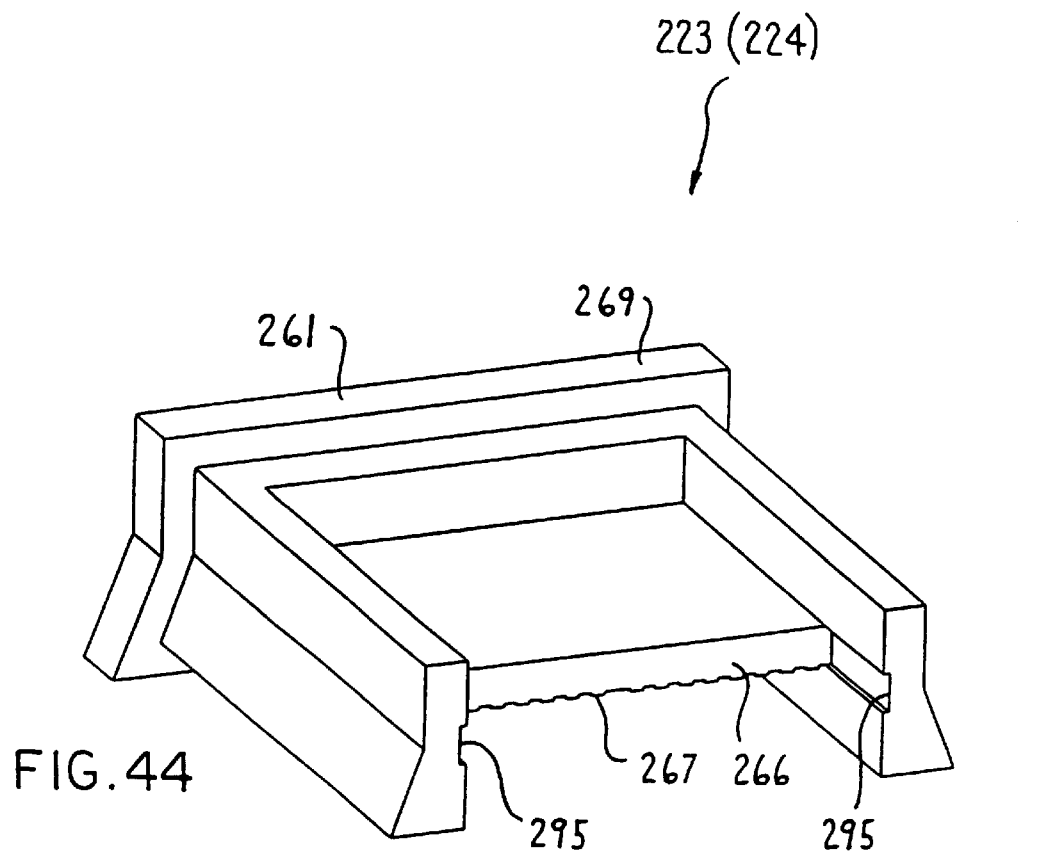
FIG. 44 is a perspective view of a variation of the plug part of FIG. 34.

More particularly, the inserts 196, for example, the single-piece inserts 196 (FIG. 39) illustrated in phantom outline in FIGS. 27 and 28, may be inserted into a selected one of the access openings 153 from either side of the connector assembly. As illustrated in FIG. 44, when the inserts 196 are inserted within the recesses 145, the opposing electrical contacts 146 remain in contact and a circuit is completed thereby. When being inserted into one particular opening 153, the inserts 196 also are connected to one of either the connector unit 132 (as illustrated in FIGS. 40 and 41) or the connector unit 133 (as illustrated in FIGS. 42 and 43). The inserts 196 should be provided with a sufficient thickness such that when the plug part 161 is received within the access port 154, the insert 196 is deflected which effects separation of one group of contacts 146 from the tracings 147 on the plug part 161.

In determining which connector unit 132 or 133 of assembly 138 the insert 196 is to be connected to, the insert 196 is placed on the particular connector unit through which the electrical circuit will be dead. For example, for a tap-off location, the inserts 196 are connected to the connector unit 132 or 133 on the downstream side thereof, i.e. on the connector unit 132 or 133 which is downstream of the in-feed location since the inserts 196 serve to break the signal paths upon insertion of one of the plug parts 161.

More specifically, when a plug part 161 is inserted within the recess 145, the tracings 147a (FIG. 40) on one side of the plate 166 complete an electrical path between the cable 162 of the plug part 161 and the electrical contacts 146. With this arrangement, the insulative insert 196 separates the opposite electrical contact 146 from the opposite tracings 147b on the plate 166. The signal path is thus completed from the connector unit 133 to the plug part 161, while the signal path downstream therefrom (i.e. in connector unit 132) is broken.

In addition, upon insertion of the plug part 161 from the other side of the recess 145 as shown in FIG. 41, the plate 166 also extends within the access port 154 to deflect the insert 196. This has the same result of completing an electrical circuit through the tracings 147 on one side of the plate 166 while breaking the electrical circuit on the opposite side thereof.

The insulative spacer inserts 196 are also mounted on the connector assembly to which the in-feed module 124 connects. The individual or single spacers 196 of FIG. 39 are preferably used, and one such spacer is inserted into each port 154 which receives therein an in-feed plug part 184, which plug part 184 can be inserted from either side of assembly 138. If the in-feed link is to be supplied to the bottom connector unit 132 (direction A in FIG. 24), then the insert 196 is mounted in the upper unit 133 similar to FIGS. 42–43. On the other hand, if the in-feed link is to be supplied to upper connector unit 133 for supply in direction B of FIG. 24, then the insert 196 is mounted in the lower unit 132 similar to FIGS. 40–41. This thus enables the in-feed link to be supplied in only one direction, but enables selection of direction A or B by selective positioning of insert 196 for each port 154.

In operation, an installer determines where an in-feed location will be along the length of the distribution modules 122, which are serially-connected one with the other, and also determines the locations of the various workstations with respect thereto. Accordingly, the in-feed module 124 is extended through the panels 12 to the desired connector assembly 138 using the general techniques disclosed herein. Thereafter, the installer inserts the plug parts 184 of the in-feed module 124 into the ports of the assembly 138. Preferably the multiple plug part arrangement for the in-feed module 124 previously illustrated in FIG. 23 is utilized although it should be understood that the plug parts 184 themselves are provided with the preferred construction illustrated in FIG. 34. Typically, the plug parts 184 will be inserted on a single side of the connector assembly 138 as illustrated in FIG. 25, although the preferred embodiment of the invention allows the option of using the access openings 153 on either side of the connector assembly 138.

Routing of the particular communication links in either the A or B directions is accomplished by selectively placing the spacer inserts 196 within the access openings 153-1 to 153-8, which are formed by the assembled connector units 132 or 133, and which inserts 196 are placed on the connector unit opposite to the direction that the telecommunication links will be routed. For example, if one grouping of telecommunication links is to be routed in the direction indicated by arrow A in FIG. 25, the spacer or spacers will be inserted within the access ports 154 and removably fastened to the connector unit 133 as illustrated in FIGS. 42 and 43. Upon insertion of the plug 184 of the in-feed module 124, the circuit is broken through the connector unit 133 while being completed through the connector unit 132.

To route the communication link in the direction of arrow B, the insert 196 would be connected to the connector unit 132 as illustrated in FIG. 40. By using the single-piece inserts 196 (FIG. 39), each of the eight groupings of telecommunication links may be selectively routed in either the A or B directions.

Typically, once the in-feed module 124 is installed, tap-off modules 123 are provided at locations corresponding to the particular workstation areas being served. At a tap-off location, the insert 196 would be connected to the connector unit disposed on the downstream side of the tap-off location. For example, to tap-off on the side of the in-feed location which is indicated by arrow B in FIG. 25, the insert 196 would be connected to the connector unit 133 such that an electrical circuit is completed between the connector unit 132 and the tap-off module 123, while the signal path downstream therefrom is broken by the insert 196 and the space created thereby. The above-described preferred arrangement permits the tap-off module 123 to be inserted through the openings 153 on either side of the connector assembly 138.

Upon changing the in-feed location, an installer would only need to change the orientation of the inserts 196, i.e. move the inserts 196 from one to the other of the opposing mated connector units, and only for those inserts 196 at tap-off locations which are located between the old in-feed location and the new in-feed location. The remainder of the tap-off locations already would be configured correctly. In addition, for changing workstation locations, a user would only need to insert a spacer insert 196 on the downstream connector unit 132 or 133 and then insert a tap-off module 123 on the side closest to the workstation. Thus, minimal reconfiguration of the system is necessary during system changes. At the ends of the modular communication system 121, caps also may be provided on the exposed connector units 132 or 133.

Figure 45:
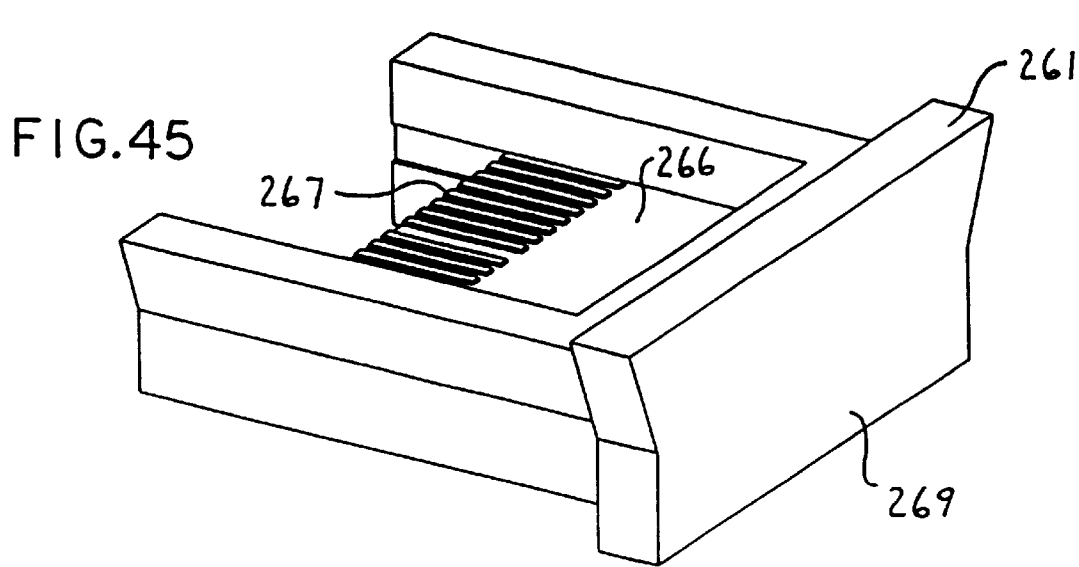
FIG. 45 is a perspective view illustrating the plug part of FIG. 44 from the opposite side.

Alternatively, the modified plug parts 261 may be provided as illustrated in FIGS. 44 and 45, for use with the above-described connector assemblies 138. The plug parts 261 are similar to the plug parts 161 described above although the tracings 167 on one side of the plate 166 are removed. Thus, the plug part 261 would have an insulative surface on one side and tracings 267 on an opposite surface of the plate 266. This alternative arrangement similarly makes or completes an electrical circuit through the tracings 267 while breaking the electrical circuit on the opposite side thereof.

Figure 46:
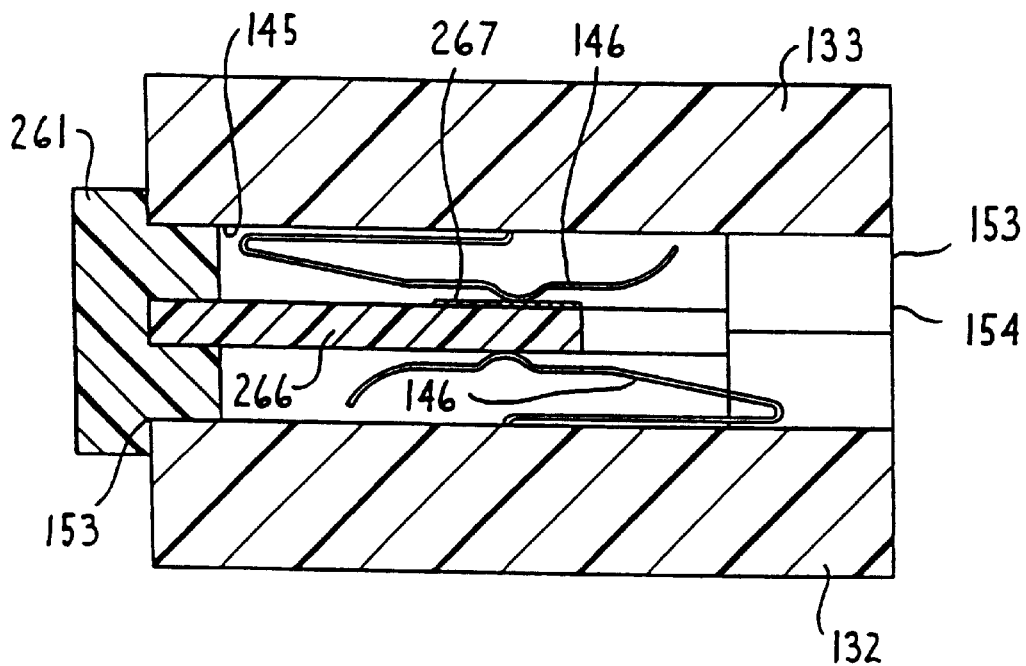
FIG. 46 is a side cross sectional view of the plug part of FIGS. 44 and 45 illustrating the plug part inserted from the left side into the connector assembly.

Upon insertion of the plug part 261 into the access port 154 defined by the connector units 132 and 133 as shown in FIG. 46, the tracings 267 contact the resilient electrical contacts 146 of the connector unit 133 so as to complete an electrical circuit therethrough. Conversely, the opposite side of the plate 266 is an insulative surface which breaks the electrical signal through the connector unit 132 downstream therefrom.

Figure 47:
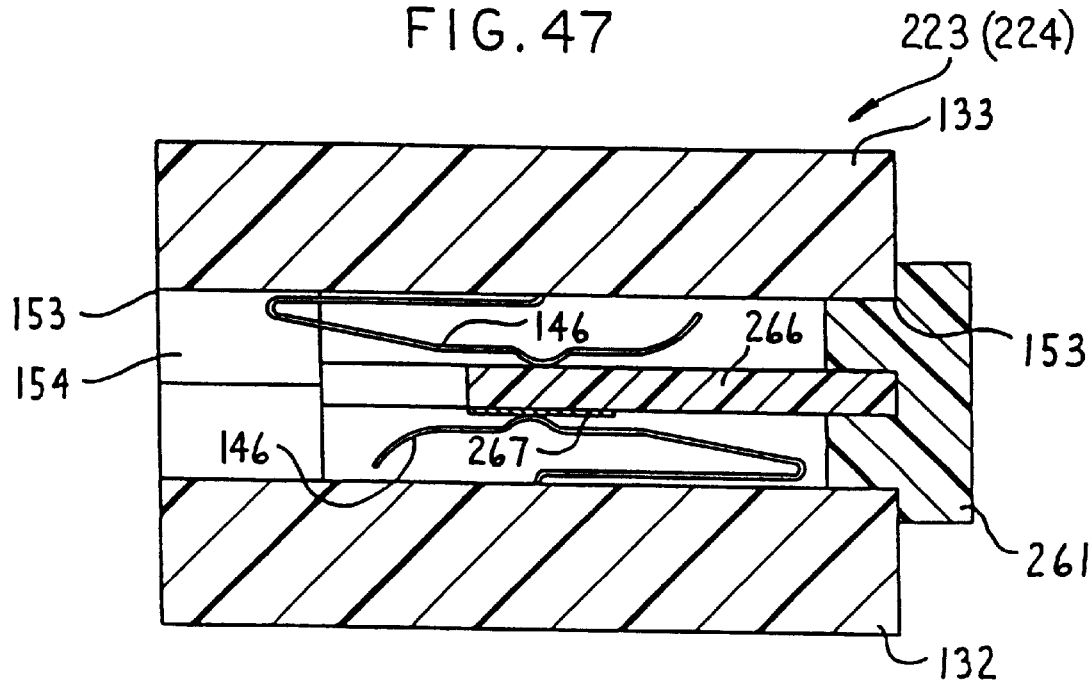
FIG. 47 is a side cross sectional view illustrating the plug part of FIG. 46 inserted from the right side.

As shown in FIG. 47, by rotating the plug part 261 180° through a vertical plane, the plug part 261 can be inserted through the opposite access opening 153. Consequently, the circuit is broken through the connector unit 133 and completed through the other connector unit 132. Thus, depending upon the particular access opening 153 of the recess 145 being used, a circuit can be completed between the plug part 261 and either one of the connector units 132 or 133.

In operation, the plug part 261 could be a plug part of an in-feed module 224 which could be inserted on one side of the connector units 132 and 133 to direct the signal path in one direction and could be inserted on the other side of the connector units to direct the signal path in the opposite direction. The same plug part 261 could also serve as a plug part for a tap-off module 223.

Figure 48:
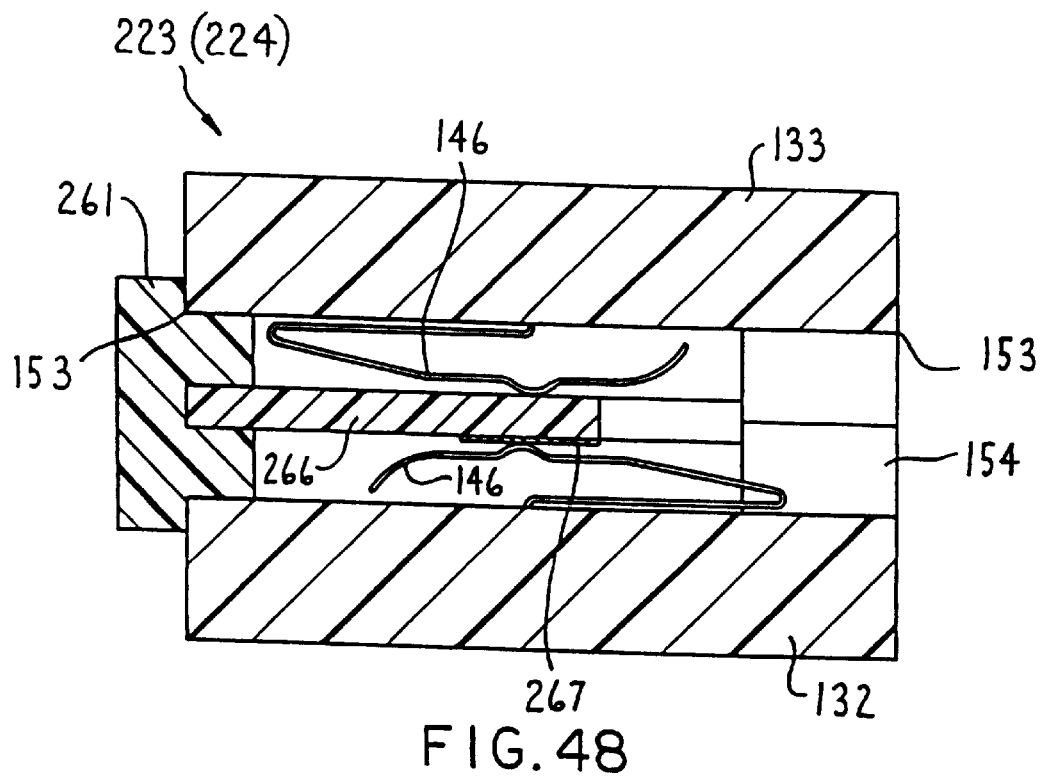
FIG. 48 is a side cross sectional view of a variation of the plug part illustrated in FIGS. 44 and 45 inserted in the connector assembly.
Figure 49:
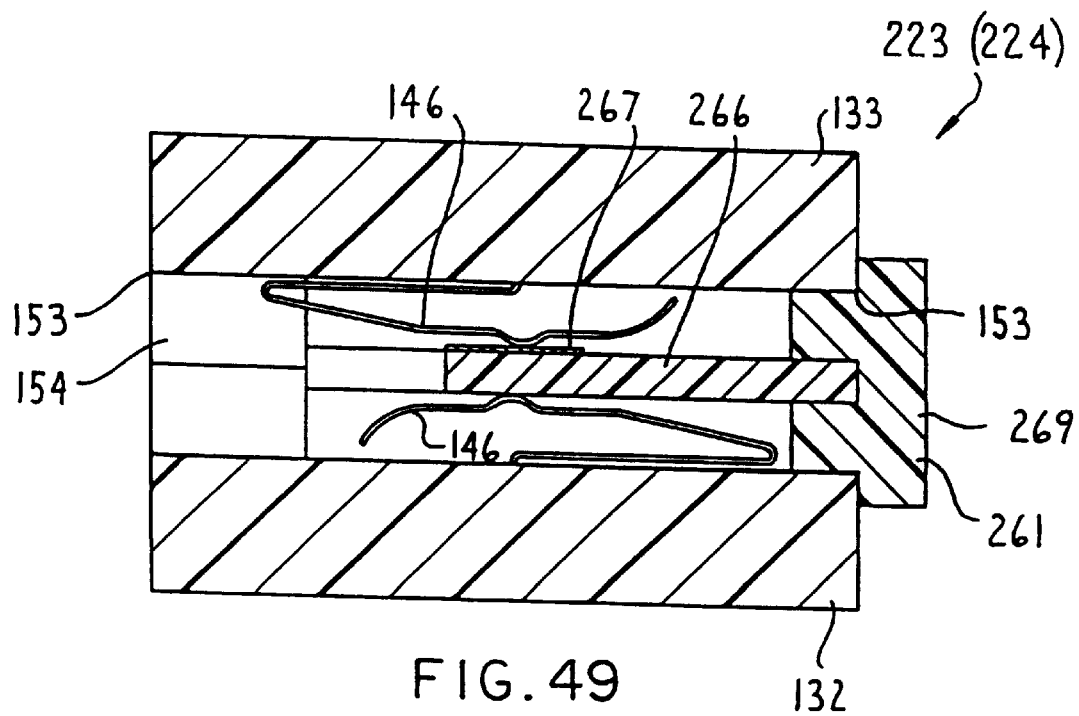
FIG. 49 is a side cross sectional view illustrating the plug part of FIG. 48 inserted from the opposite side.

Alternatively, as illustrated in FIGS. 48 and 49, the tracings 267 may be provided on the opposite side of the plate 266 to provide a second configuration for a tap-off module 223 or the in-feed module 224 which also provides access from the sides of the connector units. This configuration, however, operates opposite the configuration illustrated in FIGS. 46 and 47.

Figure 50:
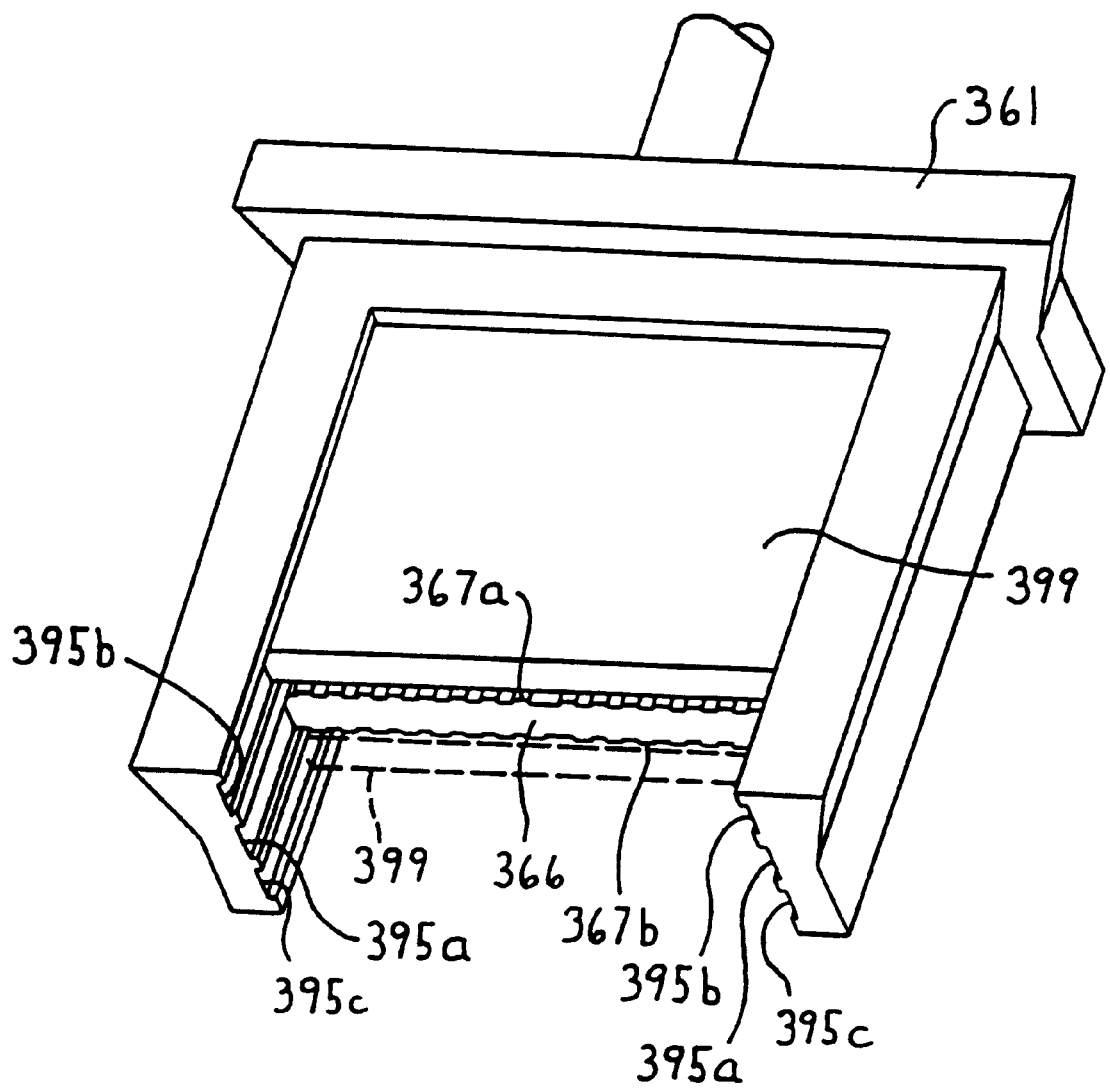
FIG. 50 is a perspective view of a further variation of the plug part.

A further modified embodiment is illustrated in FIG. 50 wherein the plug part 361 functions similar to the aforesaid embodiments. The plug part 361 includes intermediate slots 395a for slidably receiving the plate 366 therein and upper slots 395b and lower slots 395c which extend parallel to the intermediate slots 395a. Instead of providing the connector units 132 and 133 with the spacer inserts 196, the upper and lower slots 395b and 395c are dimensioned so as to slidably receive a spacer insert 399 selectively positioned above (as illustrated in solid lines) or below (as illustrated in phantom outline) the plate 366. By selectively positioning the spacer insert 399 above or below the plate 366, the tracings 347 on one side of the plate 366 are covered thereby while the other side remains exposed for contacting engagement with the electrical contacts 146 upon insertion of the plug part 361 into a selected access port 154. As a result, selected connections may be completed between the electrical contacts 146 and either the sets of the tracings 367a or 367b upon insertion of the plug part 361 into one of the access ports 154, from either side of the assembly 138, such that the in-feed modules selectively route and the tap-off modules selectively tap-off the communication links.

Referring to FIGS. 51–57, the modular communication system 21 may also be arranged such that an in-feed panel 412a is provided at the in-feed location which in-feed panel 412a has a pair of main distribution modules 422 disposed in the raceway thereof. This in-feed panel 412a may take the form of a standard panel provided with a second main distribution module 122.

From this in-feed panel 412a, the main distribution modules 422 extend in the directions indicated by arrows A and B. In the in-feed panel 412a, the free ends of the main distribution modules 422, i.e. the connector units 433, remain disconnected from each other unlike the aforesaid embodiments. Instead the connector units 433 are provided with cover units 481 which are formed similar to connector units 132, yet without the electrical contacts 446 therein.

Figure 53:
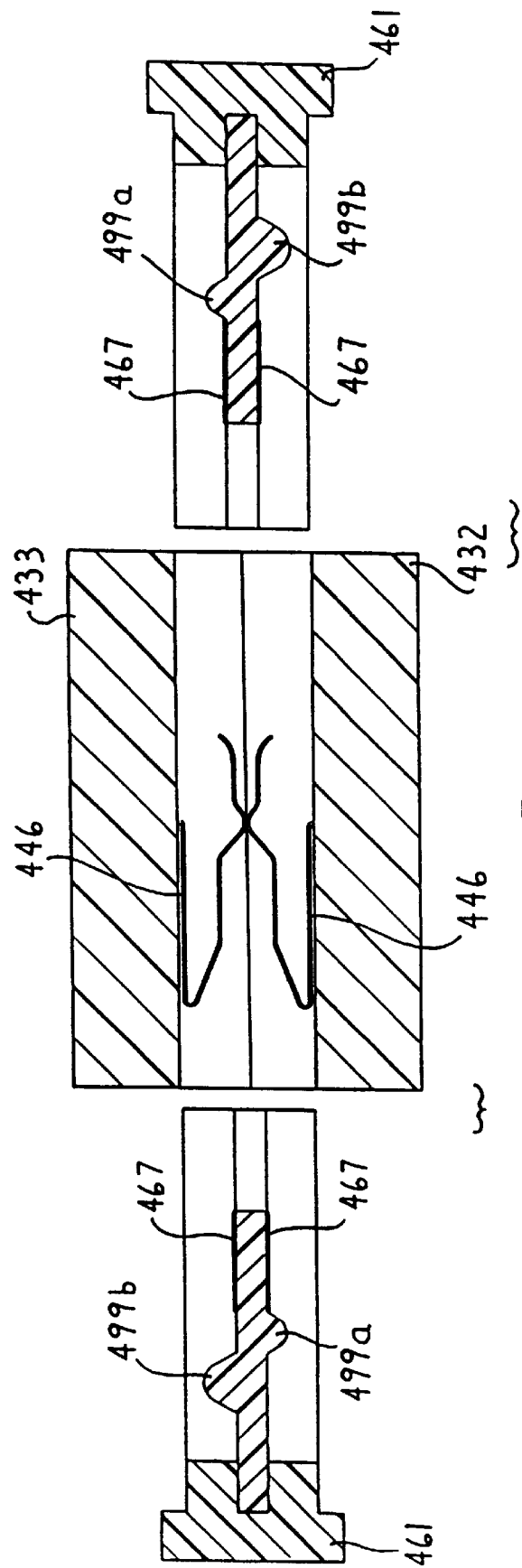
FIG. 53 is a side cross sectional view illustrating a plug part for a tap-off module disposed, prior to insertion, in alternative positions on the left and right side of the connector assembly.

In the connector units 432 and 433, the electrical contacts 446 are oriented so that the free ends thereof extend in the same direction as can be seen in FIG. 53. The plug part is illustrated as it would appear in both the leftward and rightward positions.

The particular plug parts 461 of the tap-off module preferably are formed as illustrated in FIG. 53 with a small spacer 499a on one side of the plate 466 and a large spacer 499b on the opposite side of the plate 466. The small spacer 499a is disposed closer to the tracings 467 than the large spacer 499b. The plug part 461 is illustrated both as it would be on the rightward side prior to insertion and on the leftward side.

Figure 54:
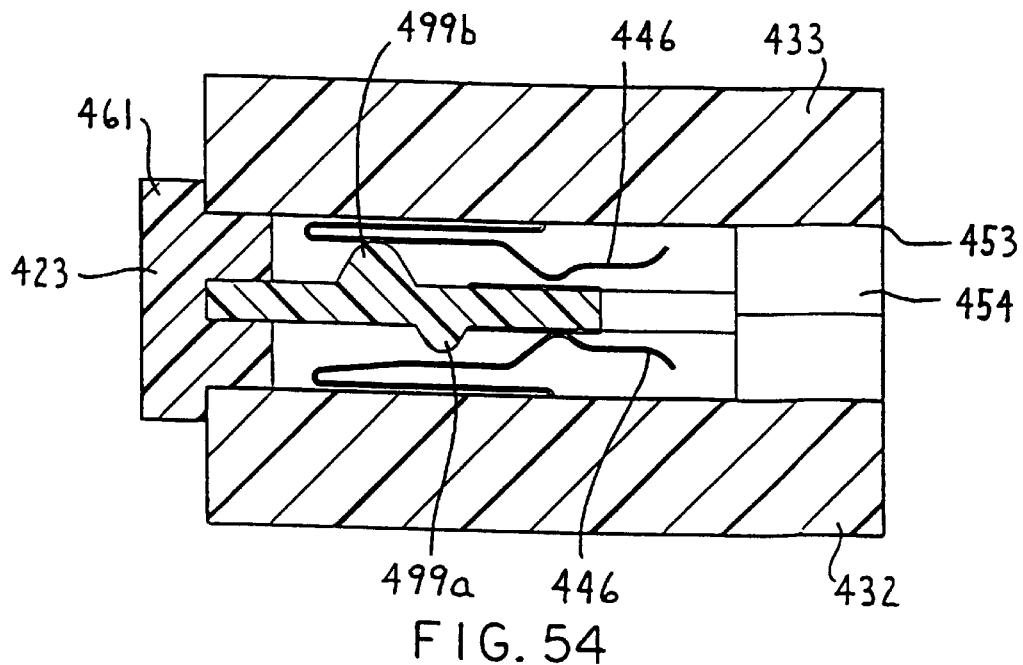
FIG. 54 is a side cross sectional view illustrating the plug part of FIG. 53 inserted from the left side into the connector assembly.
Figure 55:
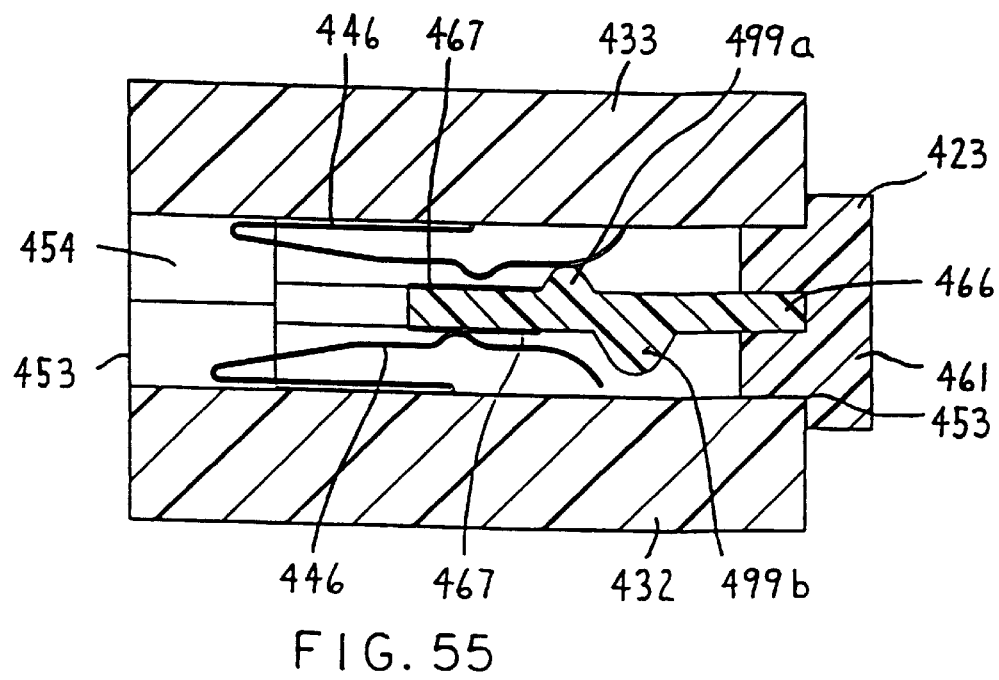
FIG. 55 is a side cross sectional view of the plug part of FIG. 54 inserted from the right side into the connector assembly.

The plug part 461 shown in FIGS. 54 and 55 is formed for use as a tap-off module 423 since the connector units 432 typically are disposed upstream relative to the connector unit 433, and thus receive the telecommunication signals. Thus, the tap-off module 423 is inserted so that a connection is made between the plug part 461 and the connector unit 132 which is carrying the telecommunications signals from the in-feed panel 412a.

Figure 56:
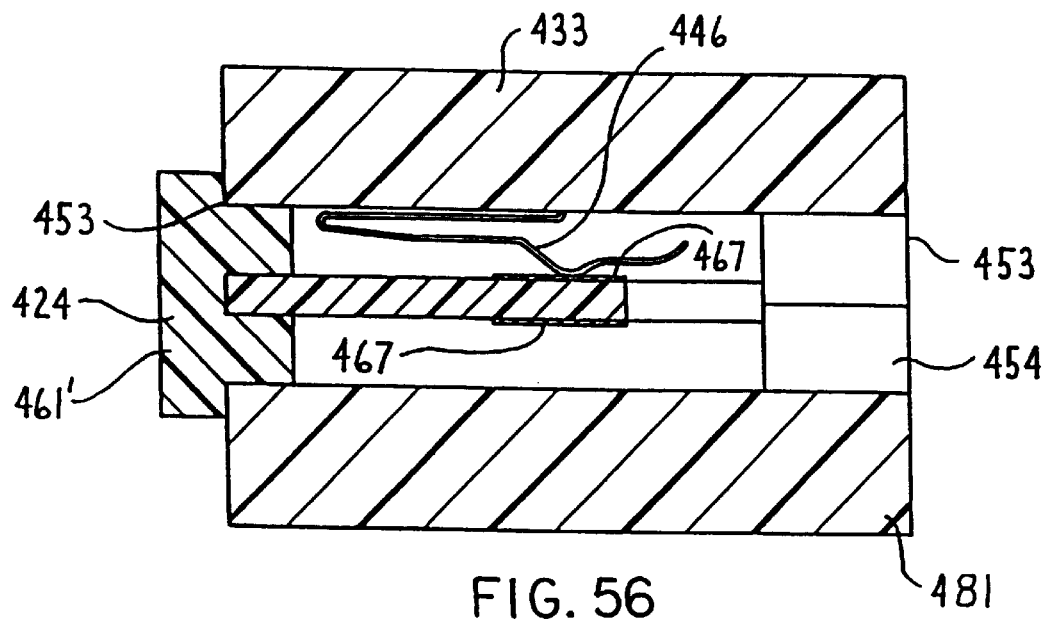
FIG. 56 is a side cross sectional view illustrating a plug part for an in-feed module for the communication system of FIG. 51.
Figure 57:
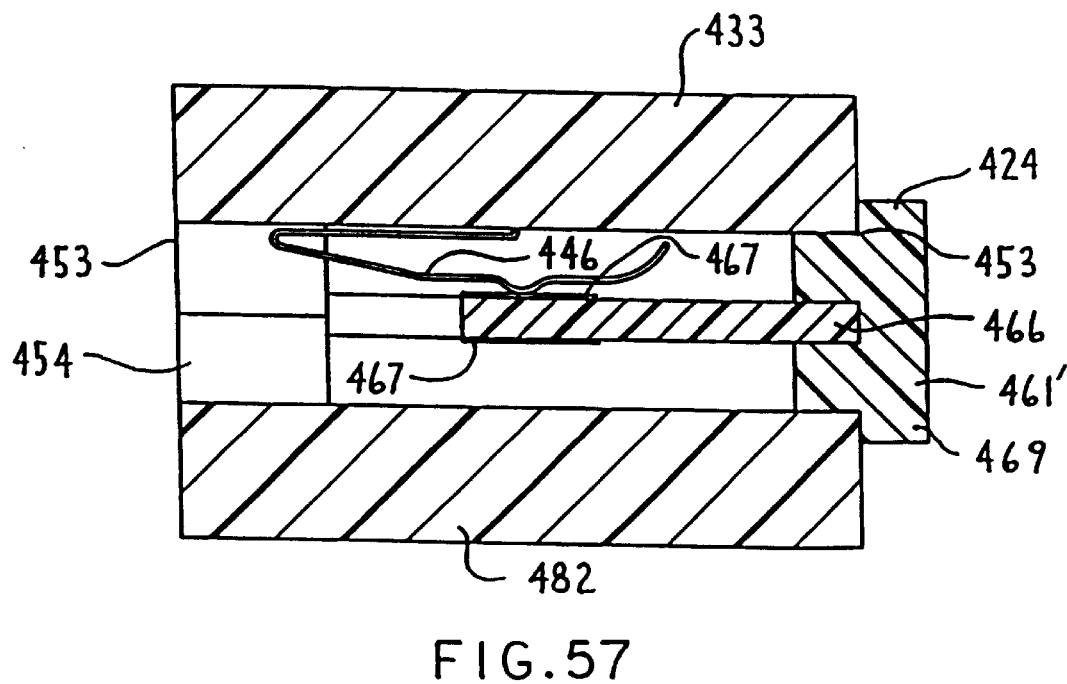
FIG. 57 is a side cross sectional view illustrating the plug part of FIG. 56 inserted from the right side into the connector assembly.

Referring to FIGS. 56 and 57 which illustrate a plug part 461' of an in-feed module 424 for engagement with connector unit 433 on the in-feed panel 412A. This plug part 461' can be inserted from either side of unit 433, and can also be rotated 180° about the longitudinal extent of its cable so as to properly align and plug into the unit from either side.

While the embodiments of the modular communication system as described herein possess sixteen telecommunication links disposed in groupings of two links each, it will be appreciated that the number of links and the groupings thereof can be significantly varied depending upon user needs, space limitations, accessibility to the closet, and the like. While each access port in the connector assembly can access only a single link, nevertheless it is believed more desirable and expedient to access a pair of links since substantially all workstations require separate voice and data links, and the present invention is able to provide this need in a simple and efficient manner. It will be appreciated that any particular workstation can be provided with additional links, if necessary, merely by using two or more tap-off modules for supplying additional links to the same workstation. Further, even though the access ports may be provided on different sides or surfaces of the connector assembly, it will be recognized that the cables associated with the tap-off modules are sufficiently small and flexible as to enable the cables and the tap-off plugs thereon to be bent around the connector assembly so as to be plugged into an opposite side thereof from the workstation, if desired or necessary.

It will also be understood that the construction and interconnection of the wall panels, as well as the provision of a raceway in association therewith for accommodating the communication system, may assume many different conventional constructions as are well known in the office furniture industry. For example only, however, attention is directed to U.S. Pat. Nos. 4,060,294, 4,080,366, and 4,277,123, all owned by the Assignee hereof, for showing examples of such panels and of the construction thereof.

Reference will now be made to FIGS. 58–69 which are diagrammatic plan views which illustrate several arrangements and variations of the modular communication system of this invention. In these views, the reference to the "data distribution assembly" refers to the modular communication system, reference to "data tap" means the tap-off module, with the "in-line" data tap being a tap-off module which connects directly into the aligned modules of the system, the reference to the "data distribution segments" mean the main distribution modules, the reference to "quick connectors" mean the connector units, the reference to a "data feed" means the in-feed module, with the "one-way" data feed being connectable at an end or location so that the telecommunication links project only in one direction downstream therefrom, whereas the "two-way" data feed connects intermediate the length of the system so that selected telecommunication links project in opposite directions therefrom. In these drawings, reference is also made to a "data T", this being a connector which is provided as an integral part of the distribution segment and which cooperates with the data taps.

In the modules diagrammatically illustrated in FIGS. 58–69, the connectors as well as the taps and data feeds are all provided with housings which each possess male and female characteristics so that when two such housings join together as illustrated in the drawings, the male-female parts on one housing respectively mate with the female-male parts on the other housing to provide a quick connect-disconnect between adjacent modules. Such connections in terms of the way in which they interfit to define a nonhanded relationship, are themselves well known. The connections, namely the male-female properties associated with the housings thereof, do not effect the contact connections, which contact connections can be generally in accordance with those which have been described above. In this case, however, where the tap-offs have a housing or plug part which plugs either directly in-line or into a separate data T, the connectors no longer need to provide access ports as in the previously described variations.

It should further be noted that the line diagrams associated with FIGS. 58–69 show only six telecommunication links (i.e. data paths) for purposes of illustration, but the number of such links can obviously be varied as desired, including eight links as described above relative to the variations previously described.

Figure 58A:
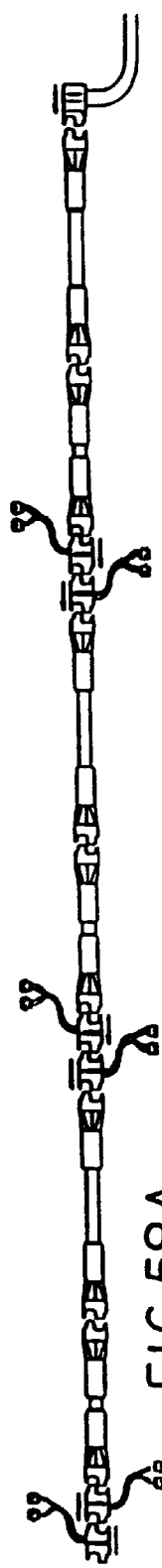
Figure 58B:
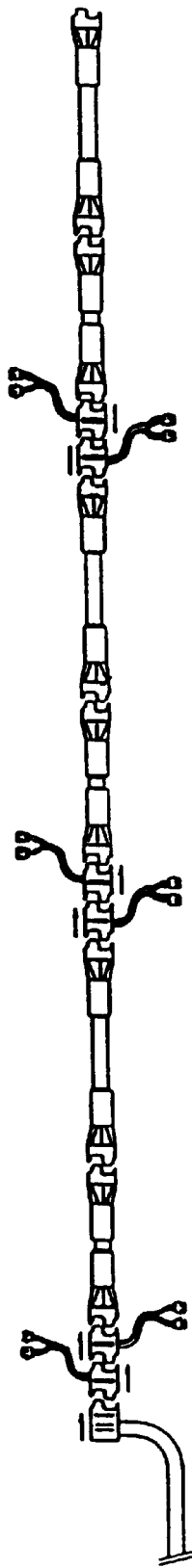
Figure 58C:
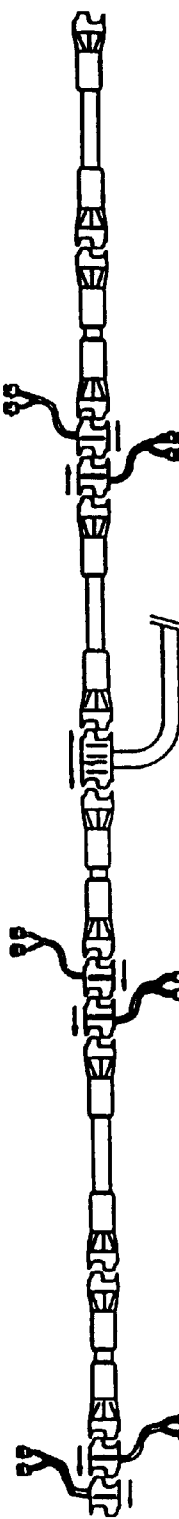

More particularly, a data distribution assembly with in-line data taps and one-way data feeds is illustrated in FIGS. 58A, 58B and 58C. Referencing FIGS. 58A, 58B and 58C, the data distribution assembly includes data distribution segments which have a length equal to a panel length, are pre-wired with connectors attached thereto and are preassembled with a panel. Additionally, the one-way data feed is illustrated in FIG. 58A at the right end thereof although it may be located at either end of the assembly. FIG. 58B illustrates a similar data feed at the opposite end of the assembly which extends to a computer/telephone closet. Quick connectors are provided on the data distribution segments and in-line data taps are provided for voice and data with pre-terminated jacks at the ends thereof. FIG. 58C illustrates the configuration and layout of the modular cabling system with in-line data taps and a bi-directional data feed which may be located anywhere along the length of the data distribution assembly between two serially-adjacent data distribution segments. The bi-directional data feed extends to the computer/telephone closet.

Figure 59A:
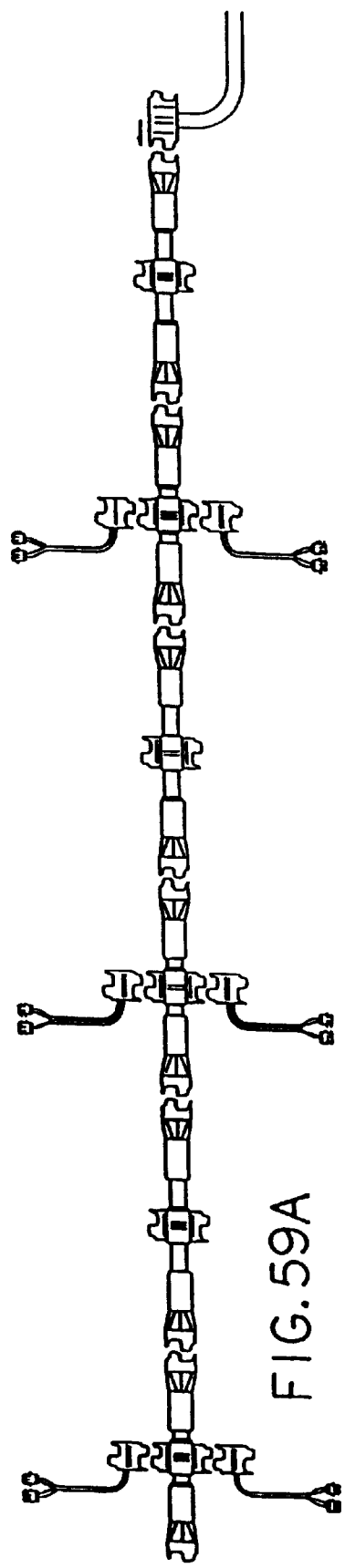
FIGS. 59A and 59B illustrate the data distribution assembly similar to FIGS. 58A–58C except that the distribution segments (i.e., the distribution module) incorporate intermediate tap-off connectors referred to as data T's, with FIG. 59A showing the data feed at one end of the system and FIG. 59B showing the data feed intermediate the length thereof.
Figure 59B:
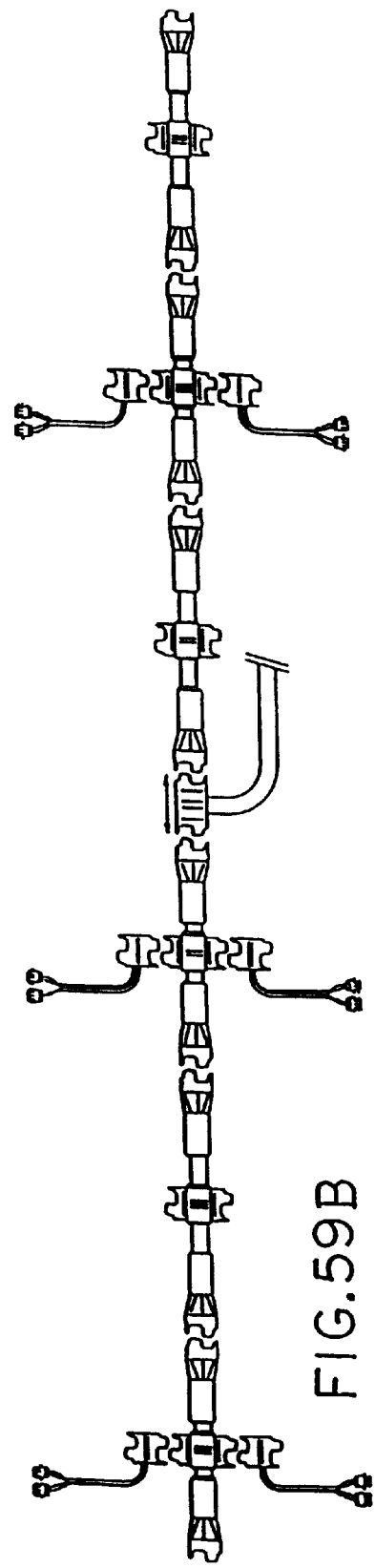

In FIGS. 59A and 59B, a data distribution assembly with data T's is illustrated where the data taps connect to data T's rather than in-line as in previous FIGS. 58A, 58B and 58C. The benefit is that individual users can connect and disconnect without disrupting other users. In FIG. 59A, the bi-directional data feed is illustrated at the rightward end of the data distribution assembly and extends to a telephone/computer closet. FIG. 59B illustrates the bi-directional data feed connected between two serially-adjacent data distribution segments and extending to the telephone/computer closet. The data taps are pre-terminated and accommodate voice and data.

Figure 60A:
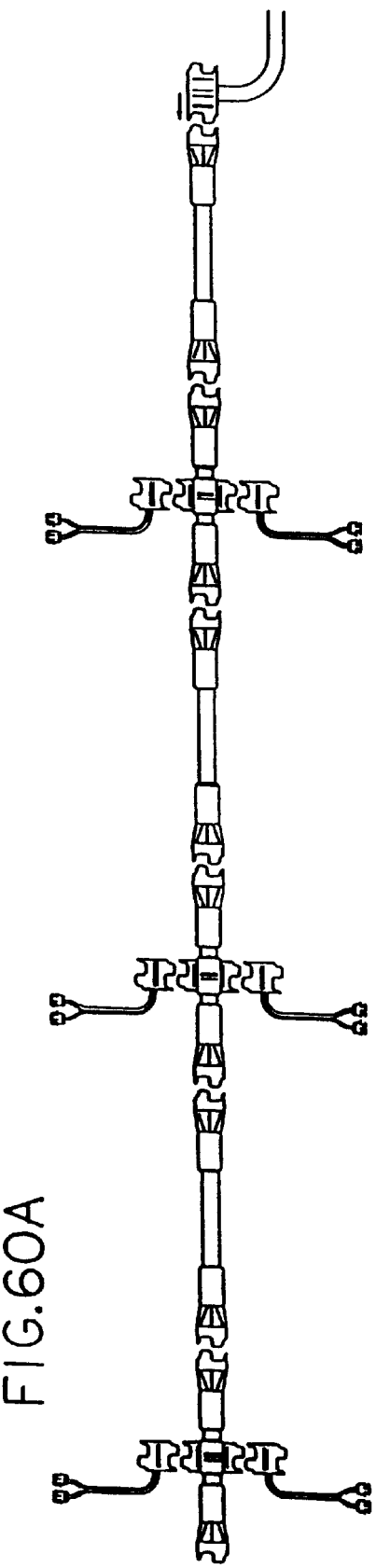
FIGS. 60A and 60B illustrate similar views of the data distribution assembly showing in FIGS. 60A and 60B various combinations of the features of FIGS. 58A–58C and 59A–59B.
Figure 60B:
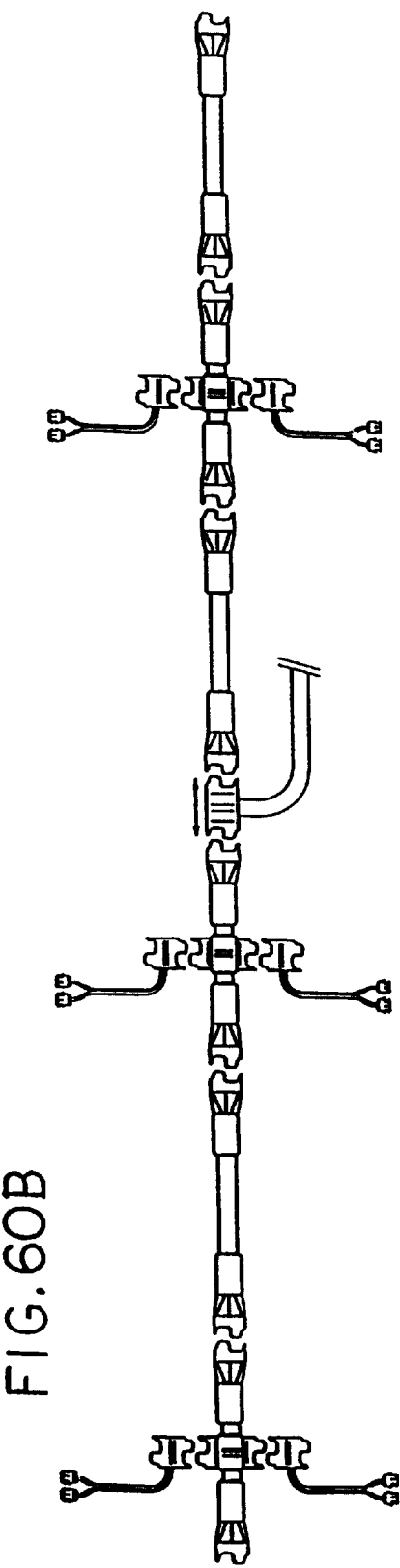

FIGS. 60A and 60B illustrate a combinational data distribution assembly where the data distribution segments come in two versions, namely, one version having data T's for connection of data taps and another version for pass-through only. Data taps are illustrated which connect to those data distribution segment having the data T therein. FIG. 60A also illustrates one of the pass-through data distribution segments disposed serially between two of the data distribution segments which have data T's. FIG. 60B illustrates a bi-directional data feed connected to the assembly.

Figure 61A:
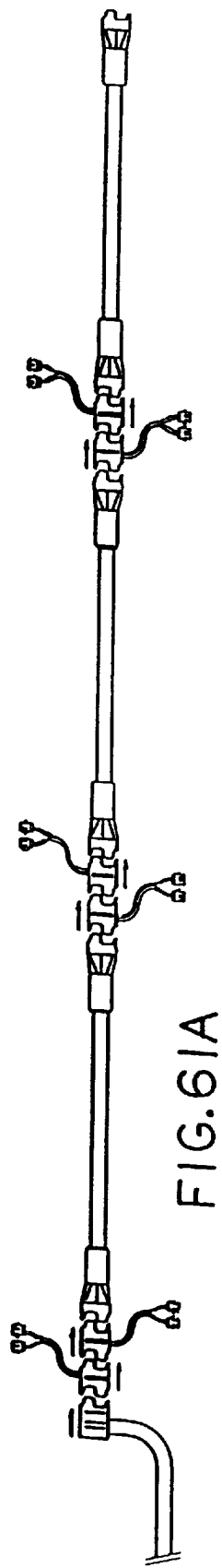
FIGS. 61A and 61B show the data distribution assembly employing extended length data distribution segments (i.e., main distribution modules), with FIGS. 61A and 61B showing different combinations of features.
Figure 61B:
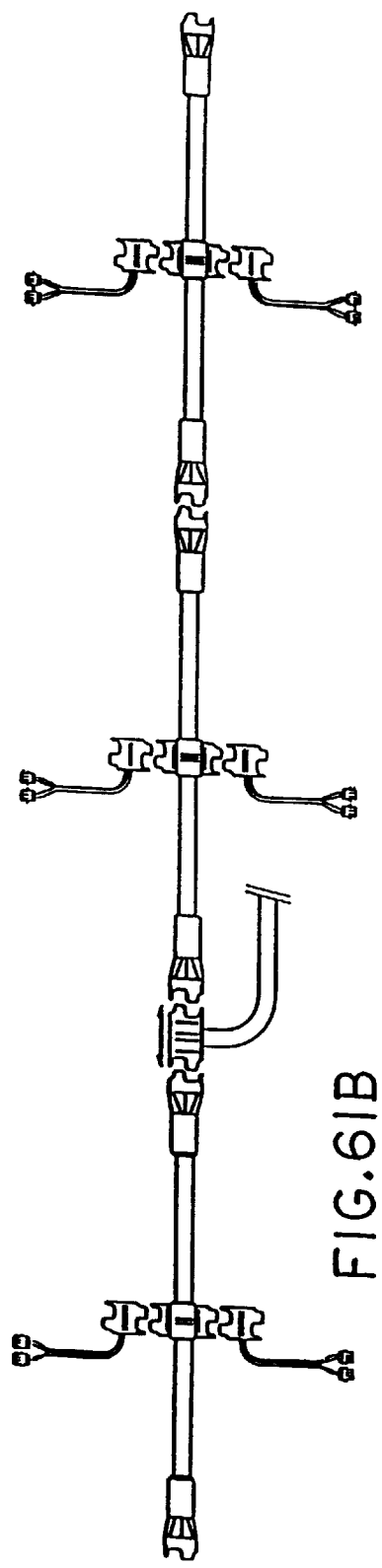

FIGS. 61A and 61B illustrate extended length data distribution segments which are longer in length and run the length of two or more panels. The extended length data distribution segments may be based on office size rather than panel size. FIG. 61A illustrates a data feed at the leftward end of the system while FIG. 61B illustrates the data feed between two serially-adjacent distribution segments.

Figure 62A:
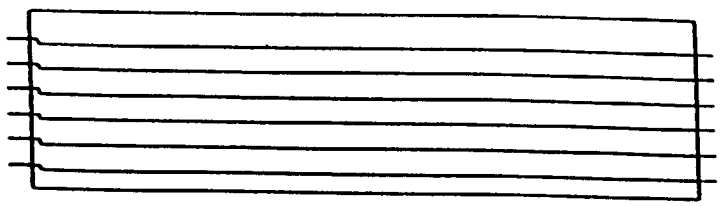
FIGS. 62A and 62B relate solely to the data distribution segment, with FIG. 62B showing the segment structure and FIG. 62A showing the internal telecommunication links which pass therethrough.
Figure 62B:
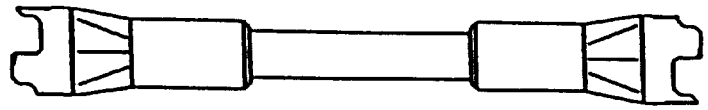

FIGS. 62A and 62B illustrate a data distribution segment having such features as a length based on panel or furniture component size, a non-handed design (genderless connectors), quick connectors on opposite ends for attachment to other segments, feeds or taps, integral strain relief, pre-attachability to furniturelike power systems, and a capacity to service voice and data requirements for a minimum of six offices.

Figure 63A:
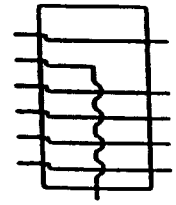
FIGS. 63A and 63B relate to the in-line data tap, with FIG. 63B showing the structure of the data tap and FIG. 63A showing the telecommunication links or paths thereof.
Figure 63B:
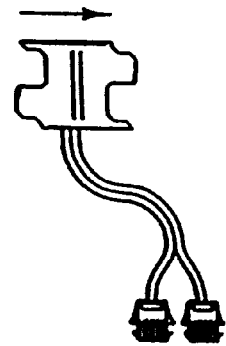

FIGS. 63A and 63B illustrate an in-line data tap which has such features as the ability to access and terminate desired data paths, provide pass-through of all other paths, quick connectors on both ends for attachment to distribution segments, feeds or other taps, preterminated modular connectors for computer and phone attachment, and integral strain relief. This in-line data tap must be oriented in a proper direction as illustrated by the reference arrow in FIG. 63A. More particularly, the in-line data tap provides integral strain relief with cables formed of two four-pair UTP cables having a siamese configuration and a length which is predetermined. The two modular jacks are provided for voice and for data.

FIGS. 64A and 64B illustrate a data distribution segment with a data T for attachment of data taps. This data distribution segment incorporates such features as a length based on panel or furniture component size, a non-handed design (genderless connectors), quick connectors on both ends for attachment to other segments, feeds or taps, integral strain relief, pre-attachability to furniture-like power system, a capacity to service voice and data requirements for six offices minimum, and T connectors for attachment of data taps. Insertion of a data tap breaks the continuation of the path therethrough while orientation of the inserted data tap determines the direction of the signal path.

FIGS. 65A and 65B illustrate a data tap which uses two modular jacks for voice and data respectively, and two four-pair UTP cables with a siamese configuration and a predetermined length. The cables provide integral strain relief while the data tap incorporates such features as providing access and terminations to desired data paths, orientation of data tap determines direction of data path and data distribution segment, pre-terminated modular connectors for computer and phone attachment, and providing integral strain relief.

Figure 66A:
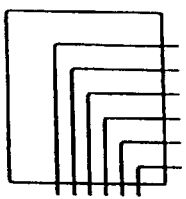
FIGS. 66A and 66B relate to the one-way data feed, and specifically
Figure 66B:
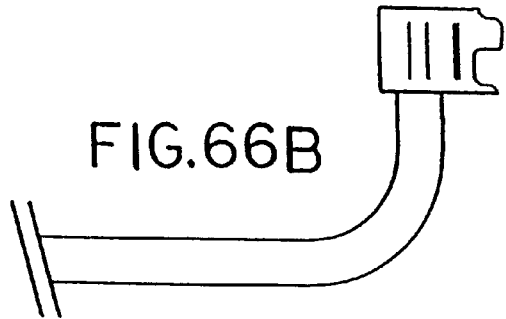

FIGS. 66A and 66B illustrate a one-way data feed which provides integral strain relief and connection between a data distribution assembly and the computer/telephone closet. The one-way data feed connects the building cabling to the data distribution assembly with the length and configuration of the closet end of the data feed being provided as necessary. The data feed has the capacity to service voice and data requirements for a minimum of six offices and must be attached to either end of the data distribution assembly since it is not constructed for connection in the middle of a run of data distribution assemblies.

Figure 67A:
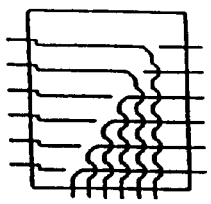
FIGS. 67A and 67B illustrate a bi-direction data feed, and specifically
Figure 67B:
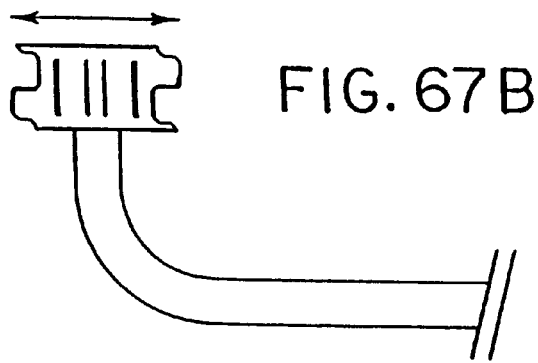

FIGS. 67A and 67B illustrate a bi-directional data feed for connection between the data distribution assembly and the computer/telephone closet while providing integral strain relief. Here again, the building cabling is connected to the data distribution assembly with the length and configuration of the closet end of the data feed to be determined. This data feed provides a six office capacity for voice and data requirements and may be located anywhere along the length of the data distribution assembly with the direction of each data path being selectable for proper routing of signals to desired offices.

Figures 68A, 68B:
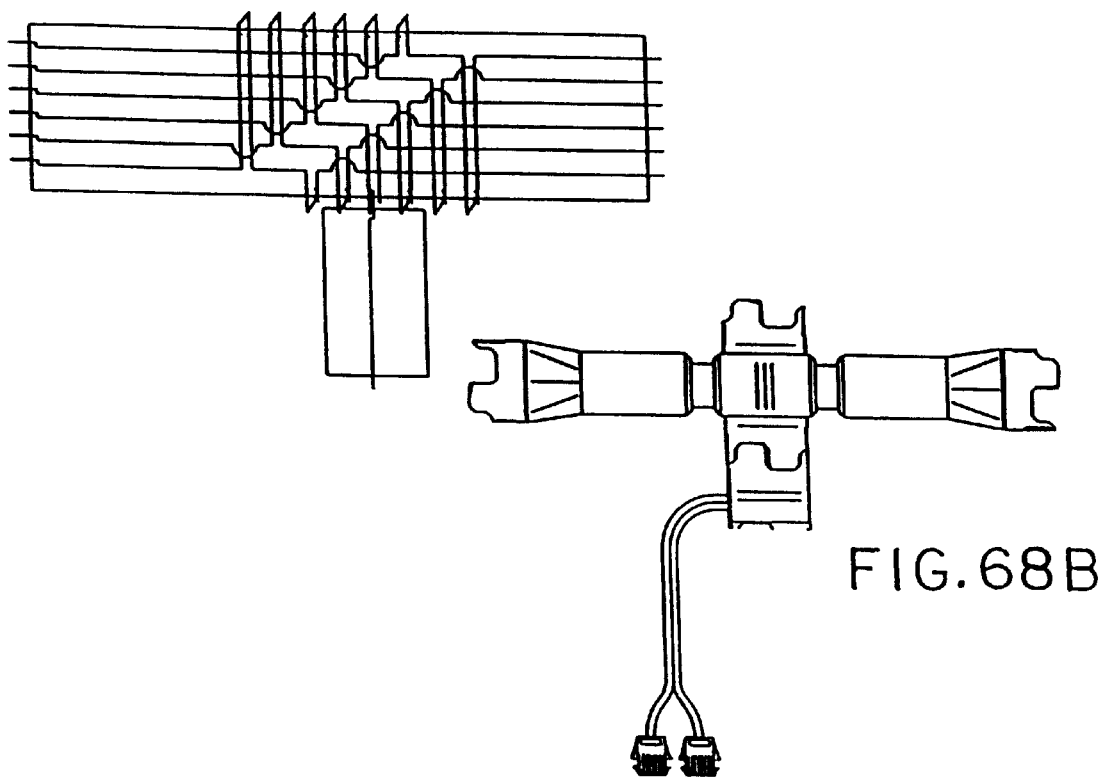
FIGS. 68A and 68B diagrammatically illustrate the connection of a data tap to a distribution segment, and specifically

FIGS. 68A and 68B illustrate a data distribution segment with a data tap attached where a data path is accessed by the data tap and the data path is discontinued in the direction away from the data tap.

Figure 69:
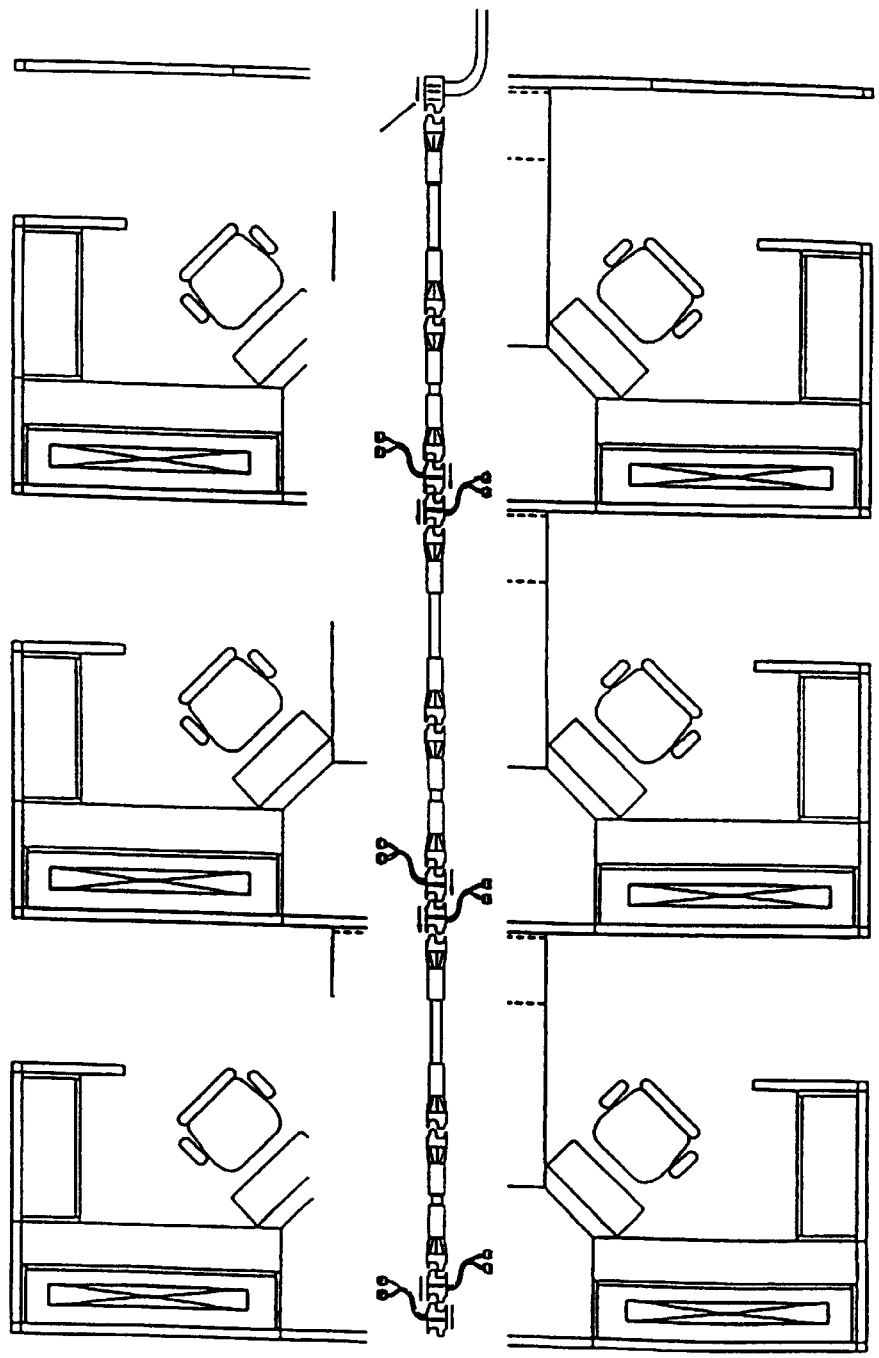

FIG. 69 illustrates a typical layout and configuration of the modular cabling system illustrating a data distribution assembly diagrammatically represented as providing data taps for voice and data to six separate work station areas which data distribution assembly is connected at the rightward end to a data feed as discussed above.

While the modular communication system of this invention has been described above in conjunction with a wall system defined by portable upright space-dividing panels, it will be appreciated that the modular communication system of this invention also has significant capability for use with other components, particularly furniture components, and can, for example, be provided for use on a series of linking desks or worksurfaces. This modular communication system is also highly desirable for use in a beam-type space-dividing arrangement, such type arrangement being illustrated by U.S. Pat. No. 5,236,370.

Attention is also directed to application Ser. No. 08/377 915, filed Jan. 25, 1995 and issuing into U.S. Pat. No. 5,957,714 through an intermediate CIP application, inventors Ross Johnson and Harold Wilson, and entitled "MODU- LAR COMMUNICATION SYSTEM" (Attorney Reference: Haworth Case 163). The disclosure of this latter-mentioned application is incorporated herein, in its entirety, by reference.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A telecommunication cabling arrangement comprising:
   a plurality of elongate main distribution modules which serially couple together, each said main distribution module including an elongate intermediate cable having a connector unit at each end thereof, said cable including conductors which define a plurality of parallel telecommunication distribution links extending longitudinally therethrough and terminating at said connector units provided at the opposite ends thereof;
   said connector units as provided on adjacent ends of said distribution modules being interconnected together to define a serially connected pair of said distribution modules wherein said distribution links are transmitted longitudinally therebetween, said interconnected connector units on said adjacent ends including a plurality of access ports defined at an interface between said interconnected connector units wherein each said access port provides access to at least one but less than all of said distribution links, each of said access ports being defined by an aligned pair of recesses formed respectively in said interconnected connector units, each of said recesses including contacts which are fixedly connected to said distribution link accessed thereby and which removably connect to said contacts of said recess aligned therewith wherein said distribution link is transmitted longitudinally between said interconnected connector units; and
   at least one plug unit having a plug part and a plurality of plug conductors which define a telecommunication plug link, said plug part being insertable into a selected one of said access ports to disconnect said contacts of said aligned recesses from each other and complete a connection between said plug link and said distribution link of said access port.

2. An arrangement according to claim 1, wherein said plug part includes opposite side surfaces wherein one of said side surfaces includes a plurality of plug contacts thereon and the other of said side surfaces defines an insulative surface, said plug contacts being connected to said contacts of one of said aligned recesses to complete said connection between said plug link and said distribution link and said insulative surface disconnecting said contacts of the other of said aligned recesses.

3. An arrangement according to claim 2, wherein said plug unit is insertable into said access port in a first orientation to connect said plug contacts to said contacts of one of said interconnected connector units and is insertable into said access port in a second orientation to connect said plug contacts to said contacts of the other of said interconnected connector units.

4. An arrangement according to claim 1, wherein said interconnected connector units include opposing end sections which cooperate to define said interface, each of said opposing end sections including a plurality of recesses wherein each said recess opens in a first direction toward said recess aligned therewith to permit said respective contacts to be removably connected together and opens in a second direction to an exterior of said interconnected connector units to define an access opening into which said plug unit is insertable.

5. An arrangement according to claim 4, wherein said end section of each of said interconnected connector units includes an end surface through which said recesses open in said first direction, each of said interconnected connector units including a side surface through which said recesses open in said second direction.

6. An arrangement according to claim 1, wherein said access ports open through at least one side surface of said interconnected connector units, said plug unit being insertable sidewardly into said access port in a sideward direction which is oriented transverse to a longitudinal direction of said main distribution module.

7. An arrangement according to claim 6, wherein said access ports open through a pair of said side surfaces.

8. An arrangement according to claim 6, wherein a plurality of said plug units are provided which are inserted into a plurality of said access ports of said interconnected connector units.

9. An arrangement according to claim 8, wherein said plug unit is keyed such that said plug unit is insertable into said access port in one orientation to permit connection to said contacts of only one of said aligned recesses.

10. A telecommunication cabling arrangement comprising:
    a plurality of elongate main distribution modules which define adjacent infeed ends of a plurality of runs of telecommunication cabling, each said main distribution module including an elongate intermediate cable having a connector assembly at an end thereof, said cable including conductors which define a plurality of parallel telecommunication distribution links extending longitudinally therethrough and terminating at said connector assembly;
    each of said connector assemblies including a plurality of access ports wherein each said access port provides access to at least one but less than all of said distribution links, each of said access ports including contacts which are fixedly connected to said distribution link accessed thereby and including an access opening which permits access to said contacts from an exterior thereof; and
    at least one infeed unit having a cable which includes infeed conductors that define a plurality of telecommunication infeed links and having a plurality of infeed plugs which are each connected to at least one but less than all of said infeed links, each said infeed plug being inserted into a selected one of said access ports wherein said infeed link corresponding to said infeed plug is connected to said distribution link corresponding to said access port, said plurality of said infeed plugs being engaged with any of said access ports of said plurality of said main distribution modules to selectively route said infeed links to said runs of telecommunication cabling.

11. An arrangement according to claim 10, wherein each of said main distribution modules is connected to less than all of said infeed links.

12. An arrangement according to claim 11, wherein each of said main distribution modules includes a quantity of said distribution links which corresponds to a quantity of said infeed links.

13. An arrangement according to claim 10, wherein each of said runs of said telecommunication cabling includes one or more tap-off locations wherein each of said tap-off locations includes a plurality of access ports, each of said access ports at said tap-off location corresponding to one said access port at said infeed end of said run such that said distribution link extends between said corresponding access ports.

14. An arrangement according to claim 13, which includes at least one tap-off unit having a tap-off plug and plug conductors which define a telecommunication tap-off link, said tap-off plug being insertable into a selected one of said access ports at said tap-off location to connect said tap-off link to said distribution link of said access port.

15. An arrangement according to claim 10, wherein said connector assembly includes a connector unit which has a plurality of recesses which define said access ports and a connector cover which encloses at least one side of said recesses but permits insertion of said infeed plug therein.

16. An arrangement according to claim 15, wherein said connector cover is removable and said connector unit is connectable to a corresponding connector unit on another of said main distribution modules when said connector cover is removed to permit an adjacent pair of said main distribution modules to be serially connected together.

17. A telecommunication cabling arrangement comprising:
  a plurality of elongate main distribution modules which serially couple together, each said main distribution module including an elongate intermediate cable having a connector unit at each end thereof, said cable including conductors which define a plurality of parallel telecommunication distribution links extending longitudinally therethrough and terminating at said connector units provided at the opposite ends thereof;
  said connector units as provided on adjacent ends of said distribution modules being removably interconnected together to define a serially connected pair of said main distribution modules, each of said connector units including contacts which are fixedly connected to said distribution links and are removably interconnected to said contacts of an adjacent one of said connector units such that said distribution links are transmitted longitudinally in series between said interconnected connector units, said interconnected contacts of said interconnected connector units being accessible from an exterior to permit access to said distribution links defined thereby; and
  at least one plug unit having a plug part and plug conductors which define a telecommunication plug link, said plug part being insertable into engagement with at least a portion of said interconnected contacts to complete a connection between said plug link and at least one, but less than all of said distribution links.

18. An arrangement according to claim 17, wherein said distribution link connected to said plug link is disconnected from said distribution link of said adjacent main distribution module.

19. An arrangement according to claim 18, wherein the remaining distribution links remain connected together between said interconnected connector units when said plug unit is engaged with the other of said distribution links.

20. An arrangement according to claim 17, wherein said contacts are resiliently flexible, said interconnected contacts including opposing contact surfaces which are disposed in abutting engagement to serially connect said telecommunications links together, said plug part including plug contacts which are connected to said plug link, said plug part being insertable between and separating said opposing contact surfaces from each other such that said plug contacts contact said contacts of one of said interconnected connector units to complete said connection between said plug link and said distribution link.

* * * * *